US007770874B2

(12) United States Patent
Ophardt et al.

(10) Patent No.: US 7,770,874 B2

(45) Date of Patent: Aug. 10, 2010

(54) FOAM PUMP WITH SPRING

(75) Inventors: Heiner Ophardt, Vineland (CA); Ali Mirbach, Issum (DE)

(73) Assignee: Gotohii.com Inc., Beamsville, Ontario (CA)

( * ) Notice: Subject to any disclaimer, the term of this patent is extended or adjusted under 35 U.S.C. 154(b) by 1095 days.

(21) Appl. No.: 11/403,209

(22) Filed: Apr. 13, 2006

(65) Prior Publication Data

US 2006/0249538 A1 Nov. 9, 2006

Related U.S. Application Data

(63) Continuation-in-part of application No. 11/145,221, filed on Jun. 6, 2005, now Pat. No. 7,303,099.

(30) Foreign Application Priority Data

| | | |
|---|---|---|
| Apr. 22, 2005 | (CA) | 2504989 |
| Jun. 7, 2005 | (CA) | 2509295 |
| Aug. 26, 2005 | (CA) | 2517326 |

(51) Int. Cl.
*F16F 1/36* (2006.01)

(52) U.S. Cl. .......................... 267/153; 267/159; 267/182

(58) Field of Classification Search ................. 267/152, 267/153, 159, 160, 164, 182

See application file for complete search history.

(56) References Cited

U.S. PATENT DOCUMENTS

| | | | | |
|---|---|---|---|---|
| 2,561,405 | A * | 7/1951 | O'Brien et al. | 267/159 |
| 3,422,993 | A | 1/1969 | Boehm | |
| 3,542,353 | A * | 11/1970 | Hickman | 267/292 |
| 3,623,695 | A * | 11/1971 | Hislop | 251/65 |
| 3,709,437 | A | 1/1973 | Wright | |
| 3,727,870 | A * | 4/1973 | Bass | 248/618 |
| 3,743,146 | A | 7/1973 | Schindler | |
| 3,985,271 | A | 10/1976 | Gardner | |
| 4,019,657 | A | 4/1977 | Spitzer | |
| 4,022,351 | A | 5/1977 | Wright | |
| 4,147,476 | A | 4/1979 | Warren | |
| 4,238,056 | A | 12/1980 | Tucker | |

(Continued)

FOREIGN PATENT DOCUMENTS

| | | |
|---|---|---|
| CA | 2470532 | 12/2005 |

(Continued)

*Primary Examiner*—Xuan Lan Nguyen
(74) *Attorney, Agent, or Firm*—Riches, McKenzie & Herbert LLP

(57) ABSTRACT

A spring member extending from a first end to a second end about a longitudinal axis, the spring having an inherent bias to assume an extended position with a first end spaced from the second end along the axis, the spring assuming compressed positions when compressed by forces applied parallel to the axis, in the compressed positions the spring resiliently urges its first and second ends axially away from each other toward the extended position, the spring member having a wall in the shape of a solid of revolution rotated about the axis and defining a central cavity therein open at the first end of the spring and substantially closed at the second end of the spring, the wall when in the unbiased extended position having a greatest diameter at the first end and a least diameter at the second end, a plurality of openings through the wall, the openings disposed symmetrically both circumferentially and axially relative to each other.

24 Claims, 42 Drawing Sheets

U.S. PATENT DOCUMENTS

| | | | | | |
|---|---|---|---|---|---|
| 4,584,444 | A | * | 4/1986 | Nagashima | 200/600 |
| 4,621,749 | A | | 11/1986 | Kanfer | |
| 4,957,218 | A | | 9/1990 | Ford, Jr. | |
| 4,978,036 | A | | 12/1990 | Burd | |
| 5,048,750 | A | | 9/1991 | Tobler | |
| 5,156,307 | A | | 10/1992 | Callahan | |
| 5,163,588 | A | | 11/1992 | Cater | |
| 5,165,577 | A | | 11/1992 | Ophardt | |
| 5,174,476 | A | | 12/1992 | Steiner | |
| 5,248,066 | A | | 9/1993 | Olson | |
| 5,271,530 | A | | 12/1993 | Uehira | |
| 5,289,952 | A | | 3/1994 | Gueret | |
| 5,348,189 | A | | 9/1994 | Cater | |
| 5,372,281 | A | | 12/1994 | Palmer | |
| 5,425,404 | A | | 6/1995 | Dyer | |
| 5,431,309 | A | | 7/1995 | Ophardt | |
| 5,445,288 | A | | 8/1995 | Banks | |
| 5,462,208 | A | | 10/1995 | Stahley | |
| 5,676,277 | A | | 10/1997 | Ophardt | |
| 5,791,637 | A | * | 8/1998 | Reichelt et al. | 267/141 |
| 5,975,360 | A | | 11/1999 | Ophardt | |
| 6,082,586 | A | | 7/2000 | Banks | |
| 6,409,050 | B1 | | 6/2002 | Ophardt | |
| 6,446,840 | B2 | | 9/2002 | Ophardt | |
| 6,601,736 | B2 | | 8/2003 | Ophardt | |

FOREIGN PATENT DOCUMENTS

| | | |
|---|---|---|
| EP | 0392238 | 10/1990 |
| EP | 0565713 | 10/1993 |
| EP | 703831 | 4/1996 |
| GB | 2193904 | 2/1988 |

* cited by examiner

FOAM PUMP WITH SPRING

RELATED APPLICATION

This application is a continuation-in-part of U.S. patent application Ser. No. 11/145,221 filed Jun. 6, 2005 now U.S. Pat. No. 7,303,099.

SCOPE OF THE INVENTION

This invention relates to liquid dispensers and, more particularly, liquid dispensers to dispensing liquid preferably as a foam.

BACKGROUND OF THE INVENTION

Liquid dispensers for dispensing soaps and other similar fluids in liquid form are known. For various reasons in some applications, it is preferable to dispense soaps and other similar fluids in the form of a foam. Generally, in the form of a foam, less soap liquid is required to be used as contrasted with the soap in the liquid form. As well, soap as foam is less likely to run off a user's hands or other surfaces to be cleaned.

SUMMARY OF THE INVENTION

The present invention provides improved and simplified apparatuses for dispensing a fluid preferably with air as a foam.

The present invention provides an improved construction for a spring, preferably formed by injection moulding, and a pump mechanism using such a spring.

The present invention also provides a pump mechanism utilizing a resilient flexible bellows member to function as a displacement pump and/or a spring. The bellows member preferably is integrally formed from plastic as a component of a piston for the pump.

The present invention also provides a pump assembly with a first pump to displace a first volume and a second pump to displace a second volume greater than the first volume. The first pump draws liquid from a reservoir and dispenses it to the second pump. The second pump draws in the discharge from the first pump and an additional volume of air such that the second pump discharges both liquid and air. The first pump preferably has a piston movable in a first inner chamber and the second pump has the same piston movable in a second outer chamber. The first and second chambers communicate together. In one version, a one-way valve provides flow outwardly only from the first chamber to the second chamber and the first pump discharges while the second pump draws in, and vice versa. In a second version, the one-way valve is provided between the first chamber and the reservoir to provide flow outwardly only from the reservoir to the first chamber and the first pump and the second pump discharge at the same time and draw in at the same time.

Preferably, simultaneously, discharged air and liquid may preferably produce foam by passing through a foam generator, such as a porous member, or be atomized as by passing through a nozzle.

An object of the present invention is to provide an improved pump for dispensing a liquid.

Another object is to provide an improved pump for dispensing a liquid in the form of a foam.

Another object is to provide an improved pump with a bellows member to function as one or more of a displacement pump and a spring.

Another object is to provide an improved pump with a plastic spring.

Another object is to provide an improved plastic spring member.

In one aspect, the present invention provides a spring member extending from a first end to a second end about a longitudinal axis, the spring having an inherent bias to assume an extended position with a first end spaced from the second end along the axis, the spring assuming compressed positions when compressed by forces applied parallel to the axis, in the compressed positions the spring resiliently urges its first and second ends axially away from each other toward the extended position;

the spring member having a wall in the shape of a solid of revolution rotated about the axis and defining a central cavity therein open at the first end of the spring and substantially closed at the second end of the spring, the wall when in the unbiased extended position having a greatest diameter at the first end and a least diameter at the second end, a plurality of openings through the wall, the openings disposed symmetrically both circumferentially and axially relative to each other.

In another aspect, the present invention provides a pump for dispensing liquid from a reservoir comprising:

a piston-chamber forming member, a piston forming element received in the piston-chamber forming means coaxially axially slidable about an axis inwardly and outwardly therein between an inward retracted position and an outward extended position, said piston forming element having a central axially extending stem having a central passageway with an inner end and having an outlet proximate an outer end extending out of the piston-chamber forming member and from which liquid is dispensed, at least one annular chamber formed annularly about the stem between the piston forming element and the piston-chamber forming member providing for controlled movement of liquid from the reservoir into the annular chamber and for dispensing of liquid in the annular chamber to the outlet with reciprocal sliding of the piston forming element between the retracted position and the extended position, a spring member extending inwardly from the inner end of the stem of the piston forming element coaxially relative the piston forming element from an inner end of the spring to an outer end of the spring which coupled to an inner end of the piston-chamber forming member, the spring member being axially compressed with reciprocal sliding of the piston forming element from the extended position to the retracted position and having an inherent bias which urges the piston forming element axially from the retracted position toward the extended position.

BRIEF DESCRIPTION OF THE DRAWINGS

Further aspects and advantages of the present invention will become apparent from the following description taken together with the accompanying drawings in which.

DETAILED DESCRIPTION OF THE DRAWINGS

Figure 2:
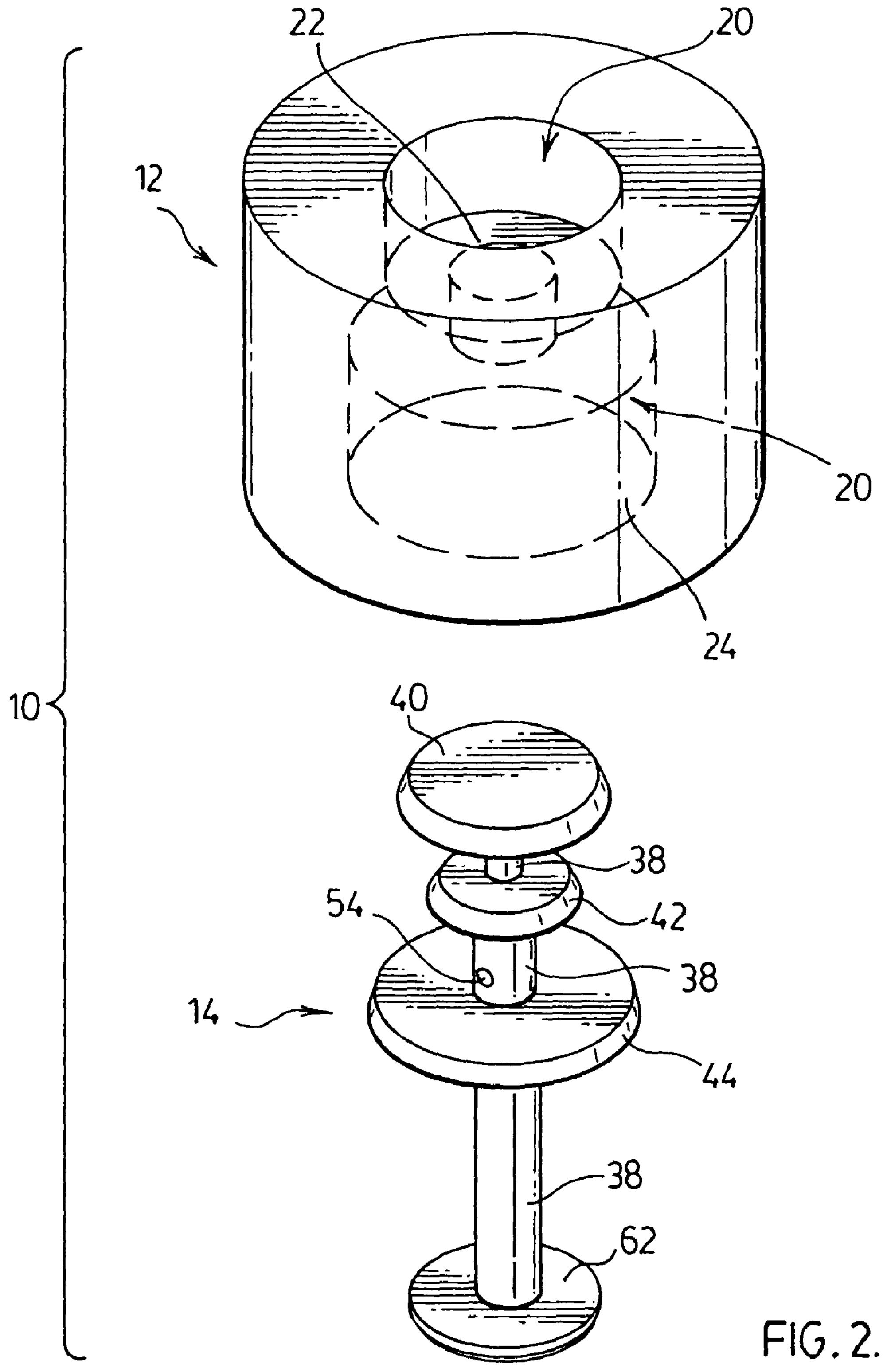
FIG. 2 is a partially exploded perspective view of the pump assembly shown in FIG. 1.
Figure 3:
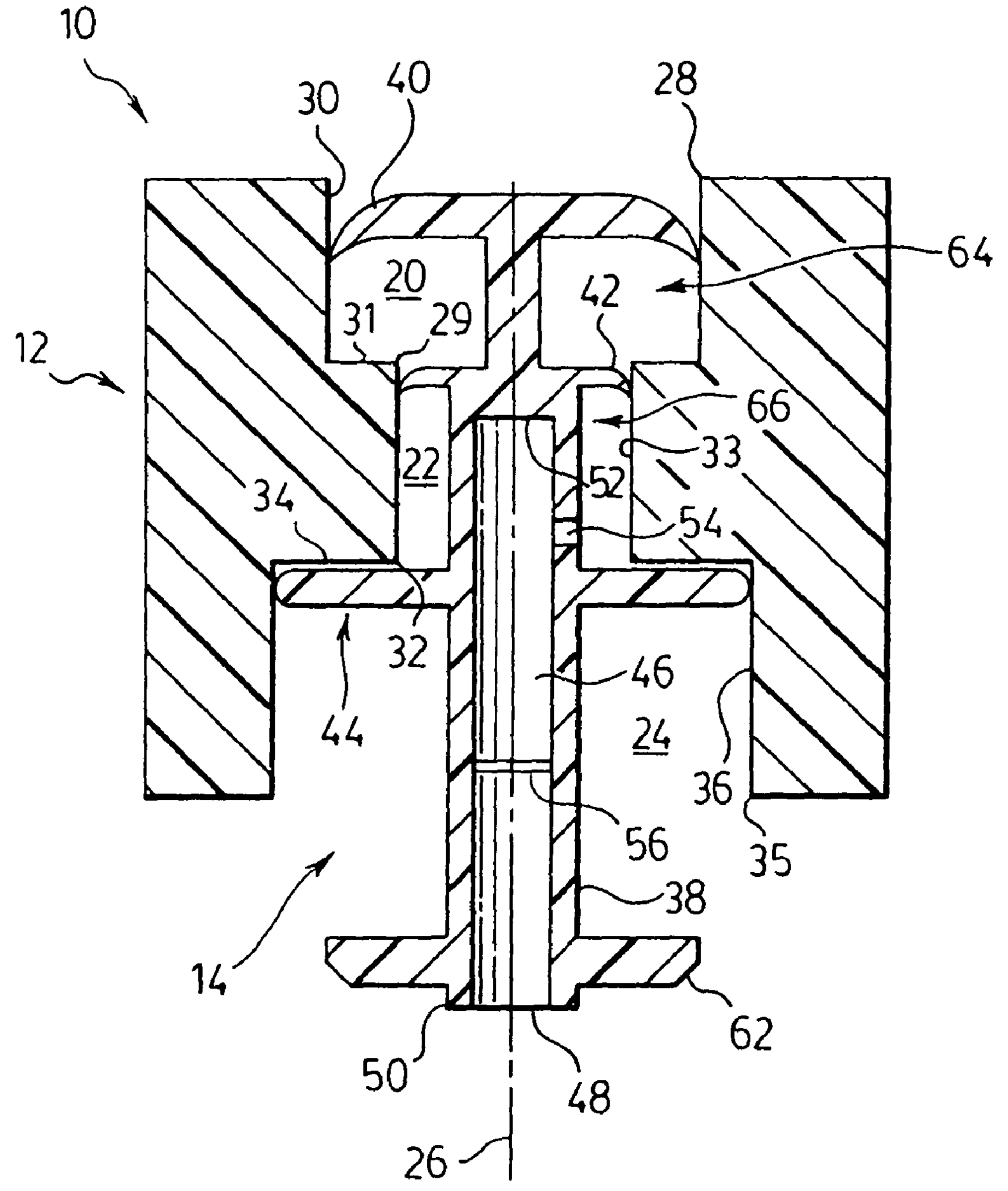
FIG. 3 is a cross-sectional side view of an assembled pump assembly of FIG. 2 showing the piston in a fully retracted position.
Figure 4:
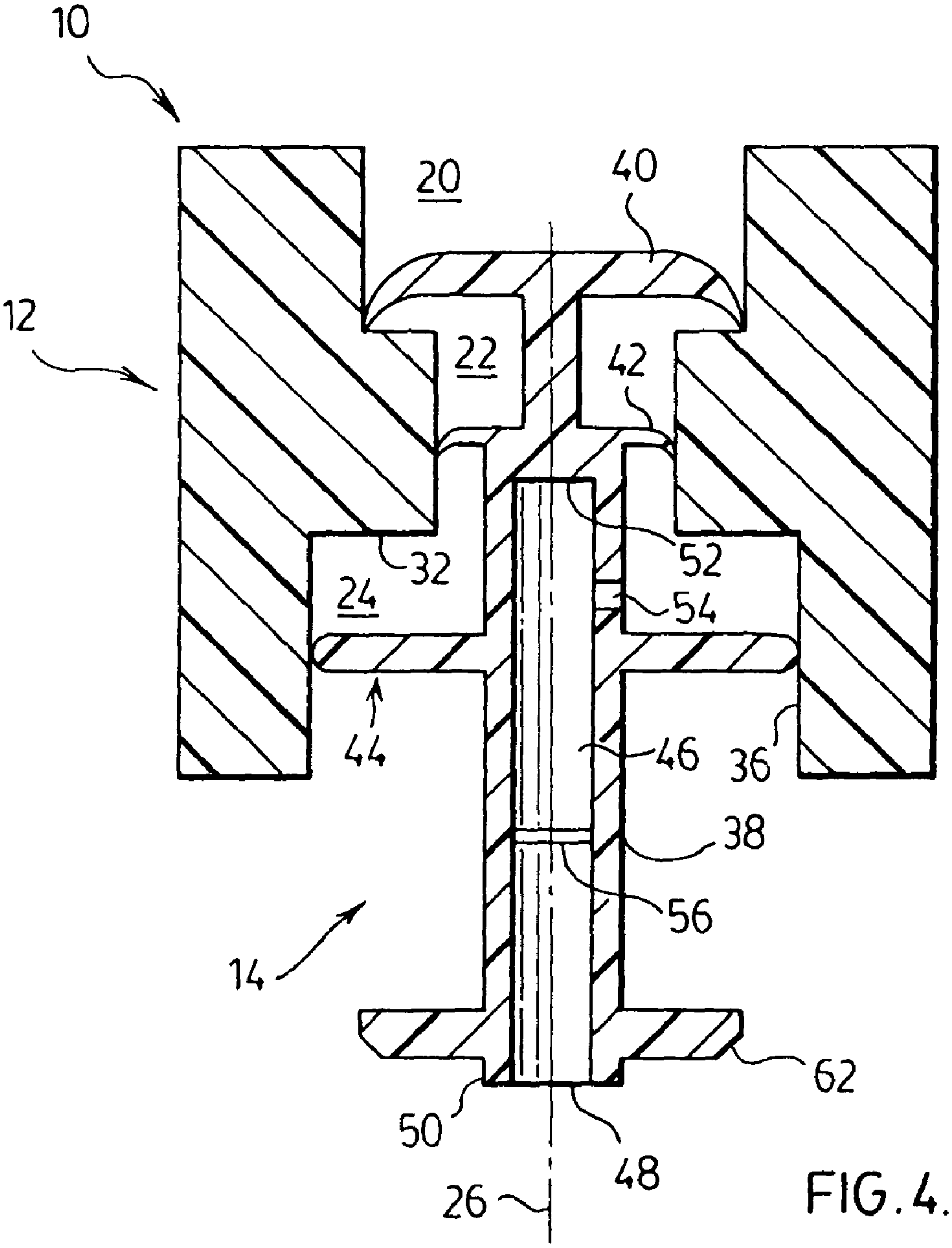
FIG. 4 is the same side view as in FIG. 3 but showing the pump in a fully extended position.

Reference is made first to FIGS. 2, 3 and 4 which show a first embodiment of a pump assembly generally indicated 10. Pump assembly 10 is best shown in FIG. 2 as comprising two principal elements, a piston chamber-forming body 12 and a piston 14.

The piston chamber-forming body 12 has three cylindrical portions illustrated to be of different radii, forming three chambers, an inner chamber 20, an intermediate chamber 22, and an outer chamber 24, all coaxially disposed about an axis 26. The intermediate cylindrical chamber 22 is of the smallest radii. The outer cylindrical chamber 24 is of a radius which is larger than that of the intermediate cylindrical chamber 22. The inner cylindrical chamber 20 is of a radius greater than that of the intermediate cylindrical chamber 22 and, as well, is shown to be of a radius which is less than the radius of the outer cylindrical chamber 24.

The inner chamber 20 has an inlet opening 28 and an outlet opening 29. The inner chamber has a cylindrical chamber side wall 30. The outlet opening 29 opens into an inlet end of the intermediate chamber 22 from an opening in a shoulder 31 forming an outer end of the inner chamber 20. The intermediate chamber 22 has an inlet opening, an outlet opening 32, and a cylindrical chamber side wall 33. The outlet opening 32 of the intermediate chamber 22 opens into an inlet end of the outer chamber 24 from an opening in a shoulder 34 forming the inner end of the outer chamber 24. The outer chamber 24 has an inlet opening, outlet opening 35 and a cylindrical chamber side wall 36.

Piston 14 is axially slidably received in the body 12. The piston 14 has an elongate stem 38 upon which four discs are provided at axially spaced locations. An inner flexing disc 40 is provided at an innermost end spaced axially from an intermediate flexing disc 42 which, in turn, is spaced axially from an outer sealing disc 44. The inner disc 40 is adapted to be axially slidable within the inner chamber 20. The intermediate disc 42 is adapted to be axially slidable within the intermediate chamber 22.

The intermediate disc 42 has a resilient peripheral edge which is directed outwardly and adapted to prevent fluid flow inwardly yet to deflect to permit fluid flow outwardly therepast. Similarly, the inner disc 40 has a resilient outer peripheral edge which is directed outwardly and is adapted to prevent fluid flow inwardly yet to deflect to permit fluid flow outwardly therepast.

The outer sealing disc 44 is adapted to be axially slidable within the outer cylindrical chamber 24. The outer sealing disc 44 extends radially outwardly from the stem 38 to sealably engage the side wall 36 of the outer chamber 24, and prevent flow therepast either inwardly or outwardly.

The piston 14 essentially forms, as defined between the inner disc 40 and the intermediate disc 42, an annular inner compartment 64 which opens radially outwardly as an annular opening between the discs 42 and 44. Similarly, the piston 14 effectively forms between the intermediate sealing disc 42 and the outer sealing disc 44 an annular outer compartment 66 which opens radially outwardly as an annular opening between the discs 42 and 44.

An outermost portion of the stem 38 is hollow with a central passageway 46 extending from an outlet 48 at the outermost end 50 of the stem 38 centrally through the stem 38 to a closed inner end 52. A radially extending inlet 54 extends radially through the stem into the passageway 46, with the inlet 54 being provided on the stem in between the outer disc 44 and the intermediate disc 42. A foam inducing screen 56 is provided in the passageway 46 intermediate between the inlet 54 and the outlet 48. The screen 56 may be fabricated of plastic, wire or cloth material. It may comprise a porous ceramic measure. The screen 56 provides small apertures through which an air and liquid mixture may be passed to aid foam production as by production of turbulent flow through small pores or apertures of the screen thereof in a known manner.

The piston 14 also carries an engagement flange or disc 62 on the stem 38 outward from the outer sealing disc 44. Engagement disc 62 is provided for engagement by an activating device in order to move the piston 14 in and out of the body 12.

In a withdrawal stroke with movement from the retracted position of FIG. 3 to the extended position of FIG. 4, the volume between the inner disc 40 and the intermediate disc 42 decreases such that fluid is displaced outwardly past the intermediate disc 42 to between the intermediate disc 42 and the outer disc 44. At the same time, the volume between the intermediate disc 42 and the outer disc 44 increases, with such increase being greater than the volume decrease between the inner disc 40 and the intermediate disc 42 such that in addition to the fluid displaced outwardly past intermediate disc 42, air is drawn inwardly via the outlet 48, passageway 46, and the inlet 54 in between the intermediate disc 42 and the outer disc 44.

In a retraction stroke from the position of FIG. 4 to the position of FIG. 3, the volume between the intermediate disc 42 and the outer disc 44 decreases such that air and liquid therebetween and in the passageway 46 above the screen 56 is forced under pressure out through the screen 56 commingling and producing foam. At the same time, in the retraction stroke, the volume between the inner disc 40 and the intermediate disc 42 increases drawing liquid from inside a container past the inner disc 40. Reciprocal movement of the piston 14 between the retracted and extended positions will successively draw and pump precise amounts of fluid from a container and mix such fluid with air from the atmosphere and dispense the fluid commingled with the air as a foam.

Operation of the pump assembly illustrated in FIGS. 2 to 4 will draw liquid out of a container creating a vacuum therein. The pump assembly is preferably adapted for use with a collapsible container. Alternatively, a suitable vent mechanism may be provided if desired as, for example, for use in a non-collapsible container to permit atmospheric air to enter the container and prevent a vacuum being built up therein which prevents further dispensing.

It is to be appreciated that the inner disc 40 and the intermediate disc 42 form a first stepped pump and, similarly the intermediate disc 42 and the outer disc 44 form a second stepped pump. The first pump and second pump are out of phase in the sense that in any one retraction or extension stroke while one pump is drawing fluid in, the other is discharging fluid out.

Both the piston 14 and the body 12 may be formed as unitary elements from plastic as by injection moulding.

Figure 1:
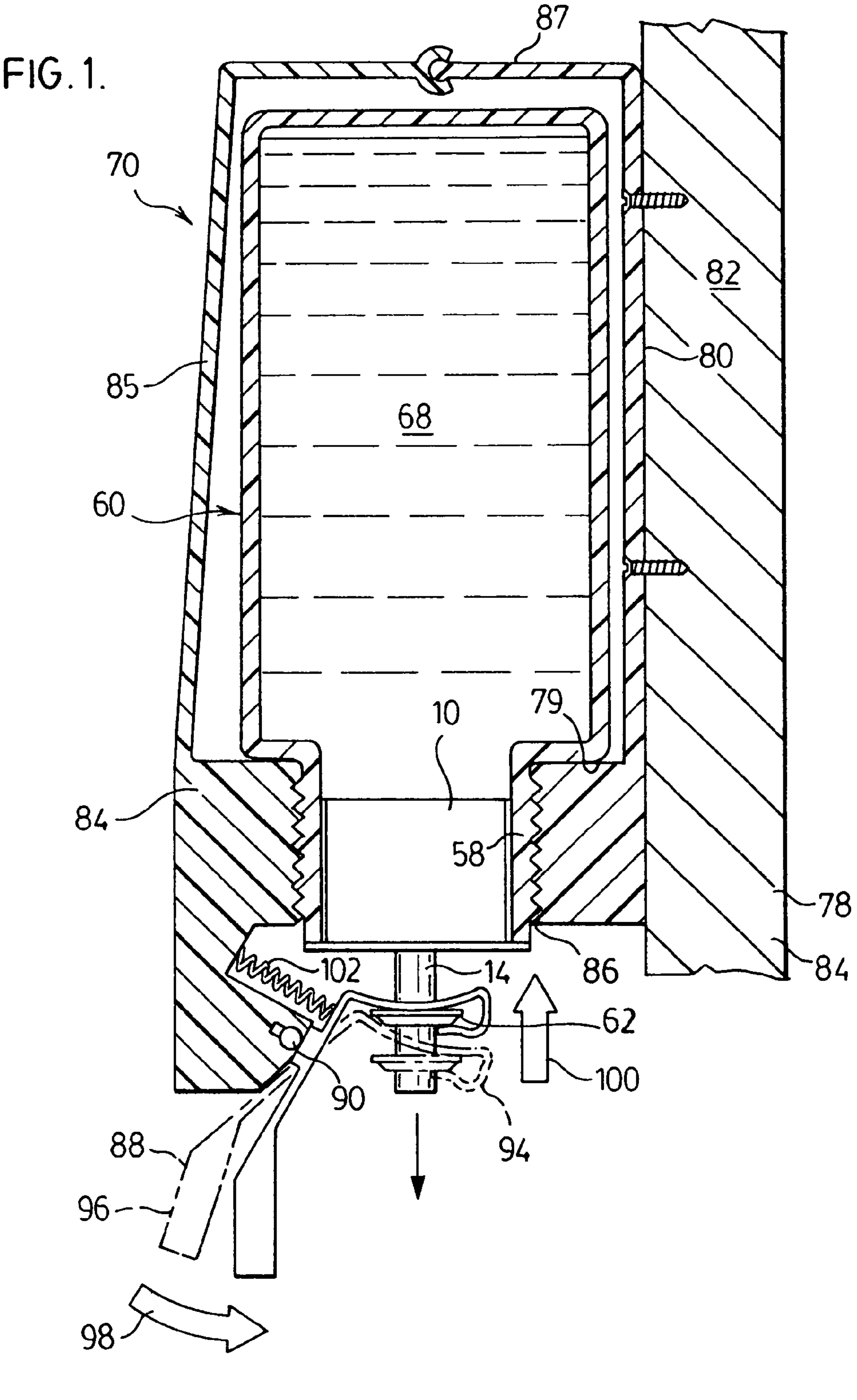
FIG. 1 is a partially cut-away side view of a first preferred embodiment of a liquid dispenser with a reservoir and pump assembly in accordance with the present invention.

Reference is now made to FIG. 1 which shows a liquid soap dispenser generally indicated 70 utilizing the pump assembly 10 of FIGS. 2 to 4 secured in the neck 58 of a sealed, collapsible container or reservoir 60 containing liquid hand soap 68 to be dispensed. Dispenser 70 has a housing generally indicated 78 to receive and support the pump assembly 10 and the reservoir 60. Housing 78 is shown with a back plate 80 for mounting the housing, for example, to a building wall 82. A bottom support plate 84 extends forwardly from the back plate to support and receive the reservoir 60 and pump assembly 10. As shown, bottom support plate 84 has a circular opening 86 therethrough. The reservoir 60 sits supported on shoulder 79 of the support plate 84 with the neck 58 of the reservoir 60 extending through opening 86 and secured in the opening as by a friction fit, clamping and the like. A cover member 85 is hinged to an upper forward extension 87 of the back plate 80 so as to permit replacement of reservoir 60 and its pump assembly 10.

Support plate 84 carries at a forward portion thereof an actuating lever 88 journalled for pivoting about a horizontal axis at 90. An upper end of the lever 88 carries a hook 94 to engage engagement disc 62 and couple lever 88 to piston 14, such that movement of the lower handle end 96 of lever 88 from the dashed line position to the solid line position, in the direction indicated by arrow 98 slides piston 14 inwardly in a retraction pumping stroke as indicated by arrow 100. On release of the lower handle end 96, spring 102 biases the upper portion of lever 88 downwardly so that the lever draws piston 14 outwardly to a fully withdrawn position as seen in dashed lines in FIG. 1. Lever 88 and its inner hook 94 are adapted to permit manual coupling and uncoupling of the hook 94 as is necessary to remove and replace reservoir 60 and pump assembly 10. Other mechanisms for moving the piston can be provided including mechanised and motorized mechanisms.

In use of the dispenser 70, once exhausted, the empty, collapsed reservoir 60 together with the attached pump 10 are removed and a new reservoir 60 and attached pump 10 may be inserted into the housing. Preferably, the removed reservoir 60 with its attached pump 10 are both made entirely out of recyclable plastic material which can easily be recycled without the need for disassembly prior to cutting and shredding.

Figure 5:
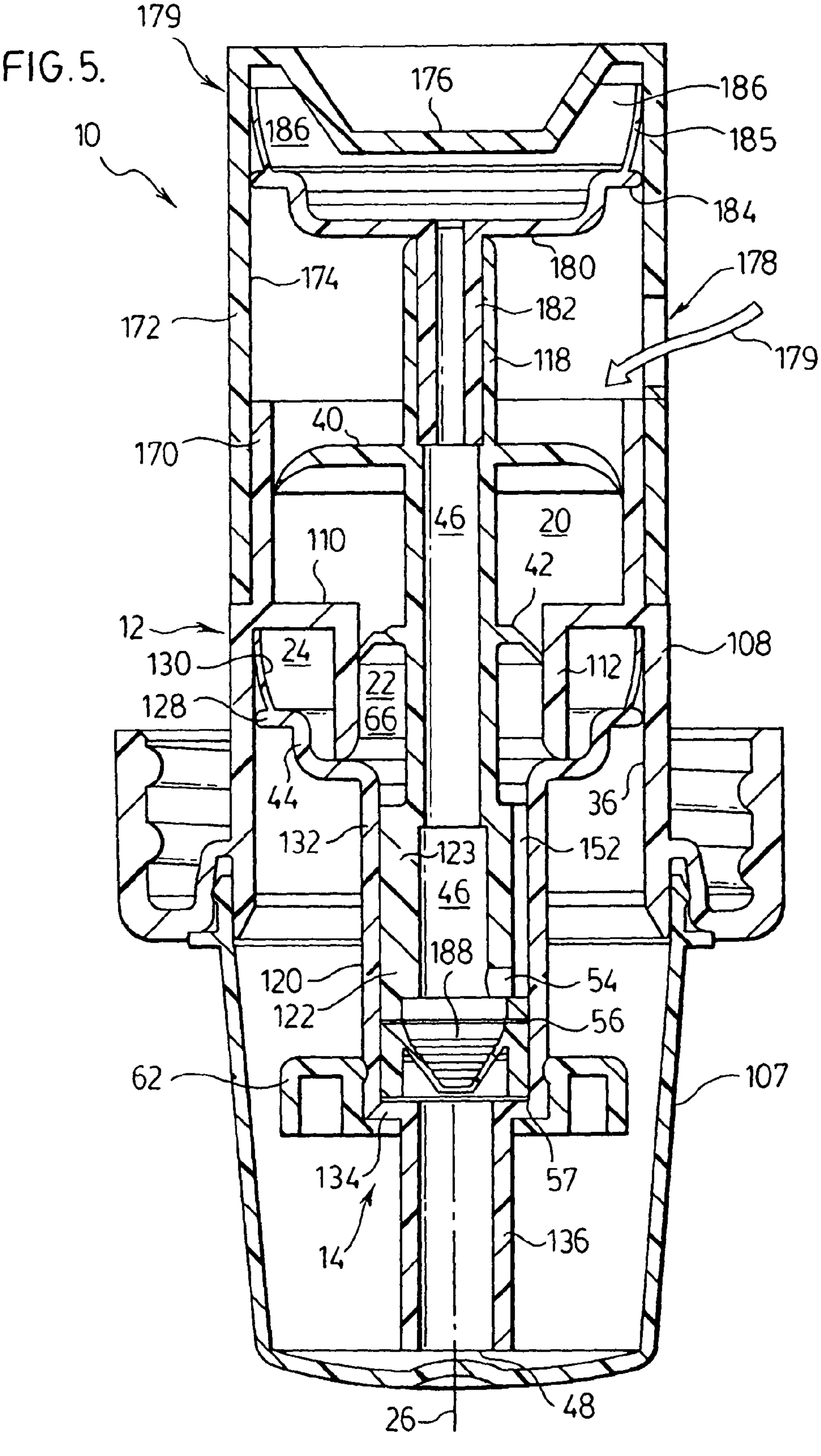
FIG. 5 is a cross-sectional side view of a pump assembly in accordance with a second embodiment of the present invention showing the piston in a fully retracted position.
Figure 6:
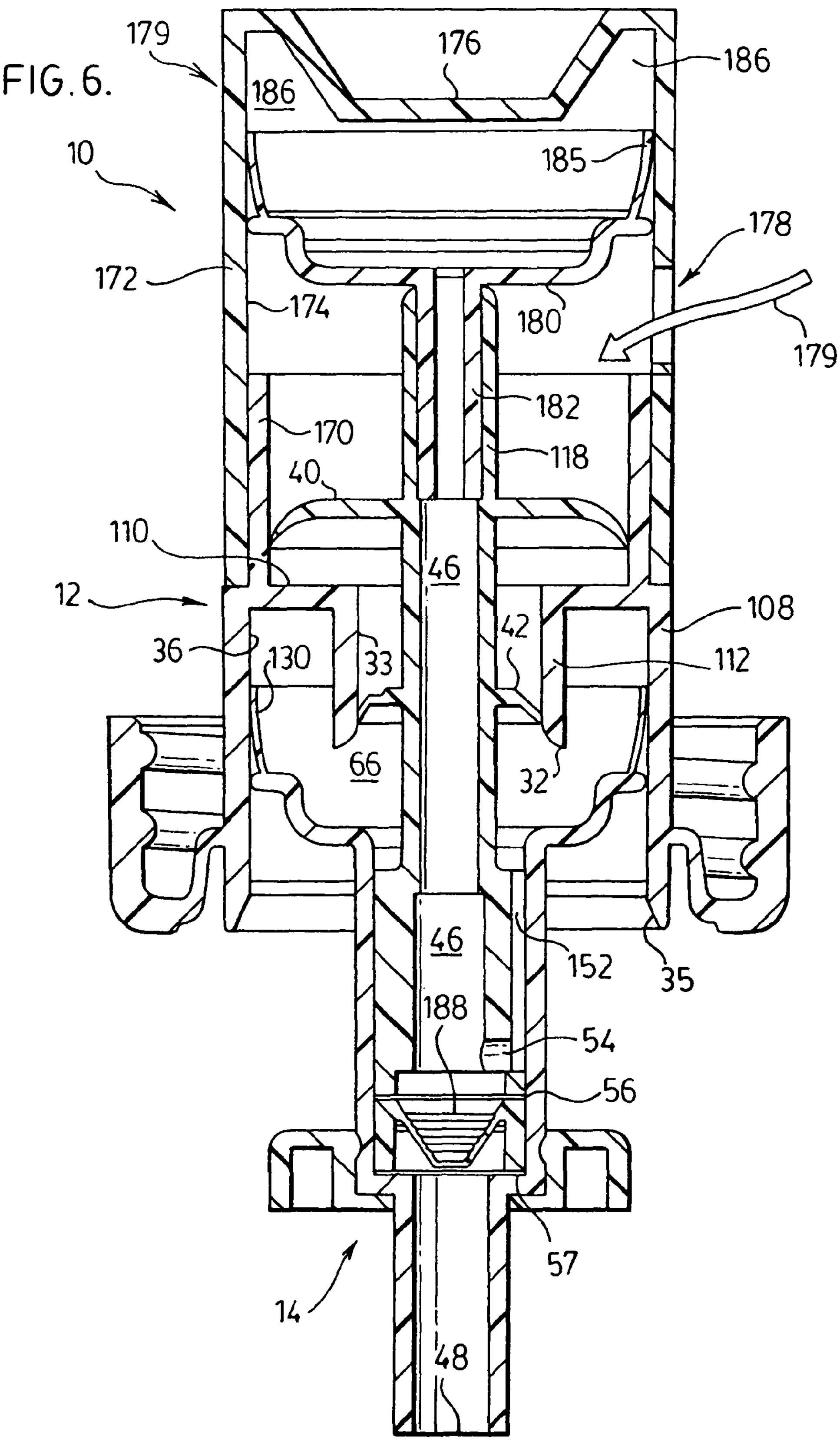
FIG. 6 is the same side view as in FIG. 5 but showing the pump in an extended position.

Reference is now made to FIGS. 5 and 6 which illustrate a second embodiment of a pump assembly in accordance with the present invention. Throughout the drawings, the same reference numerals are used to refer to like elements.

FIG. 5 also shows a pump assembly 10 having a piston chamber-forming body 12 and a piston 14. The piston chamber-forming body 12 is adapted to be threadably secured to the neck of a bottle or reservoir not shown.

The body 12 is formed with a cylindrical outer tubular portion 108 connected at an inner end via a radially extending flange portion 110 to a cylindrical inner tubular portion 112. The inner tubular portion 112 extends axially radially inside the outer tubular portion 108. The body 12 also carries on its flange portion 110 an inward axially extending generally cylindrical support tube 170 adapted to support an air chamber-forming member 172. Member 172 has a cylindrical side wall 174 and is closed at its inner end by end wall 176. Openings 178 are provided aligned through the wall 174 to provide communication from the interior of the reservoir into the interior of the member 170 and hence into the inner chamber 20 as indicated by arrow 179.

The outer chamber 24 is formed radially inwardly of the outer tubular portion 108 having a side wall 36 thereabout and open at its outlet opening 34. As shown, the side wall 36 tapers outwardly at chamfers proximate the outlet opening 35 to facilitate entry of the piston 14.

The intermediate chamber 22 is formed radially inwardly of the inner tubular portion 112. The inner tubular portion 112 defines an outlet opening 32 of the intermediate chamber 22 and a side wall 33 thereof. The intermediate chamber 22 has its side wall 33 taper outwardly as a chamfer proximate the outlet opening 32 to facilitate entry of the piston 14 into the intermediate chamber 22.

The inner chamber 20 is formed radially inwardly of the cylindrical support tube 170. The cylindrical support tube 170, inner tubular portion 112, outer tubular portion 108, inner chamber 20, intermediate chamber 22 and outer chamber 24 are each coaxial about axis 26.

The piston 14 is formed from five elements which are secured together as a unit. These elements include elements, namely, an outer casing 120, an inner core 122, a foam producing element, an engagement disc 62 and an air pump disc 180.

The foam producing element is a combination of two screens 56 and 57 and a three-dimensional basket-like screen 188 having generally frustoconical walls with small openings therethrough as in the manner of known filter members.

The piston 14 carries at its inner end the air pump disc 180 fixedly supported by a hollow neck tube 182 being fixedly secured within a hollow support tube 118 of the inner core 122. The neck tube 182 defines a passageway 46 therethrough open at both ends.

The air pump disc 180 includes a locating flange 184 to locatably engage the cylindrical side wall 174 and a resilient flexible circular sealing disc 185 which sealably engages the side wall 174 and prevents flow of fluids axially outwardly therepast. An air chamber 186 is defined between the air chamber-forming member 172 and the air pump disc 180 which will increase and decrease in volume as the piston 14 is moved axially in the body 12 between the extended and retracted positions. The air chamber 186 is in communication with the passageway 46 via the neck tube 182.

The outer casing 120 is of enlarged diameter at its axially inner end where the outer disc 44 is provided. The outer disc 44 is shown as including a locating flange 128 to locatably engage the cylindrical side wall 36 of the outer chamber 24 and a resilient flexible circular sealing flange 130 which sealably engages the side wall 36 and prevents flow of fluids axially outwardly therepast.

The outer casing 120 is shown with the outer disc 44 carried as a radially outwardly extending flange on a cylindrical large tube portion 132 which extends axially outwardly to a radially inwardly extending shoulder 134 supporting a small tube portion 136 extending axially outwardly from the shoulder 134 to the outlet 48. Screens 56, 57 and 88 are located on the shoulder 134 sandwiched between the shoulder and the outer end of the inner core 122.

The inner core 122 carries the inner disc 40 and the intermediate disc 42. Each of the inner disc 40 and intermediate disc 42 comprise circular resilient flexible discs each of which extends radially outwardly and toward the outlet 48. The inner disc 40, when engaged with the inner chamber 20, that is, with the cylindrical side wall of the cylindrical support tube 170, prevent fluid flow axially inwardly therepast through the inner chamber 20, however, is adapted to have its resilient outer edge deflect radially inwardly to permit fluid flow, under pressure differentials above a predetermined pressure, axially outwardly therepast. The intermediate flexible disc 42, when engaged with the intermediate chamber 22, that is, with the interior wall of the inner tubular portion 112, prevents fluid flow axially inwardly therepast through the intermediate chamber 22, however, is adapted to have its resilient outer edge deflect radially inwardly to permit fluid flow, under pressure differentials above a predetermined pressure, axially outwardly therepast.

The inner disc 40 has its outer periphery extending outwardly so as to engage the cylindrical inner wall of the support tube 170 so as to prevent fluid flow inwardly therepast. The other periphery of the inner sealing disc 40 is, however, sufficiently resilient that it can deflect radially inwardly away from the support tube 170 to permit fluid flow therepast outwardly. Similarly, the intermediate disc 42 has its resilient periphery extend outwardly and engage the cylindrical interior wall of the inner tubular portion 112 so as to prevent fluid flow inwardly therepast yet is sufficiently resiliently deflectable so as to permit fluid flow outwardly therepast.

The inner core 122 has the passageway 46 which is open at both an axial inner end and open at an axial outer end. The inner core 122 includes a cylindrical lower portion 123 which has a plurality of flutes at circumferentially spaced locations thereabout which effectively form with the outer casing 120 peripheral passageways 152 which extend axially. Passageways 152 are open to the outer compartment 66 between discs 42 and 44 at the inner ends of the passageways. At the outer ends, the passageways 152 join radial inlets 54 in the lower portion 123 which provide communication into the central passageway 46.

The piston 14 provides a central flow path for flow of fluids in the passageway 46, through the screens 56, 57 and 88 and, hence, through the smaller tube portion 136 to the outlet 48. The piston 14 provides another flow path for flow of fluid from the outer compartment 66 via openings 152, peripheral passageways 150 and inlets 54 into the passageway 46. This pathway permits fluid flow both inwardly and outwardly and is particularly adapted to receive any liquid which under gravity flows down to the lower and axially outermost portion of the outer compartment 66 where the openings 150 to the peripheral passageways 150 are provided.

Operation of the second embodiment of FIGS. 5 and 6, other than in respect of the air pump disc 180, is similar to that with the first embodiment of FIGS. 2 to 4.

In movement of the piston 14 in a withdrawal stroke from a retracted position as illustrated in FIG. 5 to the extended position illustrated in FIG. 6, of course, with the cover 107 shown in FIG. 5 having been removed, fluid between the inner disc 40 and the intermediate disc 42 is forced outwardly past the intermediate disc 42 because the volume between the discs 40 and 42 decreases with outward movement of the piston 14.

In the withdrawal stroke of the piston, atmospheric air is drawn inwardly via the outlet 48 and passageway 46 into the air chamber 186 and, at the same time, in between the intermediate disc 42 and the outer disc 44 via inlets 54 and passageways 152.

Air is drawn into the area between the larger diameter outer disc 44 and the smaller diameter intermediate disc 42 since the volume between the discs 42 and 44 increases as the piston 14 is drawn outwardly.

In a retraction stroke, the volume between the inner disc 40 and the intermediate disc 42 increases and since intermediate disc 42 prevents fluid flow outwardly therepast, a vacuum is created which deflects the inner disc 40 so as to draw fluid from the container as indicated by arrow 179 through inlet 178 and hence outwardly past the deflecting inner disc 40. In the retraction stroke, the volume between the outer disc 44 and the intermediate disc 42 decreases and, thus, any air or liquid therebetween is forced out passageway 152 and inlet 54 to pass outwardly through the passageway 46, through the screens to the outlet 48. At the same time in the retraction stroke, air from the air chamber 186 is forced outwardly via the passageway 46 to also pass outwardly through the screen 188.

Operation of the pump illustrated in FIGS. 5 and 6 will draw liquid out of a container creating a vacuum therein.

As shown in FIG. 5, the outer disc 44 includes a resilient sealing flange 130 which is formed as a thin resilient flange having an elastically deformable edge portion near the side wall 36 of the outer chamber 24. This edge portion of the sealing flange 130 is deflectable radially inwardly so as to permit, under a sufficiently high vacuum differential, air to flow axially inwardly therepast. Preferably, the piston 14 may be configured such that substantially all air to be drawn inwardly is drawn inwardly via the outlet 48, however, a device could be arranged such that the restriction to flow through the screens 56, 57 and 188 is such that some proportion or substantially all the air is drawn past the sealing flange 130. The locating flange 128 on the outer disc 44 is preferably provided to permit fluid flow therepast but could be configured to prevent fluid flow inwardly and/or outwardly. Other embodiments are possible in which a one-way valve mechanism is provided in outlet tube 136 which prevents flow back through the outlet 48.

In sliding of the piston 14 in an extension stroke from the retracted position shown in FIG. 5 towards an extended position, fluid, notably air from the outlet 48 but also possibly liquid and/or foam in the outlet tube 136 and passageway 46, is drawn upwardly into the air chamber 186 at the same time as liquid, foam and/or air is drawn into the lower compartment 66. In sliding of the piston 14 from in a retraction stroke to the extended position to the retracted position, air and/or other foam or fluid in the air chamber 186 is pressurized and forced outwardly through the passageway 46 through the screens. The air pump disc 180 provides for inhalation and expulsion of fluids, notably air, in addition to the quantities of fluid inhaled and expulsed by the remainder of the pump assembly and, thus, the air pump disc 180 increases the volume of air which is available to be forced through the screens to produce foam. The configuration shown has an air pump 179 comprising the air chamber-forming member 172 and the air pump disc 180 inward from the remainder of the pump assembly 10 and of a diameter not exceeding that of the outer tubular portion 108. This is an advantageous configuration to provide additional air pumping capacity with the same piston stroke in a device which can be inserted into the mouth of a reservoir.

The inner disc 40 and intermediate disc 42 form a first stepped pump. The intermediate disc 42 and the outer disc 44 form a second stepped pump, out of phase with the first pump. The air pump 179 is in phase with the second pump and out phase with the first pump.

FIG. 5 shows, in addition to the two screens 56 and 57 to produce foam, a three-dimensional basket-like screen 188 having generally frustoconical walls with small openings therethrough as in the manner of known filter members. Only one of the three screens needs to be provided. Other porous members to produce foam may be used.

In FIGS. 5 and 6, only one passageway 152 and inlet 54 is shown to provide communication from the outer compartment 66 to the passageway. Other passageways may be provided to provide communication from the outer compartment 66 to the passageway 46.

It is to be appreciated that the nature of the liquid to be dispensed including its viscosity and flow characteristics will be important in order for a person skilled in the art to make suitable selection of the relative sizes and dimensions and resistance to flow provided by the various passageways, inlets, outlets and screens and/or past the various discs. As well, the quantity of liquid desired to be dispensed in each stroke will have a bearing on the relative proportion and sizing of the components including particularly the inner compartment 64, outer compartment 66 and the axial length of a stroke of the piston.

In the preferred embodiments, the engagement disc 62 is provided on the piston 14 for engagement to move the piston inwardly and outwardly. It is to be appreciated that various other mechanisms can be provided for engagement and movement of the piston relative the body 12.

The preferred embodiments show dispensers for passing liquid and air through screens 56, 57 and 188 to dispense the liquid as a foam. The screens 56, 57 and 188 can be eliminated in which case the dispenser illustrated could serve to dispense liquid with air. The foaming screens could be replaced by another orifice device such as an atomizing nozzle to produce a mist or spray.

The preferred embodiments of the invention show passages for dispensing of the air and/or liquid as being provided internally within a piston. Such an arrangement is believed preferred from the point of view of ease of construction of the pump assembly 10. However, it is to be appreciated that passageways for dispensing the liquid and/or foam may be provided, at least partially, as part of the body 12 or removably mounted to the body 12.

In accordance with the preferred embodiment illustrated, the relative buoyancy of air within the liquid and, hence, the separation of air and liquid due to gravity are utilized as, for example, to permit air in the compartment 64 to flow upwardly into the reservoir 60 and liquid in the reservoir 60 to flow downwardly into the inner compartment 64 as, for example, when the inner compartment 64 is open to the reservoir. It is to be appreciated, therefore, that the pump assembly in accordance with the presence invention should typically be disposed with what has been referred to as the inner end of the pump assembly at a height above the height of the outer outlet end.

Figure 7:
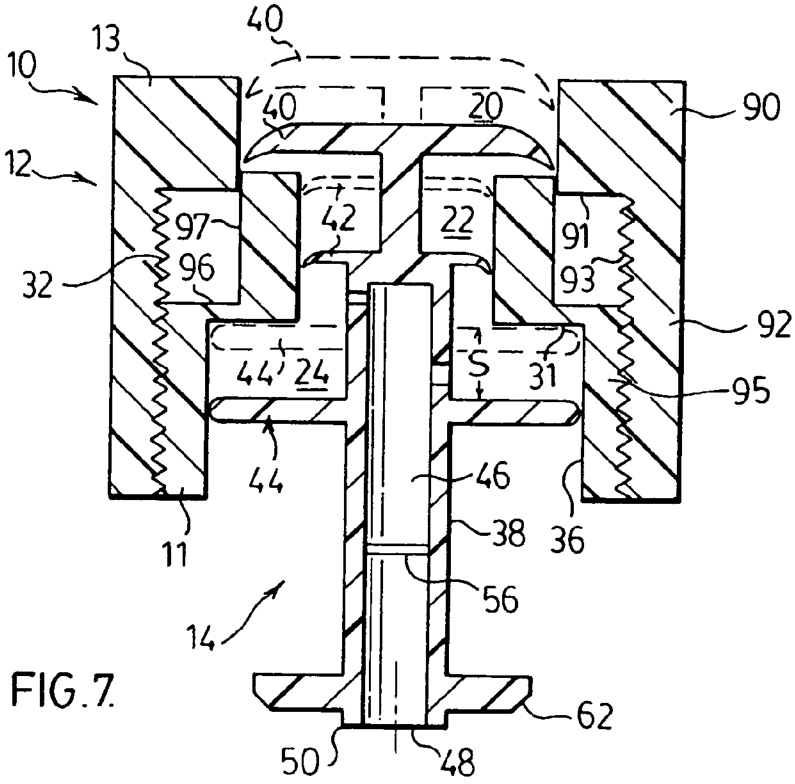
FIG. 7 is a cross-sectional side view of a pump assembly in accordance with a third embodiment of the present invention showing the piston in a fully extended position in solid lines and in a fully retracted position in dashed lines.
Figure 8:
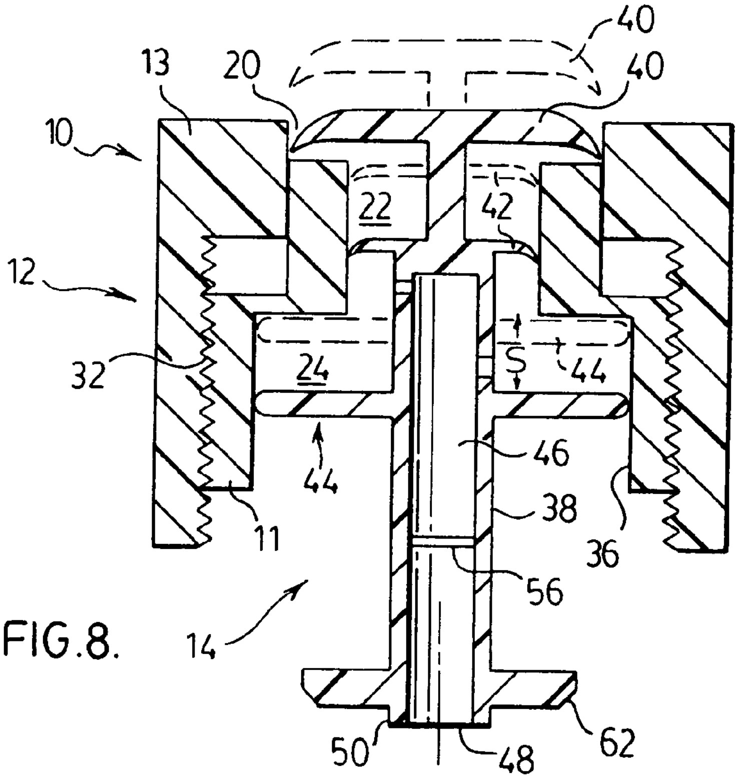
FIG. 8 is the same side view as in FIG. 7 but showing the pump with the inner chamber axially reduced in length axially.

Reference is made to FIGS. 7 and 8 which show a third embodiment of a pump assembly in accordance with the present invention. The pump assembly of the embodiment of FIGS. 7 and 8 is identical to the embodiment of FIGS. 2 to 4, however, the piston chamber forming body 12 is formed of two separate members, an outer body member 13 and an inner body member 11 which are adapted to move axially relative to each other. In this regard, the outer body member 11 is an annular ring which is circular in cross-section and has a radially inwardly extending flange 90 at its inner end which defines the cylindrical chamber side wall 30 of the inner chamber 20. The flange 90 ends at a shoulder 91 with the outer body member 13 extending axially therefrom as a ring-like portion 92 whose radially inwardly directed surface carries threads 93. The inner body member 11 is an annular member which is circular in cross-section and defines internally thereof the intermediate chamber 22 and the outer chamber 24. As well, the inner body member 11 carries and defines the shoulder 31 which forms an outer end of the inner chamber 20. The inner body member 11 has a lower portion 95 carrying a cylindrical outer surface which is threaded with threads which match with and engage the threads on the outer body member 13 such that relative rotation of the body members 11 and 13 will axially move the body members 11 and 13 relative to each other. The inner body member 11 has a shoulder 96 on its outside surface in opposed relation to the shoulder 91 on the outer body member 11. Inward of the shoulder 96, the inner body member 11 has a circumferential outer wall 97 which is adapted to sealably engage with a radially inwardly directed cylindrical wall 30 of the flange 90 of the outer body member 13 so as to form a seal therebetween. As to be seen in the comparison between FIGS. 7 and 8, with relative axial movement of the inner body member 11 and outer body member 13, the axial extent of the outer chamber 20 may be varied, however, the intermediate chamber 22 and the outer chamber 24 are not changed. The embodiment of FIG. 7 shows an arrangement in which the piston 14 moves through the stroke indicated being an axial distance represented by the letter S. In the fully retracted position as illustrated in dotted lines in FIG. 7, the inner disc 40 is intended to be maintained in a sealed condition with the side walls of the inner chamber 20 thus preventing fluid flow outwardly therepast. The volume of fluid which will be drawn from the reservoir in each cycle of the piston will be determined by the length of the stroke times the difference in the cross-sectional area between the inner chamber 20 and the intermediate chamber 22. Referring now to FIG. 8, the axial extent of the inner chamber 20 has been reduced. The stroke of the piston in FIG. 8 is the same as in FIG. 7 and is also indicated by S. However, in each complete cycle of the piston, the volume of fluid to be drawn from the reservoir is represented merely by the axial extent of the inner chamber 20 that the inner disc 40 is in sealed engagement therewith which is merely a fraction of the axial extent that the inner disc is in sealed engagement with the inner chamber in FIG. 7. Thus, it is to be appreciated, that by axial movement of the inner chamber member 11 relative to the outer chamber member 13, the amount of fluid dispensed in each complete stroke can be varied, however, since the displacement of the pump between the intermediate disc 42 and outer disc 44 has not changed, effectively, the relative volume of liquid dispensed to air dispensed in each stroke can be varied for a constant length stroke of the piston.

Referring to FIG. 8, it is to be appreciated that when the inner disc 20 is inwardly of the inner chamber 20 such that the inner disc 40 is no longer in engagement with the inner chamber 40, then the inner disc 20 does not prevent fluid flow from the reservoir into or out of the inner chamber 20.

Figure 9:
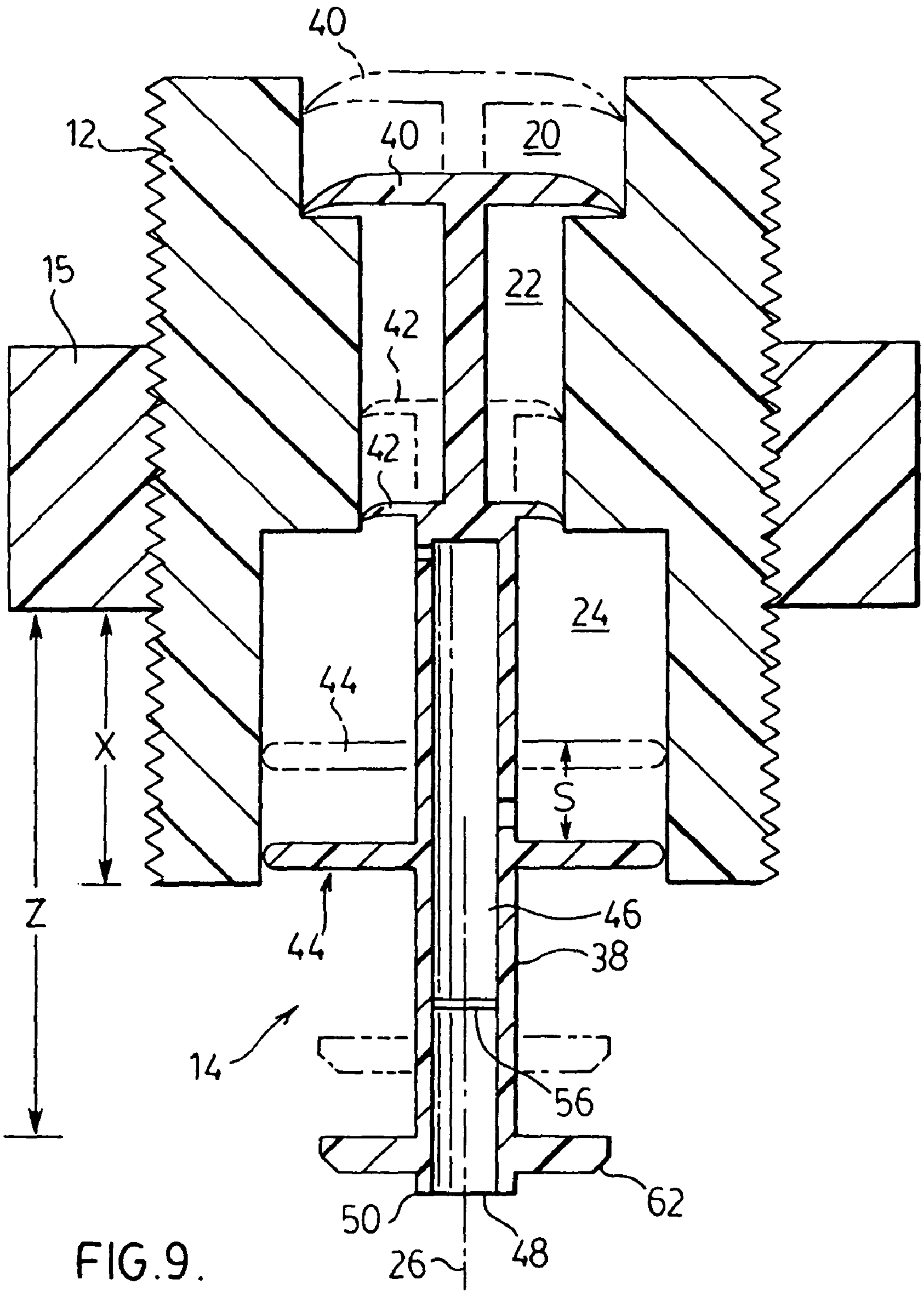
FIG. 9 is a cross-sectional side view of a pump assembly in accordance with a fourth embodiment of the present invention showing the piston in a fully extended position in solid lines and a fully retracted position in dashed lines.
Figure 10:
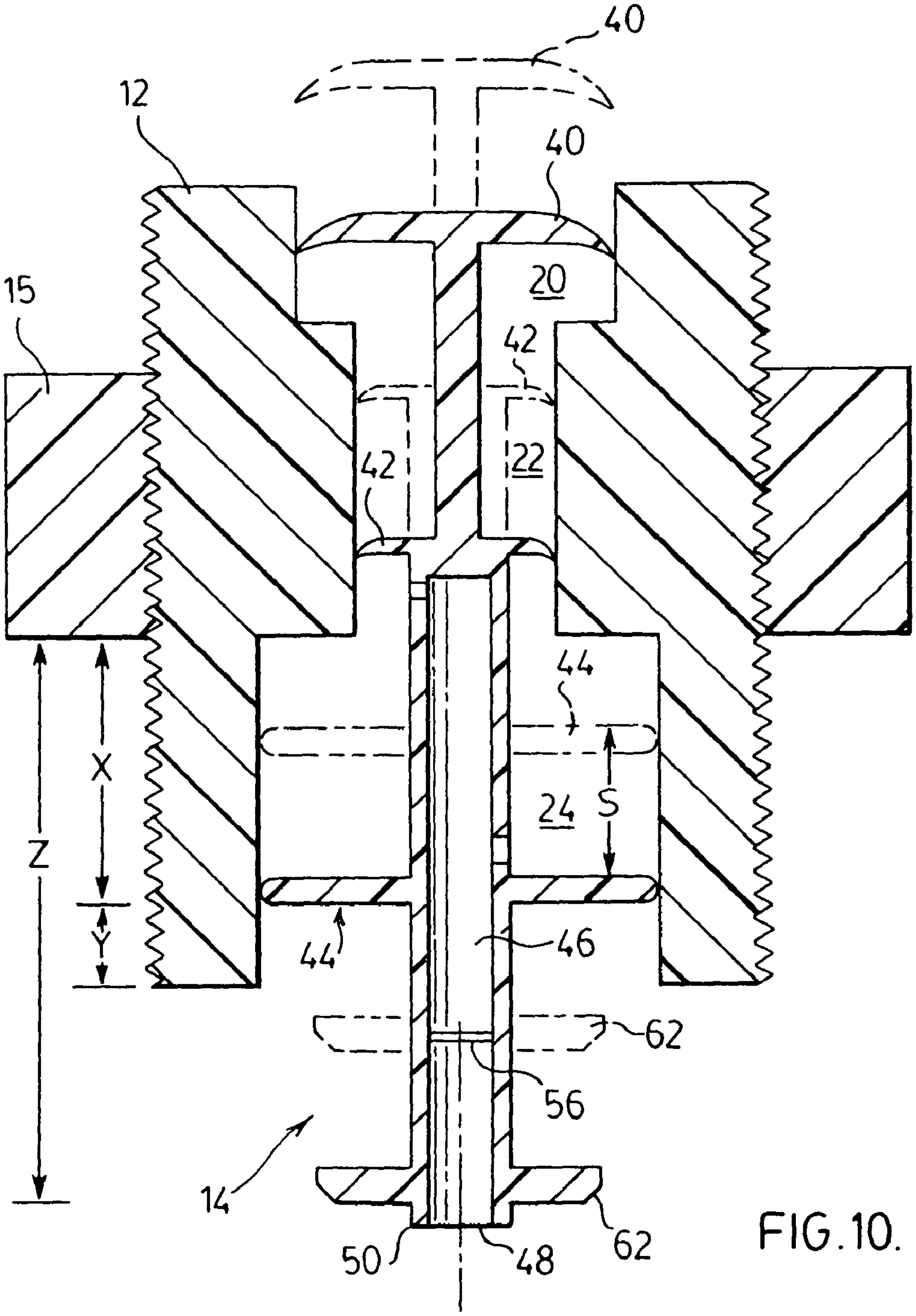
FIG. 10 is the same side view as in FIG. 9 but showing the pump with the piston chamber forming body axially displaced outwardly compared to FIG. 9.

Reference is made to FIGS. 9 and 10 which illustrate a fourth embodiment of the present invention. The piston 14 and body 12 in FIGS. 9 and 10 have identical features to those illustrated in the first embodiment of FIGS. 2 to 4, however, with different proportions in the axial direction and with the cylindrical outer surface of the body 12 threaded so as to threadably engage with an annular support ring 15 which carries mating threads on its cylindrical interior surface. The support ring 15 is to be located in a fixed position relative to the support plate 84 of the dispenser as shown in FIG. 1 such that the support ring 15 will be in a fixed position relative to the lever 88. By rotating the body 12 about its axis, the axial, that is, vertical location as seen in FIG. 1, of the body 12 can be varied. However, with the lever 88 fixed in position relative to the support ring, it follows that the piston 14 which is held by the lever 88 is held in a fixed position relative to the support ring 15.

Referring to FIG. 9, the position of the piston 14 is illustrated in an extended position in solid lines and in a retracted position in dotted lines. The movement of the piston axially from the extended position to the retracted position is the axial length of a single stroke of constant fixed length indicated as S. In FIG. 9, during the entire stroke, the inner disc 40 is retained within the inner chamber 20.

Referring to FIG. 10, FIG. 10 illustrates a position in which the body 12 has been moved axially outwardly relative to the support ring 15. As shown, in comparing FIGS. 9 and 10, in FIG. 9, the body 12 extends from the support ring 15 a distance X whereas in FIG. 10, the body 12 extends from the support ring a distance equal to X plus Y. In each of the embodiments, the axial distance of the engagement flange 62 from the ring support 15 is a constant distance represented as Z. In the embodiment of FIG. 10, in the retracted position, the inner disc 40 is axially inwardly of the inner chamber 20 and thus does not prevent flow of liquid from the reservoir inwardly or outwardly of the inner chamber 40. In a cycle of the piston 14 in FIG. 10 through a constant stroke indicated as S, there is effectively pumping for an axial distance that the inner disc 20 passes from first coming to seal the inlet end of the inner chamber 40 to the position of the inner disc 20 in the extended position of the stroke indicated in solid lines in FIG. 10.

In describing FIGS. 9 and 10, the position of the piston 14 in a retracted position is defined as an indexing position. From this indexing position, the piston 14 is moved in each stroke relative to the body 12 to the extended position and then back to the indexing (retracted) position. In the pump of FIGS. 9 and 10, FIG. 9 illustrates the pump 10 in a first indexing condition with the piston 14 having a first indexing position relative to the body 12. In a cycle of operation involving one retraction stroke and one extension stroke, for a fixed length of stroke indicated as S, a first fixed volume of fluid is drawn from the reservoir and displaced past the intermediate disc 22. The pump is capable of assuming other indexing configurations such as the one indicated in FIG. 10 in which the piston is in a different indexing position than the indexing position of FIG. 9. For the same fixed length stroke of the piston, the volume of liquid discharged past the intermediate disc 22 is equal to a different amount having regard to the relative proportion of the stroke that the inner disc 40 engages the inner chamber 20 to prevent fluid flow inwardly therepast. The axial movement of the body 12 relative to the support ring 15 provides an indexing adjustment mechanism to change the indexing position of the piston 14 so as to change the volume dispensed.

Figure 11:
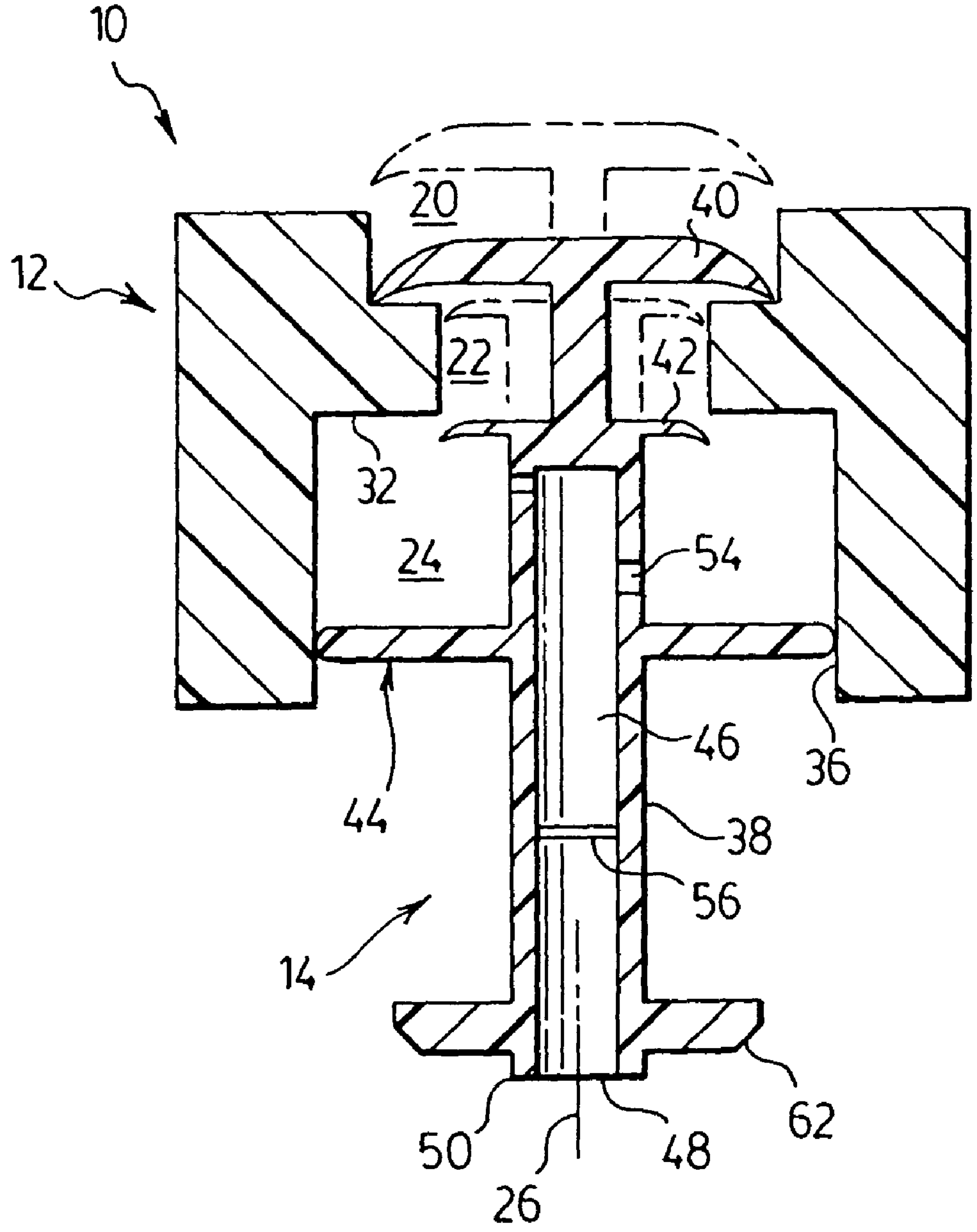
FIG. 11 is a cross-sectional side view of a pump assembly in accordance with a fifth embodiment of the present invention showing the piston in a fully extended position in solid lines and a retracted position in dashed lines.

Reference is now made to FIG. 11 which shows a fifth embodiment of the present invention with the piston 14 in a fully extended position in solid lines in a fully retracted position in dashed lines. The piston 14 is identical to the piston of the embodiment of FIGS. 2 to 4. The body 12 is similar, however, the axial length of the inner chamber 20 and the intermediate chamber 22 have been reduced. As seen in the extended position in solid lines, the intermediate disc 42 extends outwardly beyond the intermediate chamber 22 and the inner disc 40 is engaged in the inner chamber 20. In the extended position, air from outer chamber 24 may flow inwardly past the intermediate disc 42 to between the intermediate disc 42 and the inner disc 40 and fluid may flow outwardly past the intermediate disc 42. When in the retracted position as illustrated in dashed lines, the inner disc 40 is inwardly beyond the inner chamber 20 and the intermediate disc 42 is engaged in the intermediate chamber 22. Air which may be between the intermediate disc 42 and the inner disc 40 may, under gravity, move upwardly so as to enter a bottle or other reservoir disposed above the pump 10, and fluid from the reservoir may flow downwardly to fill the inner chamber 40. This configuration can have the advantage of being capable of being used with a non-collapsible, rigid container so as to provide an allotment of air into a reservoir in each stroke which can assist in preventing a vacuum from being developed inside the reservoir. The pump of FIG. 11, in fact, can positively pump air into the reservoir. The extent to which either the inner disc 40 extends inwardly past the inner chamber 20 and the extent the intermediate disc 42 extends outwardly past the intermediate chamber 22 can assist in determining the amount of air that may pass upwardly into the reservoir.

Figure 12:
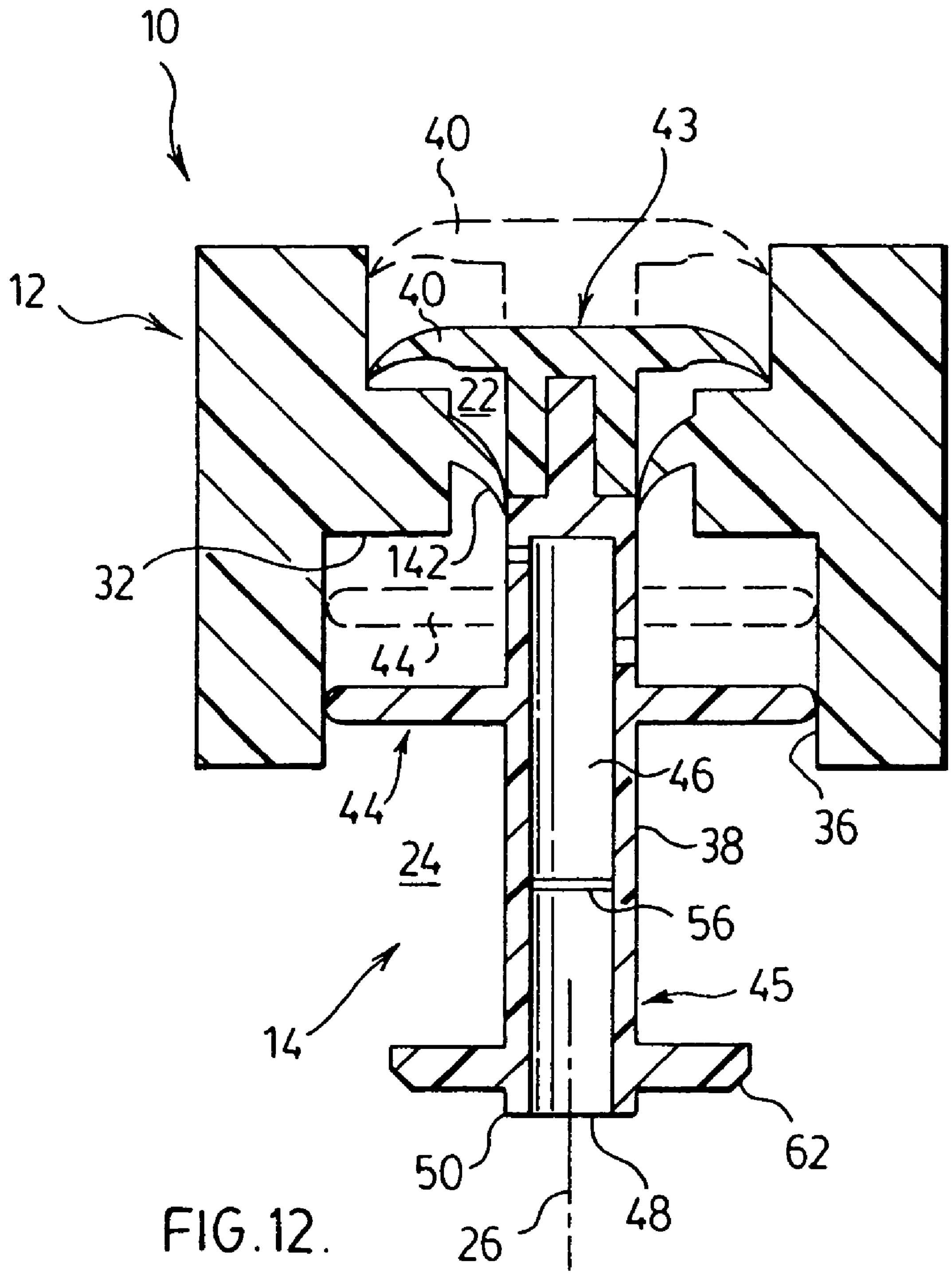
FIG. 12 is a cross-sectional side view of a pump assembly in accordance with a sixth embodiment of the present invention showing the piston in a fully extended position in solid lines and a retracted position in dashed lines.

Reference is made to FIG. 12 which shows a sixth embodiment of the present invention with the piston 14 in a fully extended position in solid lines and in a retracted position in dashed lines. The pump assembly 10 of FIG. 12 is the same as that of FIGS. 2 to 4 but modified to remove the intermediate disc 42 from the piston 14 and to provide an equivalent flexible annular intermediate disc or flange 142 to extend inwardly from the body 12 within the intermediate chamber 22. In this regard, the piston 14 has its stem 38 to be of a constant diameter between the inner disc 40 and the outer disc 44. The piston 14 is also shown to be constructed of two parts, an inner portion 43 carrying the inner disc 42 and an outer portion 45 carrying the outer disc 44.

The intermediate flange 142 extends radially outwardly and downwardly and has a flexible outer periphery which engages the stem 38 between the inner disc 40 and the outer disc 44 to prevent fluid flow inwardly therepast yet which is resiliently deflectable radially outwardly to permit fluid flow outwardly therepast. In each of the embodiments of FIGS. 1 to 11, the intermediate disc 42 may be replaced by an intermediate flange 142 as in FIG. 12. Similarly, in each of the embodiments of FIGS. 13 to 17, the inner disc 40 may be replaced by a similar intermediate flange to extend inwardly from the inner chamber 20.

FIGS. 1 to 12 illustrate a first version of the invention in which the inner chamber 20 is of a greater diameter than the intermediate chamber 22 and the intermediate chamber 22 is of a greater diameter than the outer chamber 24.

Figure 13:
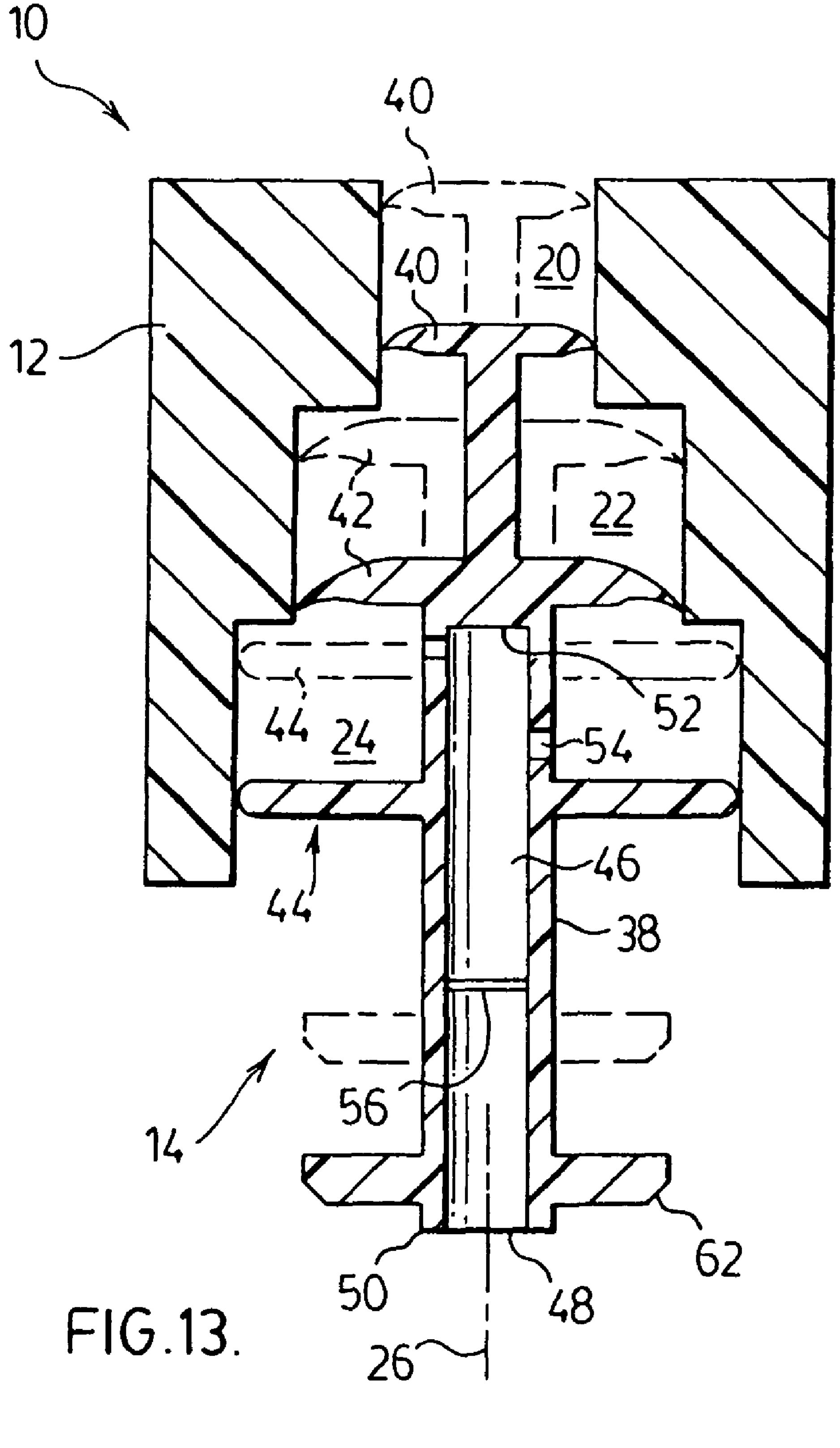
FIG. 13 is a seventh embodiment of the pump in accordance with the present invention showing a piston in an extended position in solid lines and in a retracted position in dashed lines.

Reference is now made to FIGS. 13 to 17 which illustrate a second version of the pump assembly of the invention in which the inner chamber 20 is of a smaller diameter than the intermediate chamber 22 and the intermediate chamber 22 is of a smaller diameter than the outer chamber 24. The piston illustrated in each of FIGS. 13 to 17 has components identical to the components illustrated in FIGS. 2 to 4, however, with a notable difference that the inner disc 40 is smaller than the intermediate disc 42. FIG. 13 illustrates a seventh embodiment of the invention in which the inner disc 40 and the intermediate disc 42 form a first stepped pump and the intermediate disc 42 an the outer disc 44 form a second stepped pump. The two stepped pumps are in phase in a sense that both operate to discharge fluid outwardly on a retraction stroke and to draw fluid in between their respective discs on an extension stroke. In an extension stroke, the inner pump effectively serves to draw liquid from the reservoir and between the inner disc 40 and the intermediate disc 42 and to discharge it past the intermediate disc 42 between the intermediate disc 42 and the outer disc 44. The second pump serves to draw air inwardly into between the intermediate disc 42 and the outer disc 44 in a withdrawal stroke and to discharge liquid and air outwardly through the outlet 48 in a retraction stroke.

Figure 14:
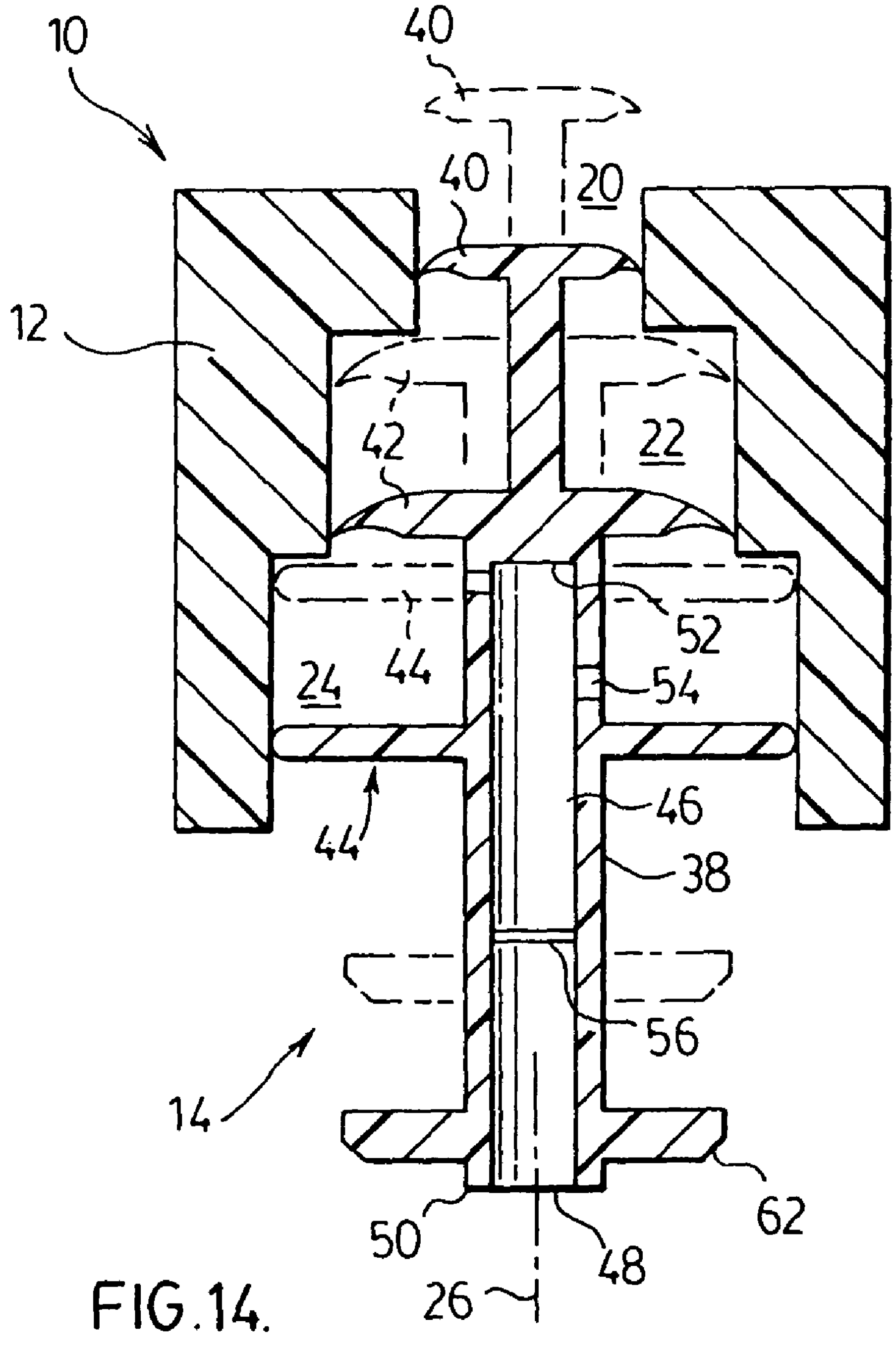
FIG. 14 is a eighth embodiment of the pump in accordance with the present invention having similarities to FIG. 13 and showing the piston in a fully extended position in solid lines and a fully retracted position in dashed lines.

Reference is made to FIG. 14 which illustrates an eighth embodiment of the invention which is identical to the embodiment shown in FIG. 13 with the exception that the axial length of the inner chamber 20 is reduced to an extent that in the retracted position illustrated in dashed lines in FIG. 14, the inner disc 40 extends inwardly beyond the inner chamber 20. In the embodiment of FIG. 14, compared to that of FIG. 13, the fluid drawn from the reservoir in each cycle of the piston, will be reduced having regard to the axial extent in each stroke that the inner disc 40 is in engagement with the inner chamber 20.

Figure 15:
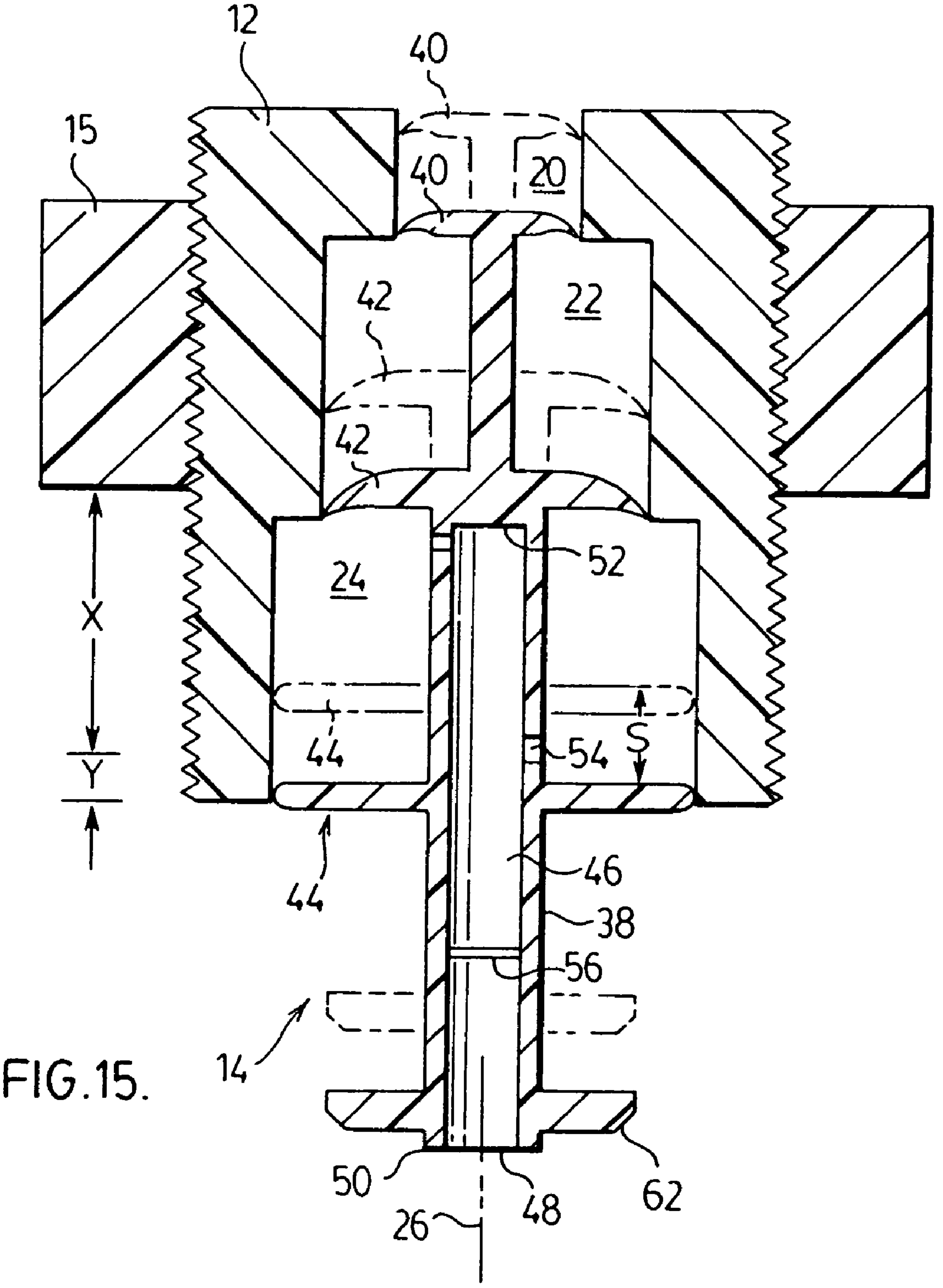
FIG. 15 is an ninth embodiment of the pump in accordance with the present invention having similarities to the pump of FIG. 14 showing the piston in a fully extended position in solid lines and a fully retracted position in dashed lines.
Figure 16:
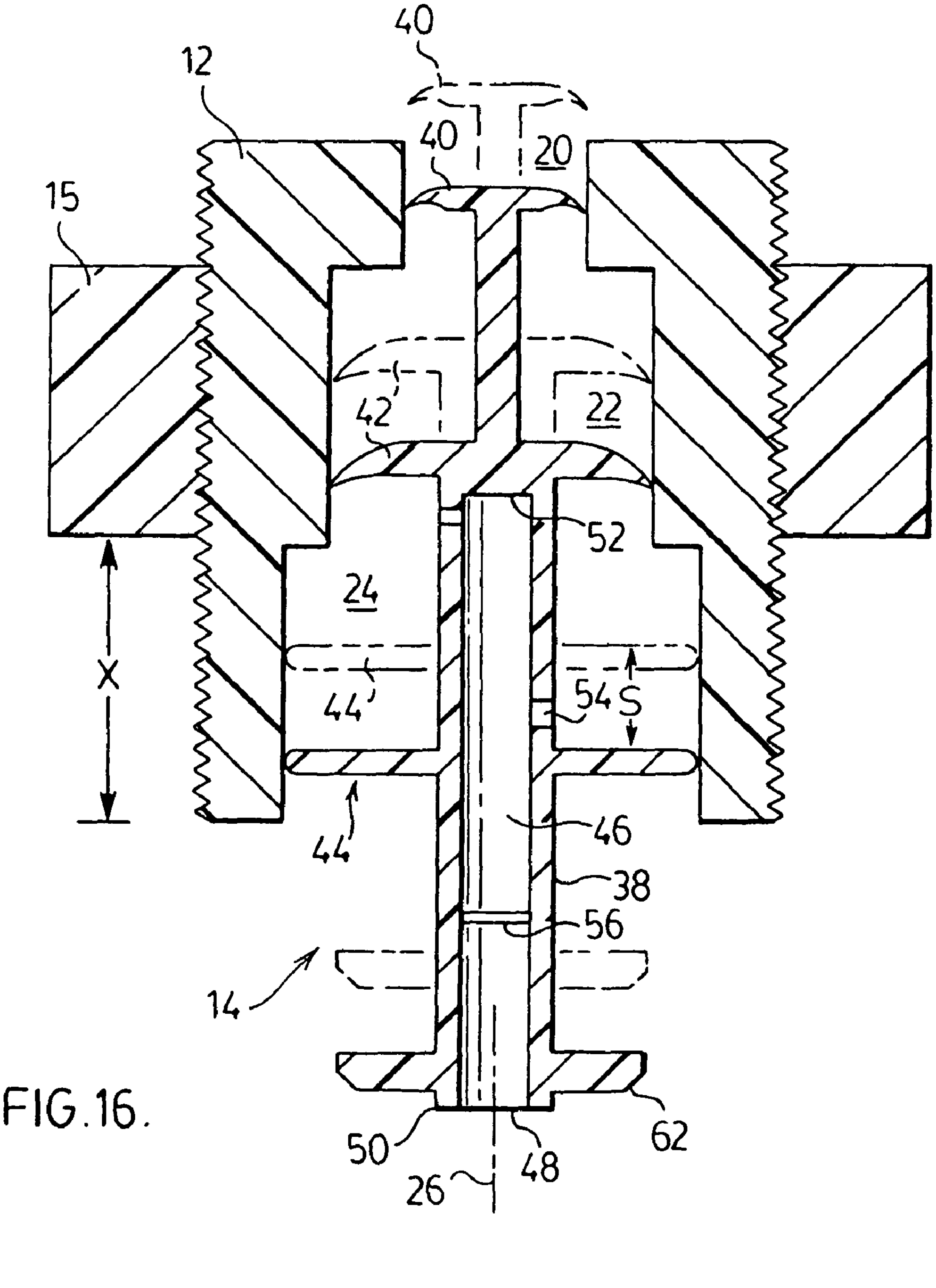
FIG. 16 is the same as FIG. 15, however, with the body axially displaced compared to that shown in FIG. 15 showing the piston in a fully extended position in solid lines and a fully retracted position in dashed lines.
Figure 17:
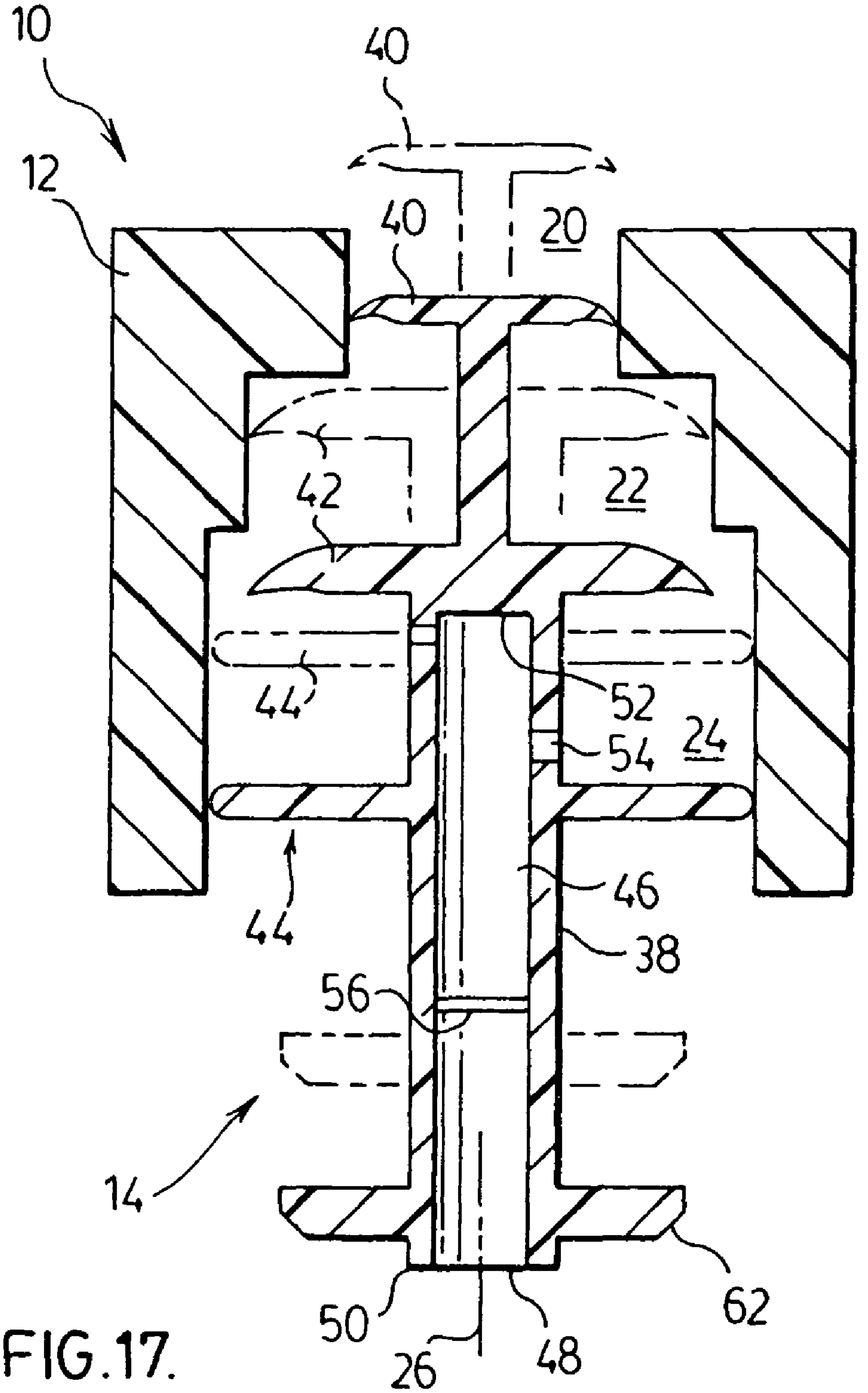
FIG. 17 is a tenth embodiment of the invention having similarities to that illustrated in FIG. 14 showing the piston in a fully extended position in solid lines and a fully retracted position in dashed lines.

FIGS. 16 and 17 illustrate a ninth embodiment of the second version of the pump having an arrangement similar to that illustrated in FIGS. 9 and 10 of the first version with the body 12 being elongated and threadably received within a locating ring 15 such that relative axial displacement of the body 12 relative to the ring 15 will vary the volume of liquid that is drawn into the pump from the reservoir in each cycle of the pump. In comparison of FIG. 15 to FIG. 16, with the ring support member 15 fixed relative to the dispenser support member 84 and the pivot point of the lever 88, the body 12 is moved inwardly from the position of FIG. 15 to the position of FIG. 16 by an axial distance equal to Y. Each of FIGS. 15 and 16 show movement of an identical piston through an identical equal stroke distance indicated S.

Reference is made to FIG. 17 which illustrates a tenth embodiment similar to FIG. 14, however, in this embodiment not only in the retraction position is the inner disc 40 inward of the inner chamber 20 but, in addition, in the withdrawal position, the intermediate disc 42 is outward of the intermediate chamber 22. The embodiment of FIG. 17 can be used with a non-collapsible bottle in that in each stroke, some quantity of air can be permitted to pass firstly when the pump is in the extended position from between the outer disc 44 and the intermediate disc 42 inwardly past the intermediate disc 42 and, subsequently, when the piston is in the retracted position to pass from between the intermediate disc 42 and the inner disc 40 to past the inner disc 40 and into the reservoir. Relative selection of when each of the discs 40 and 42 come to disengage from their respective chamber and their relative sizes of the different chambers can be used to determine the amount of air which may be permitted to be passed back into a reservoir in any stroke. Preferably, as shown, at all times, at least one of the inner disc and the intermediate disc 44 are in engagement with their respective chamber to prevent fluid flow outwardly.

Figure 18:
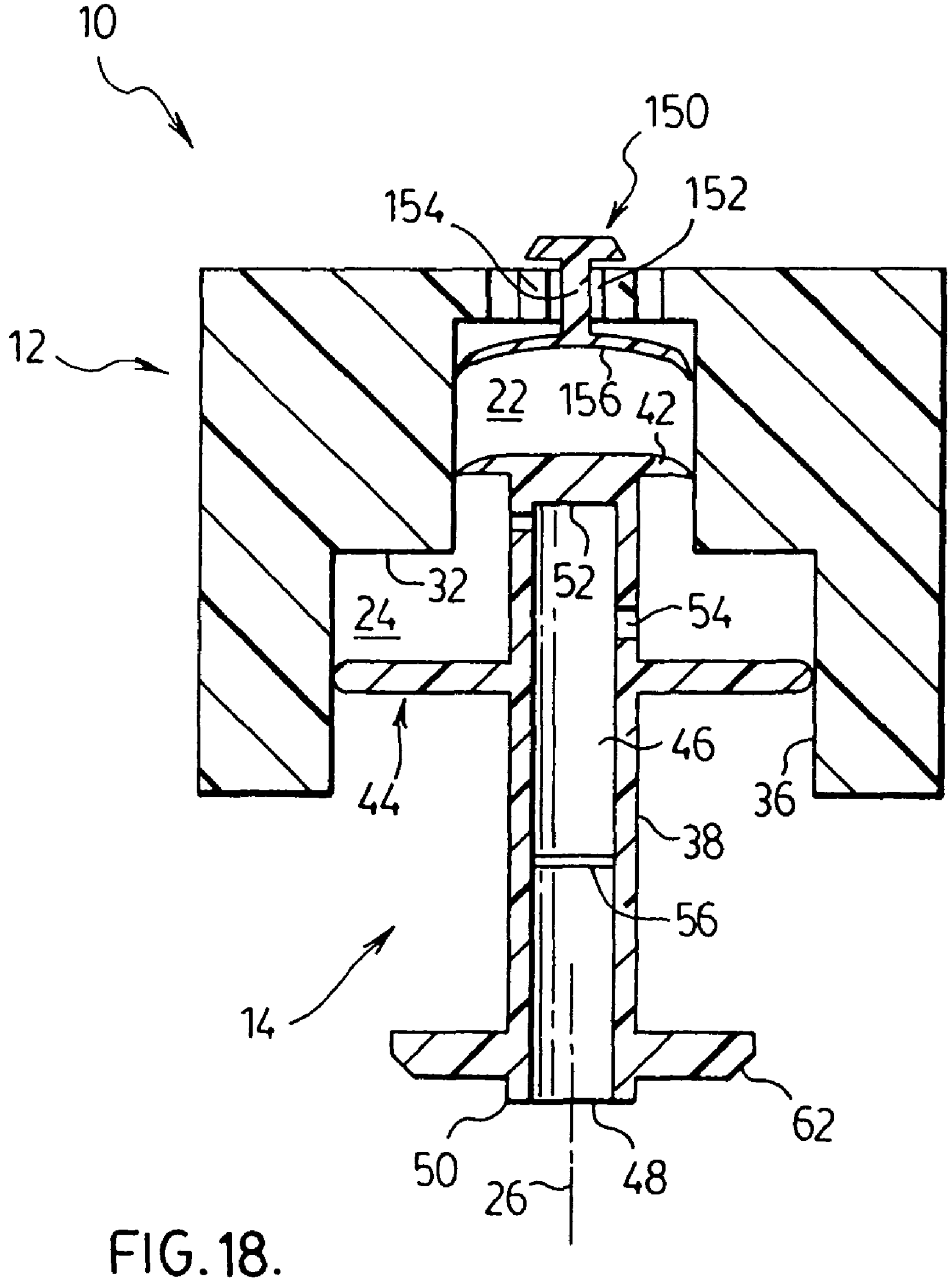
FIG. 18 is an eleventh embodiment of the invention and showing the piston in a fully extended position in solid lines and a fully retracted position in dashed lines.

Reference is made to FIG. 18 which shows a third version of the pump assembly of the invention in which, while similar to the first and second versions, the outer chamber 24 is larger than chamber 42 intermediately inwardly therefrom. Rather than providing a one-way valve mechanism for one way flow inwardly from the reservoir to the chamber 42, such as the inner disc 40 in an inner chamber in the case of FIGS. 1 to 17, a one-way valve 150 is provided in an inlet port 152 to the chamber 42. Valve 150 has a stem 154 which carries an inner valve disc 156 which extends radially outwardly from the stem 154 to engage the side wall of the chamber 42. The valve disc 156 has a resilient outer perimeter which is directed outwardly and engages the chamber 42 to prevent fluid flow therepast inwardly yet deflects radially inwardly to prevent fluid flow outwardly therepast. Similar such one-way valves could be used in replacement of the inner disc 40 in the embodiments of FIGS. 13 to 17.

Figure 19:
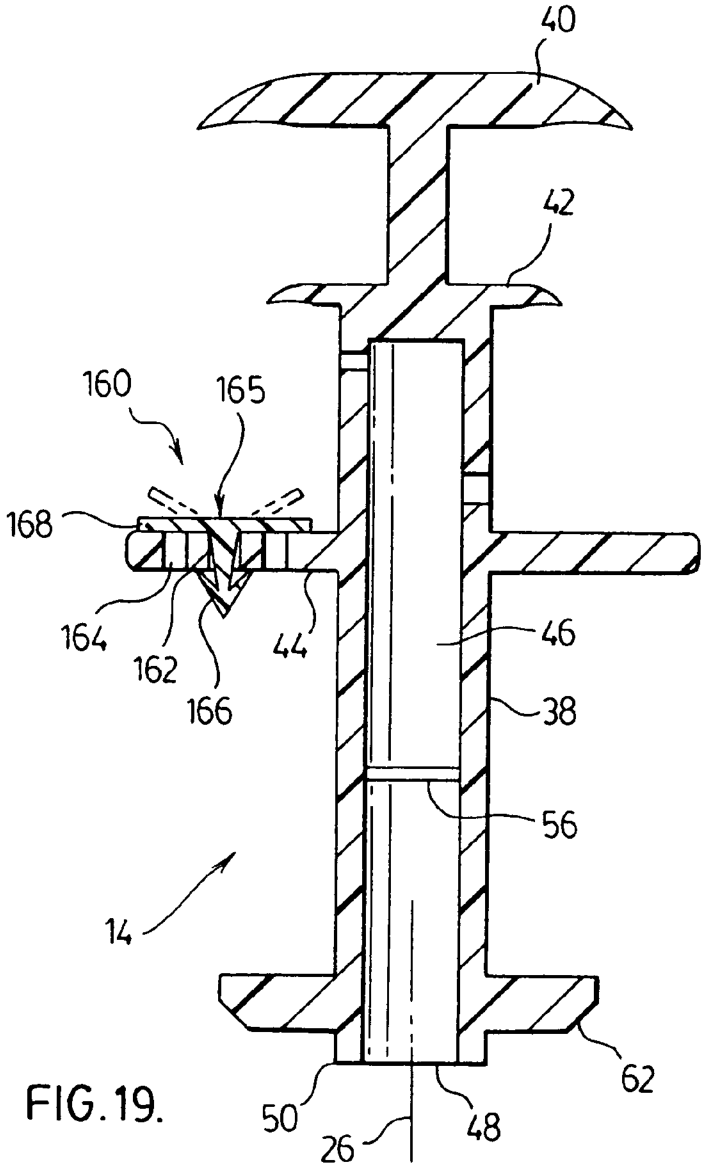
FIG. 19 is a cross-sectional side view of the first alternate piston for use in the embodiment of FIGS. 2 to 4.

Reference is made to FIG. 19 which illustrates a first alternate form of a piston 14 adapted for substitution of the piston 14 in the embodiment of FIGS. 2 to 4. Piston 14 as shown in FIG. 19 is identical to that shown in FIGS. 2 to 4, however, includes a one-way valve 160 provided on the outer disc 44 and adapted to provide for fluid flow inwardly through the outer disc 44 and to prevent fluid flow outwardly. In this regard, the disc 44 is provided with a center opening 162 therethrough and a pair of openings 164 on either side of the center opening. A valve member 165 has a stem with an arrow-like head 166 which is adapted to pass through the center opening and secure the valve member therein against removal. The valve member includes an inner flexible disc member 168 which inherently assumes a flat condition to overlie and close the openings 162 and 164, however, which is resiliently deflectable so as to deflect to the positions illustrated in dashed lines in FIG. 19 so as to permit air flow inwardly through the opening as when, in an extension stroke, a pressure differential is created as a result of creating a vacuum inside the outer chamber 44. Thus, on an extension stroke, atmospheric air may flow into the outer chamber 24 through the one-way valve 165 provided in the outer disc 44. However, on a retraction stroke on moving of the piston 14 inwardly, the one-way valve 165 prevents fluid flow outwardly through the one-way valve.

Figure 20:
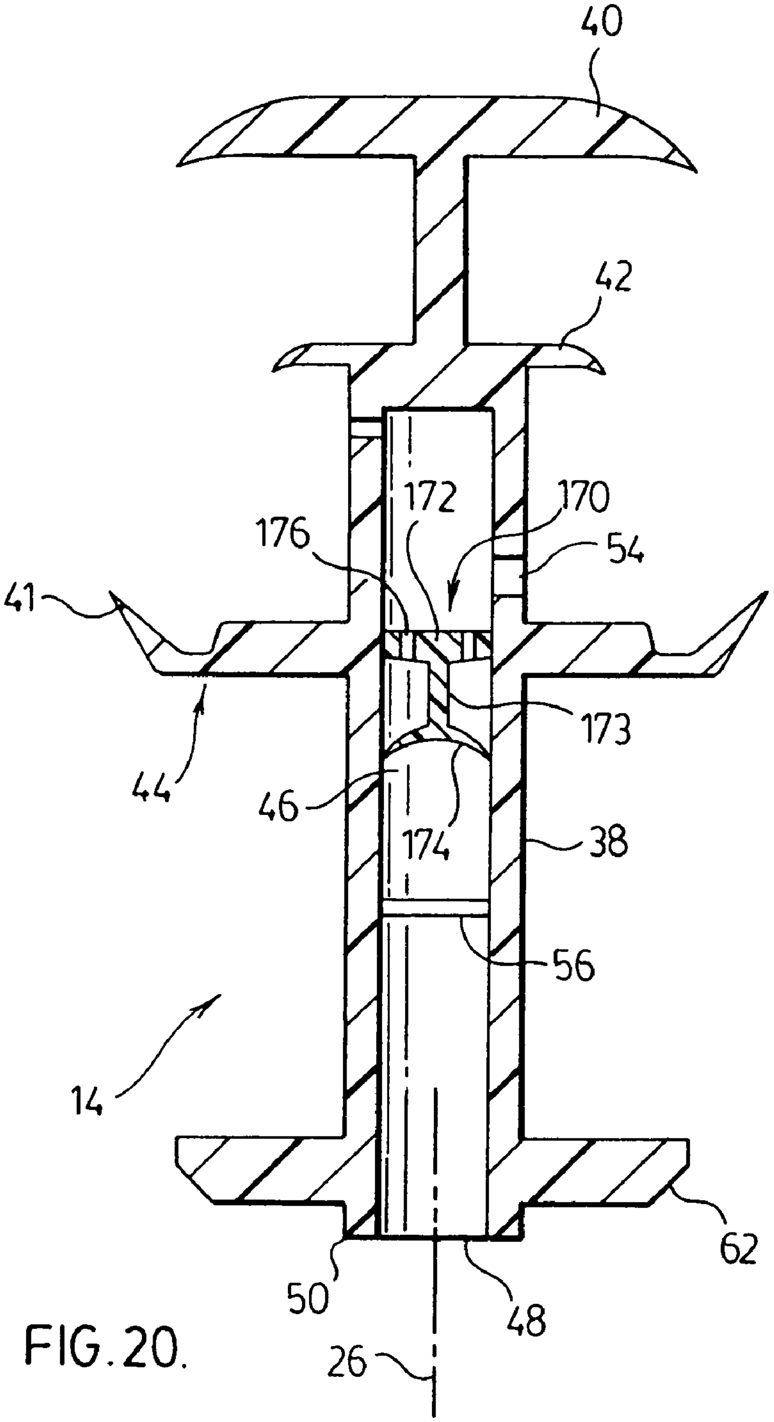
FIG. 20 is a cross-sectional side view of a second alternate embodiment of a piston for use with the embodiment of FIGS. 2 to 4.

Reference is made to FIG. 20 which shows a second alternate form of a piston 14 for use in the embodiment of the piston assembly shown in FIGS. 2 to 4. The second alternative shown in FIG. 20 is identical to that shown in FIGS. 3 and 4 with the exception that the outer disc 44 is provided with an inwardly directed resilient inner periphery 41 which is adapted to engage the wall 36 of the outer chamber 24 so as to prevent fluid flow outwardly therepast yet which is adapted to deflect radially inwardly so as to permit atmospheric air to flow past the outer disc 44 on the piston 14 moving outwardly. The second alternative piston 14 of FIG. 20 also includes a one-way valve 170 provided internally within the passageway 46 between the inlet 54 and the screen 56. This valve 170 has an inner securing disc 172 frictionally received in the passageway 46 against movement. A stem 173 extends axially from the disc 172 and carries a resilient outwardly directed flexible disc 174. The securing disc has openings 176 therethrough permitting passage. The flexible sealing disc 174 has a resilient outer periphery which is adapted to engage the inner surface of the passageway 46 to prevent fluid flow inwardly therepast yet is adapted to deflect radially inwardly so as to permit fluid flow outwardly through the passageway 46. In use of a piston as illustrated in FIG. 20, the one-way valve 170 inside the stem 38 substantially prevents any fluid flow back into the outer chamber 24 in an extension stroke such that effectively all air to be drawn into the outer chamber 24 in the extension stroke must be drawn past the deflecting outer periphery of the outer disc 44. As a further embodiment, the interior one-way valve 170 is not provided and, thus, in the extension stroke, there may be draw back of air and foam through the screen 56 as well as drawing of air into the chamber 24 by reason of deflection of the resilient periphery 41 of the outer disc 44.

Figure 21:
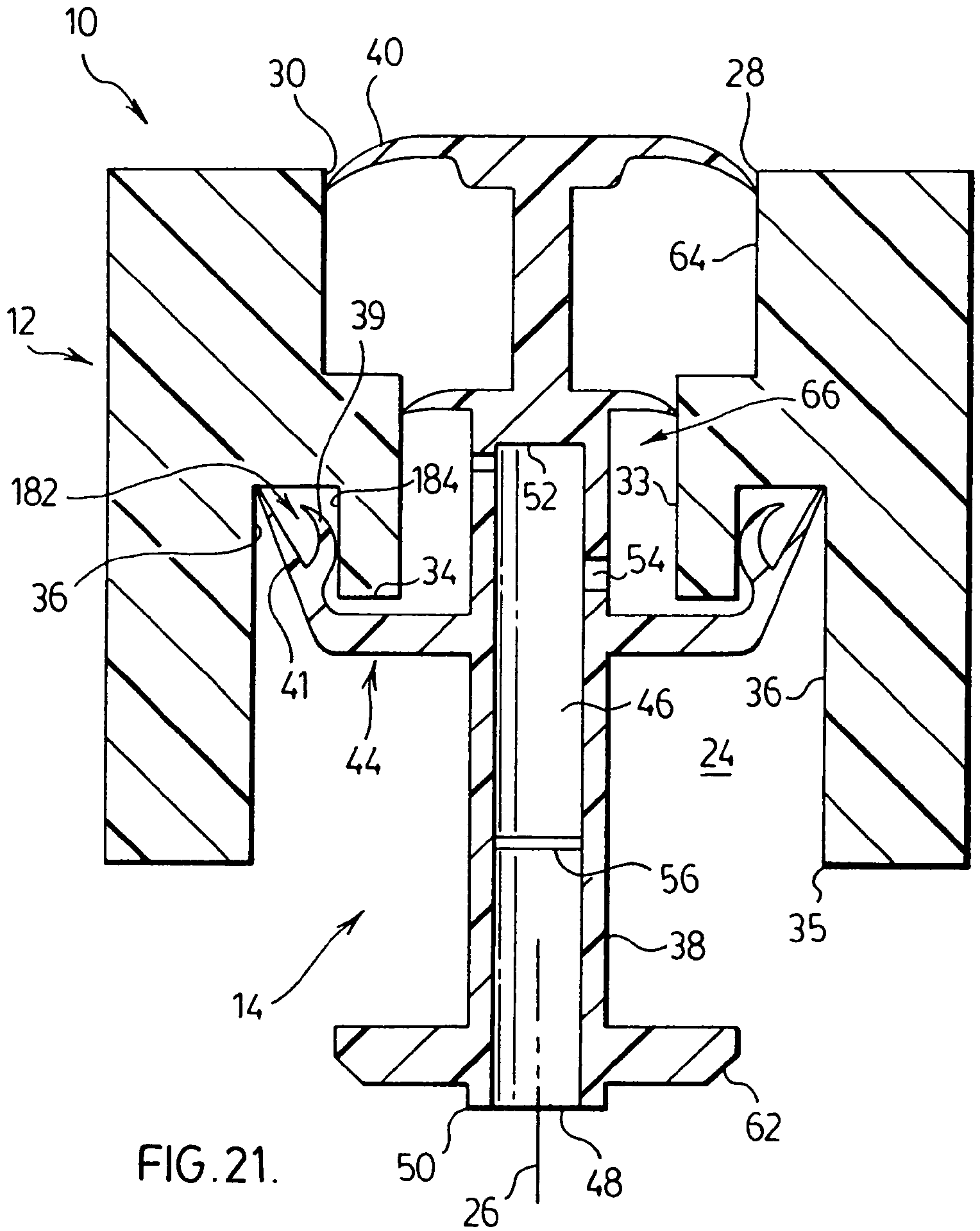
FIG. 21 illustrates a twelfth embodiment of the invention having similarities to the pump of FIGS. 2 to 4 with the piston shown in a retracted position.

Reference is now made to FIG. 21 which shows an eleventh embodiment of a pump assembly in accordance with the present invention. The pump assembly 10 in FIG. 21 is identical to the pump assembly of FIGS. 2 to 4 with the exception that the piston 14 has been modified so as to provide the outer disc 44 with an annular resilient peripheral flange indicated 180. The resilient flange includes not only an inwardly and outwardly directed outer arm 41 but also a resilient radially inwardly and inwardly directed inner arm 39. The body 12 in FIG. 21 is identical to that in FIGS. 2 to 4 with the exception that an annular channel 182 extends inwardly into the shoulder 34 of the outer chamber 24 which annular chamber 182 has a common outer wall 36 with the remainder of the chamber 24 and provides a new outwardly directed inner wall 184.

The outer arm 41 is adapted to engage the cylindrical wall 36 of the outer chamber 44 to prevent fluid flow outwardly therepast.

While the inner arm 39 engages on the cylindrical inner wall 184, the inner arm prevents flow of fluid, notably atmospheric air, past the outer disc 44 inwardly to between the outer disc 44 and the intermediate disc 42. Thus, in a withdrawal stroke, on the piston 14 moving from the retracted position illustrated in FIG. 21 to an intermediate position in which the inner arm 39 is axially outward from the shoulder 34 such that the inner arm 39 does not engage the inner wall 184 or the shoulder 34, then the flow of air inwardly past the outer disc 44 is prevented. However, in an extraction stroke, once the inner arm 39 is outwardly of the shoulder 34 and thus out of the annular channel 182, atmospheric air may be drawn inwardly past the outer disc 44 by deflection of arm 41. It is to be appreciated, therefore, that from a retracted position illustrated in FIG. 21 moving the piston outwardly initially while the inner arm 39 is within the annular channel 182, there is drawback of fluid including air and liquid from the passageway 46 as can be advantageous as to prevent dripping of liquid and foam out the outlet 48. However, on further outward movement of the piston 14 with the inner arm 39 outwardly of the annular channel 182, the suction produced between the outer disc 44 and the intermediate disc 42 may also draw air inwardly past the outer arm 41 and, as a result, atmospheric air may flow between the outer disc 44 and the intermediate disc 42 either outwardly past the outer disc 44 or through the passageway 46 with the relative proportion of the flow having regard to the relative resistance of flow through each of the two pathways. It is to be appreciated, that while the inner arm 39 is within the annular channel 182 that there is drawback only through the passageway 46 and that once the inner arm 39 clears the annular channel 182 that there may be effectively only flow inwardly past the outer periphery of the outer disc 44. A bifocated inner disc as illustrated in FIG. 21 may be adapted for use in other of the embodiments illustrated.

Figure 23:
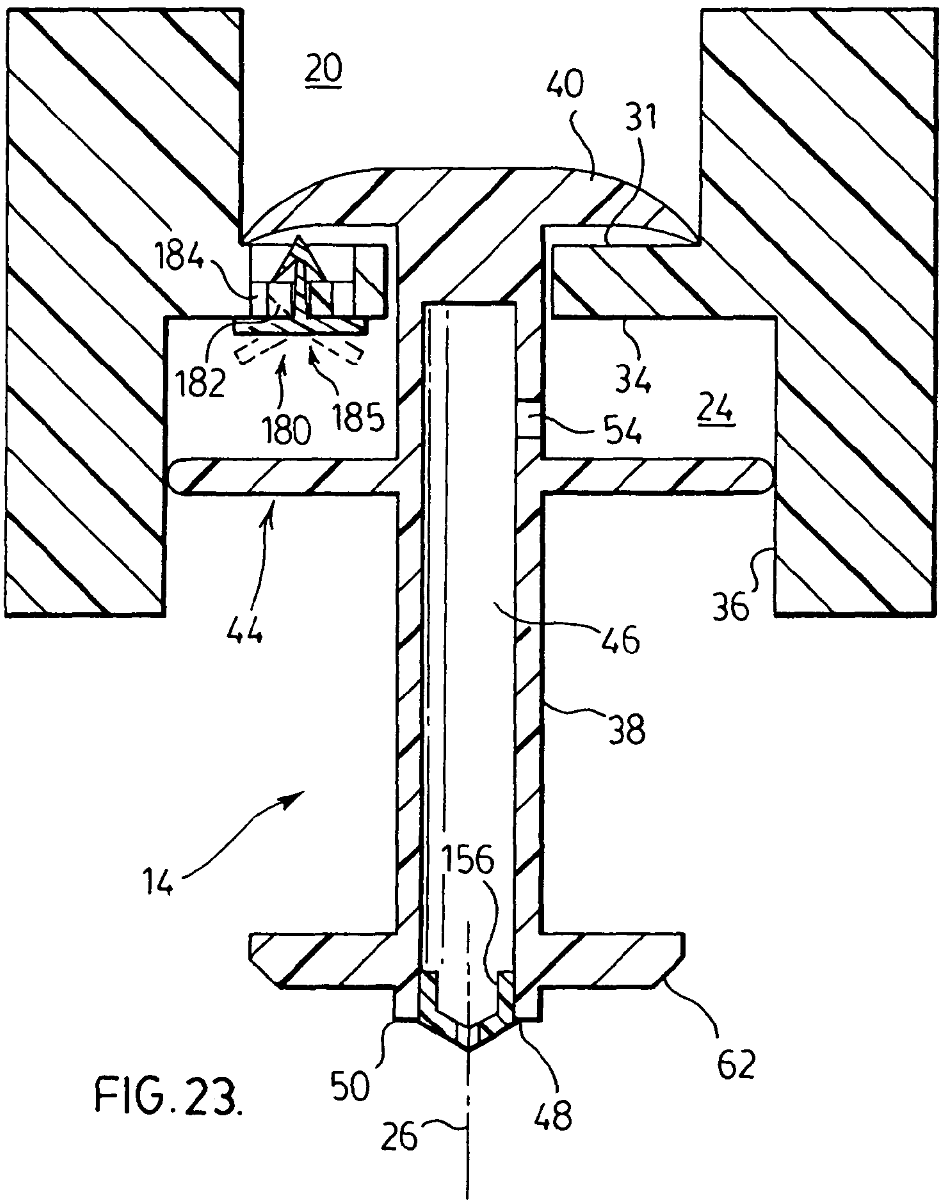
FIG. 23 illustrates a thirteenth embodiment of the invention.

Reference is made to FIG. 23 which shows a fourth version of a pump assembly in accordance with the present invention. The pump assembly illustrated in FIG. 23 can be considered to be similar to that in FIG. 4, however, with the intermediate disc 42 removed, the stem 38 provided with a cylindrical constant cross-sectional area between the inner disc 40 and the outer disc 44 and the intermediate chamber 42 reduced in diameter to a diameter close to that of the stem 38 between the inner disc 40 and the outer disc 44 so as to effectively prevent any substantial fluid flow therebetween. A one-way valve 180 is provided between the inner and outer chambers. Two channels 184 and a center opening 182 are provided between the inner chamber 20 and the outer chamber 24 having inlets in the outer shoulder 31 of the inner chamber 20 and an outlet in the inner shoulder 34 of the outer chamber 24. A one-way valve member 185 is provided which prevents fluid flow inwardly through the channels 184 and opening 182 yet permits fluid flow outwardly through the channels 184. The one-way valve member 185 has a central stem passing through the central opening 182 carrying a flexible disc outwardly of the channels 184 and an arrowhead retained inwardly. The channels 184 and the one-way valve member 185 therefore provide a similar function to the intermediate disc 42 of the embodiment of FIGS. 2 to 4 or the intermediate flange 142 of the embodiment of FIG. 12. FIG. 23 is also modified to show replacement of the screen 56 by a nozzle member 156 disposed proximate the outlet 48 to at least partially atomize liquid when liquid and air pass therethrough simultaneously.

In FIG. 21, the piston 14 is slightly modified over that illustrated in FIGS. 2 to 4 in respect of the inner disc 40 which has had its outer periphery reduced in thickness so as to show a configuration in which the inner disc 40 is sufficiently resilient that the inner disc 40 may pass inwardly through the intermediate chamber 22 such that the piston may be formed as a unitary element from plastic as by injection moulded and inserted through the outer chamber 24. This, for example, avoids the need of the piston to be made into portions as illustrated, for example, in the embodiment of FIG. 12.

In operation of the pump illustrated in FIGS. 2 to 4, in the piston 14 moving from the retracted position to the extended position, a volume of liquid equal to a first volume is displaced in an inward direction past the intermediate disc 42 to between the intermediate disc 42 and the outer disc 44 and a volume equal to a second volume which is greater than the first volume and comprises both liquid and air is drawn in between the intermediate disc 42 and the outer disc 44. In the piston 14 moving from the extended position to the retracted position, a volume of liquid from the reservoir equal in volume to the first volume is displaced in an outward direction past the inner disc 40 to between the inner disc 40 and the intermediate disc 42 and a volume equal in volume to the second volume and comprising both liquid and air is displaced from between the intermediate disc 42 and the outer disc 44 out of the outlet 48. In the piston 14 moving from the retracted position to the extended position, the volume equal to the second volume which was drawn in between the intermediate disc 42 and the outer disc 44 comprises the first volume displaced in the outward direction past the intermediate disc plus a third volume comprising air from atmosphere and may include as a fourth volume liquid drawn back via the outlet from the passageway.

In respect of an embodiment using a piston 14 as illustrated in FIG. 20 in a body as illustrated in FIGS. 2 to 4 and including the interior one-way valve 170 within the passageway 46, then on the piston 14 moving from the retracted position to the extended position, the volume equal to the second volume which was drawn into between the intermediate disc 42 and the outer disc 44 comprises the first volume consisting of fluid displaced in the outward direction past the intermediate disc 42 and a third volume comprising air from the atmosphere drawn inwardly past the outer disc 44. Insofar as the piston as illustrated in FIG. 209 is used in a body as in FIGS. 2 to 4 but without one-way valve 170, then the second volume would comprise the first volume displaced in the outward direction past the intermediate disc 42 and a third volume comprising air from the atmosphere which may be drawn through the passageway 46 and/or outwardly past the outer disc 44. The same would be true in respect of the embodiment illustrated in FIG. 21. Insofar as there is drawback of liquid through the outlet 48, then the second volume would also include as a fourth volume liquid drawn back through the passageway 46.

The embodiment of FIGS. 7 and 8 as well as FIGS. 9 and 10 and FIGS. 15 and 16 illustrate configurations in which the relative amounts of liquid and air may be dispensed can be varied. The embodiment of FIGS. 7 and 8 effectively illustrate modification by varying the axial extent of the inner chamber 20. In accordance with the present invention, the body 20 may be manufactured by injection moulding with the mould cavity forming the body 12 to provide for variable axial extent of the inner chamber 20. In this manner, by using substantially the same mould, bodies and therefore pumps, may be provided which provide for dispensing of different volumes of liquid merely by varying the axial length of the inner chamber 20.

A principal operation of pumps in accordance with many of the embodiments of the invention is that the volume dispensed past the outer disc is greater than the volume dispensed past the intermediate disc. Thus, for example, in the embodiment such as in FIGS. 2 to 4, with the volume dispensed past the outer disc 44 being greater than the volume dispensed past the intermediate disc 42, this allows for air to be drawn into the pump assembly and, subsequently, dispensed. Where the inner, intermediate and outer discs all remain in engagement with their respective chambers throughout the retraction and extension strokes, then it is preferred that the difference in area between the outer chamber and the intermediate chamber is greater than the difference in area between the inner chamber and the intermediate chamber. This relation may be seen, for example, in the embodiment of FIGS. 2 to 4.

Figure 22:
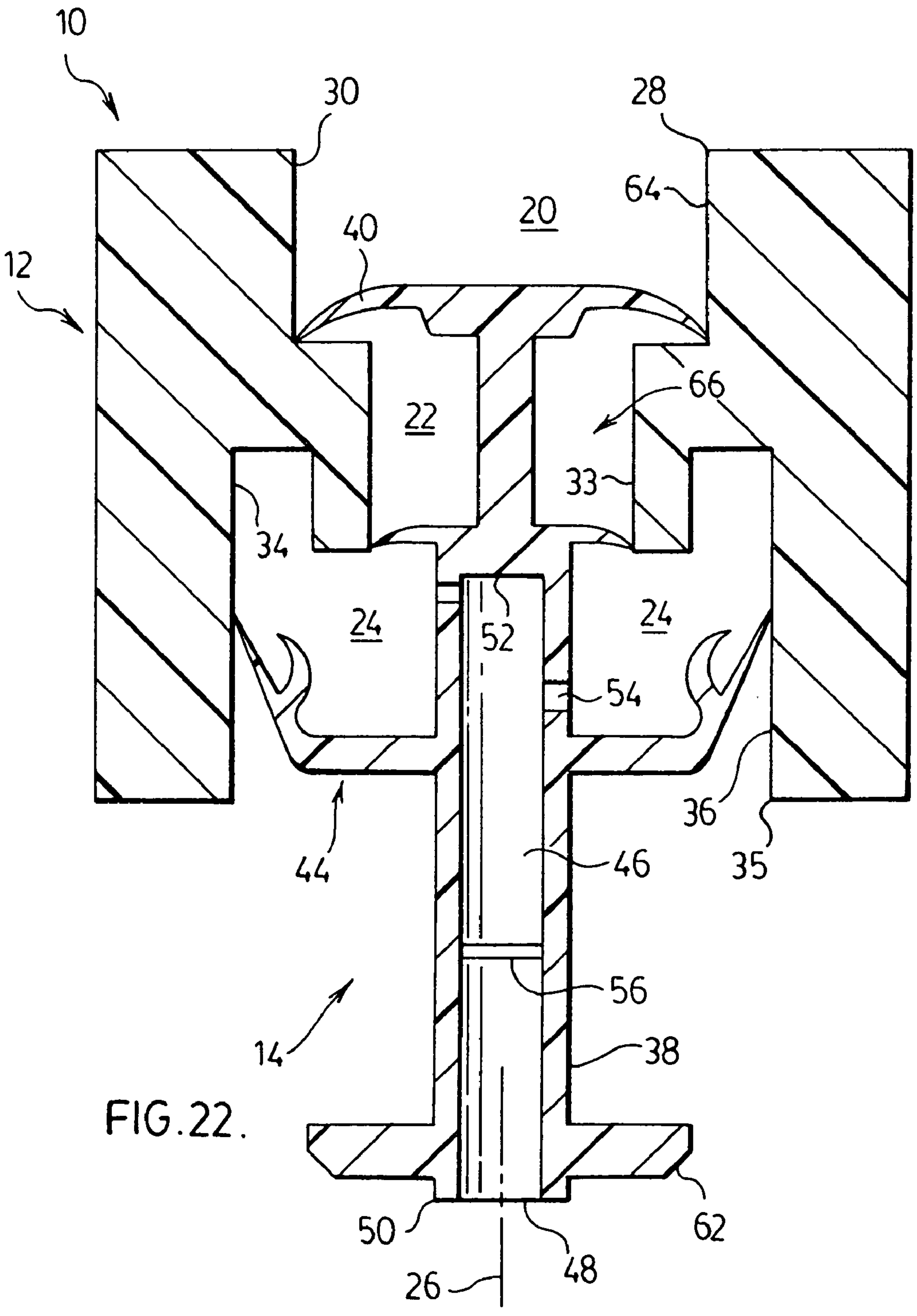
FIG. 22 is of the same side view as in FIG. 21 but showing the pump in an intermediate position and an extended position.

Reference is made to FIG. 22 which shows a thirteenth embodiment of a pump assembly in accordance with the present invention. The pump assembly illustrated in FIG. 22 can be considered to be similar to that in FIG. 4, however, with the intermediate disc 42 removed, the stem having a cylindrical constant cross-sectional area between the inner disc 40 and the outer disc 44, the intermediate chamber is effectively reduced in diameter to a diameter which will engage the stem between the inner disc 40 and the outer disc 44 and effectively prevent a substantial fluid flow therebetween. A channel is, however, provided between the inner chamber 20 and the outer chamber 24 having an inlet in the outer shoulder of the inner chamber and an outlet in the inner shoulder of the outer chamber. A one-way valve is provided in this channel which prevents fluid flow inwardly through the channel yet permits fluid flow outwardly through the channel. The channel and the one-way valve therefore provide a similar function to the intermediate disc 42 of the embodiment of FIGS. 2 to 4 or the intermediate flange of the embodiment of FIG. 22. FIG. 23 is also modified to show a replacement of the screen 56 by a nozzle member 156 disposed proximate the outlet 48 to at least partially atomize liquid when liquid and air pass therethrough simultaneously.

Figure 24:
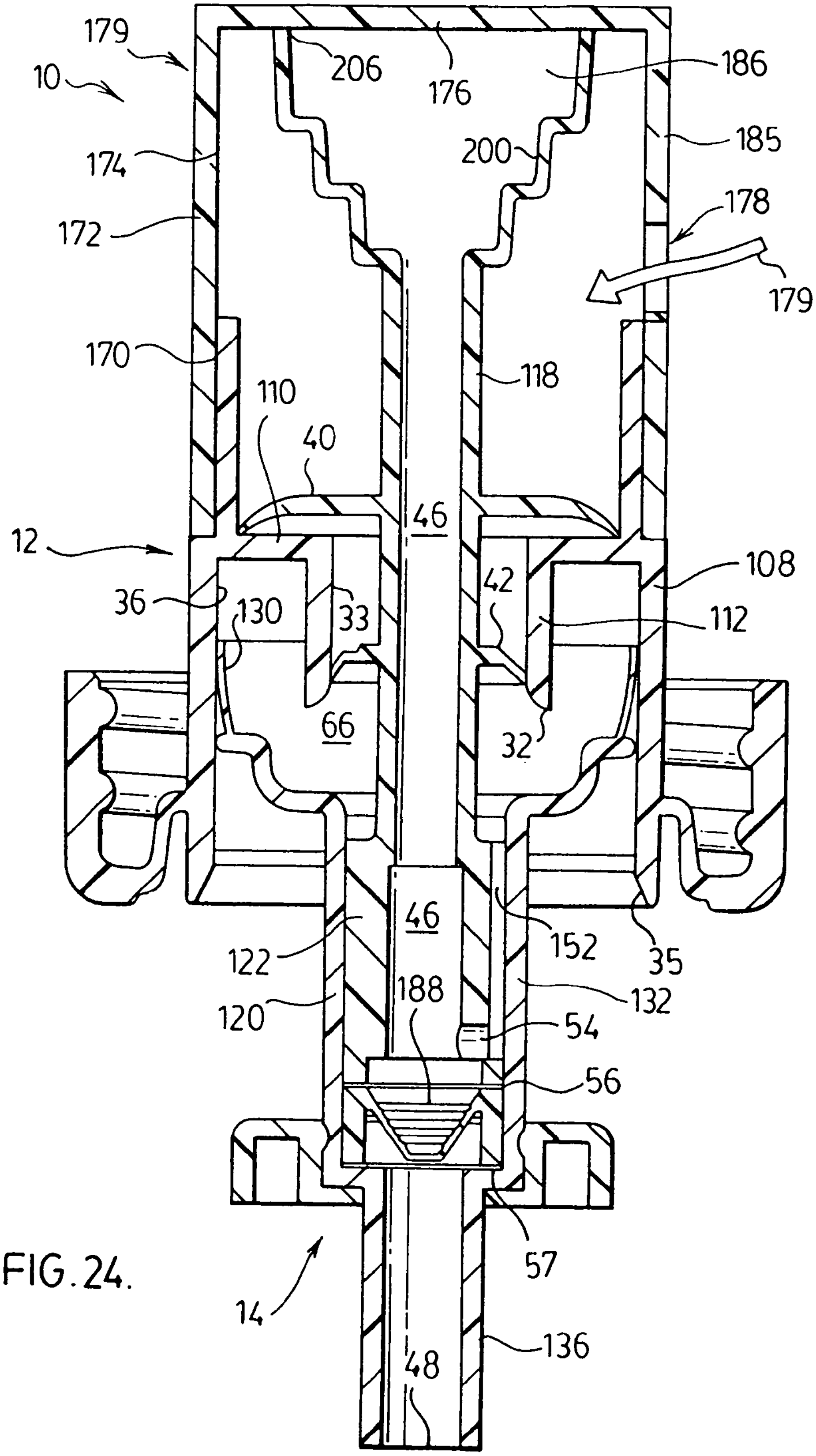
FIG. 24 is a fourteenth embodiment of the present invention representing modification of the embodiment of FIG. 6 to adopt a bellows member.

FIG. 24 is a modification of the embodiment illustrated in FIG. 6 so as to provide at the inner end of the piston 14 rather than the air pump disc 180 which slides within the air chamber-forming member 172, a flexible inner bellows/spring member 200 which extends rearwardly as an integral portion of the piston 14 to engage the rear wall 176 of the element 172. The inner bellow member 200 as illustrated in FIG. 24 is compressed such that the inner bellows member 200 always urges the disc 40 forwardly towards engagement with the shoulder 110. With inward movement of the piston 14 in use, the inner bellows member 200 further resiliently deflects and, in this regard, acts as a spring to bias the piston 14 outwardly.

In addition, as the piston 14 is moved rearwardly, the internal volume in the air chamber 186 inside the inner bellows member 200 decreases such that the inner bellows member 200 draws air in and expels air out during use.

The inner bellows member 200 has the advantage of serving both as a pump and an internal spring to bias the piston 14, however, it may in other embodiments serve merely one or the other or both of these functions and, as well, may be adapted for pumping air, or fluid or a mixture of air and fluid.

Figure 25:
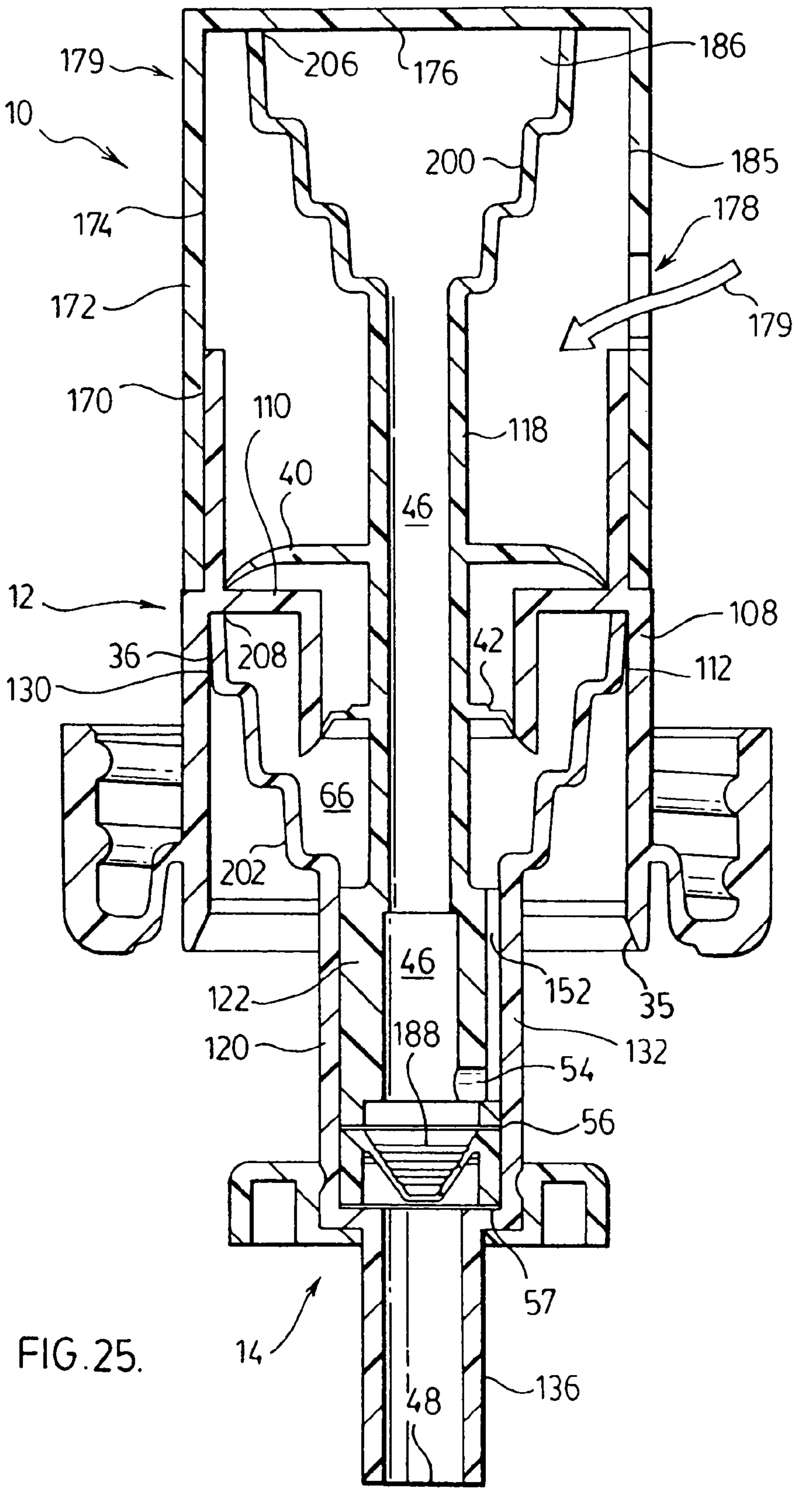
FIG. 25 is a fifteenth embodiment of the invention representing a further modification of the embodiment of FIG. 24 to adopt a second bellows member.

FIG. 25 illustrates a further modification of FIG. 6 over that of FIG. 24 such that the piston outer disc 130 of FIG. 6 is also replaced by a second bellows member 202 which will not only draw in and dispense air/liquid but also acts as a spring to bias the piston 14 outwardly.

Figure 26:
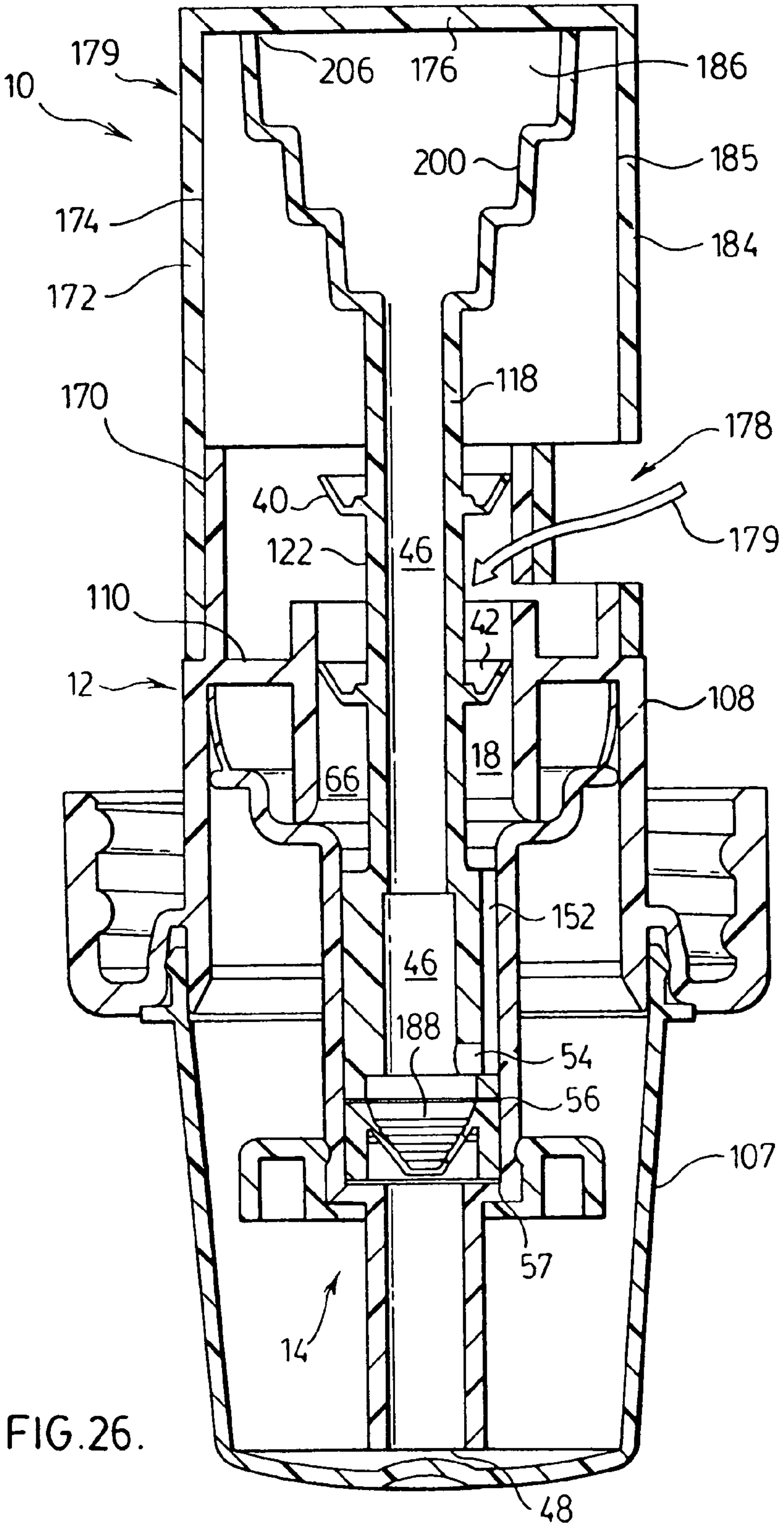
FIG. 26 illustrates a sixteenth embodiment of the invention showing a gravity feed positive displacement pump with a bellows.

Reference is made to FIG. 26 which illustrates a further embodiment of a pump in accordance with the present invention and which an inner bellows member 200 is provided at the inner end of an inner core 122 of a pump in a similar manner to that shown in FIG. 24. However, in FIG. 29, the pump mechanism is a gravity feed metering pump for movement and dispensing of fluid from a reservoir past disc 42 as in a manner disclosed in U.S. Pat. No. 6,601,736 to Ophardt et al, issued Aug. 5, 2003. It is to be appreciated that the inner bellows 200 in FIG. 29 has replaced a piston pump similar to that illustrated in FIG. 6. As well, it is to be appreciated than an outer bellows 202 could be provided in replacement of the sealing flange 130 in FIG. 28.

Figure 27:
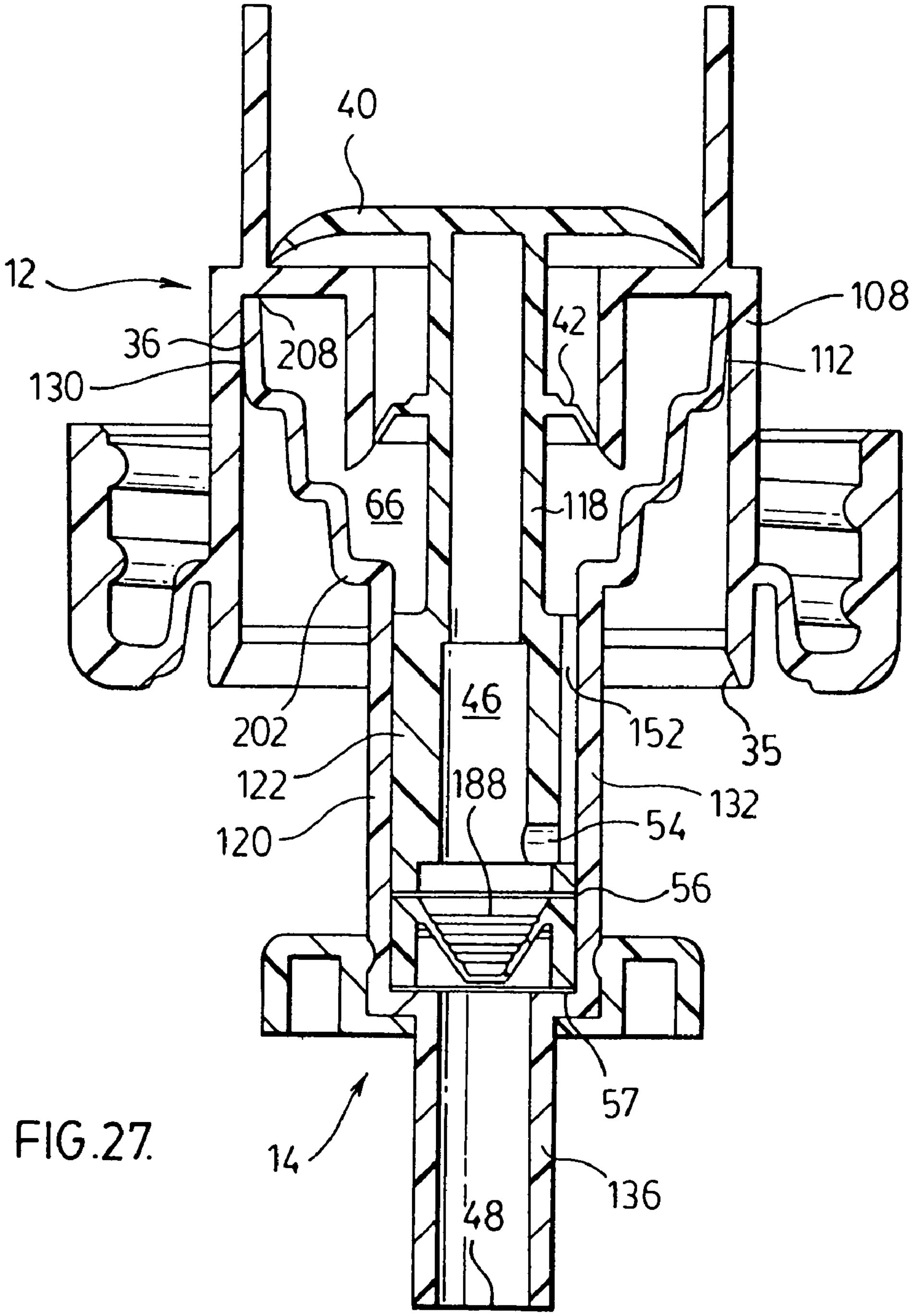
FIG. 27 is a seventeenth embodiment of the invention illustrating a foam pump arrangement with a single bellows member.

FIG. 27 is a further embodiment in which an outer bellows 202 is provided which forms the sole air chamber for drawing air in via outlet 48 and dispensing it outwardly through outlet 48. The bellows chamber 66 receives liquid from the reservoir from a stepped cylinder liquid pump including discs 40 and 42. Both air and liquid are dispensed via port 54 to passageway 46 and out through the foam generators 56, 188 and 57.

Figure 28:
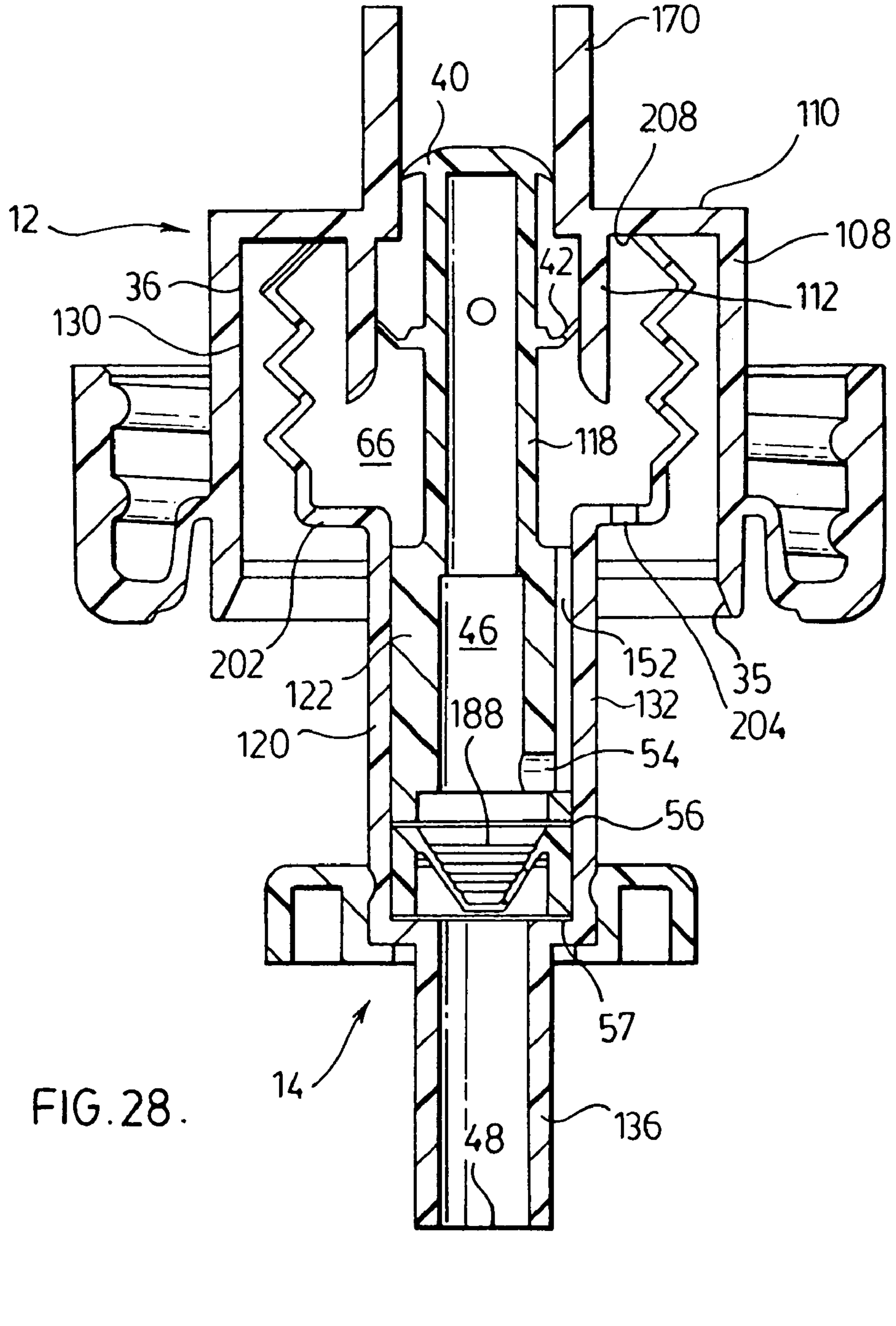
FIG. 28 is an eighteenth embodiment of the present invention showing a liquid pump having one bellows member merely as a spring.

FIG. 28 illustrates a modified form of the embodiment of FIG. 26 including an outer bellows 202 which is adapted to serve merely as a spring since the bellows 202 has an air vent opening 204 to relatively, freely permit passage of air inwardly and outwardly therefrom. While an accordion-like outer bellows member 202 is shown in FIG. 28, a bellows member such as in FIG. 27 could also be used with an air vent.

Disc 42 is modified over that of FIG. 27 so as to prevent fluid flow outwardly therepast. An inlet 256 is provided through the side wall of the stem 38 of the piston between the discs 40 and 42 directing fluid between discs 40 and 42 outwardly into passageway 46. The dispenser of FIG. 28 merely dispenses liquid.

In each of the embodiments illustrated in FIGS. 24 to 28, each of the inner bellows 200 and outer bellows 202 provide a bellows chamber inside a flexible and collapsible side wall which bellows chamber increases in volume with movement of the piston 14 towards the extended position and reduces with volume with movement of the piston 14 towards a retracted position. Each of the bellows is provided to act as a resiliently collapsible and expandable pump so as to draw fluid inwardly into the bellows chamber and dispense fluid outwardly from the bellows chamber.

In the preferred embodiments illustrated, the resilient bellows member is formed integrally with a component of the piston having a central axially extending hollow stem with a bellows formed as an extension of the hollow stem and open to the hollow stem.

Each of the bellows members 200 and 202 illustrated are formed as the end of a tubular member. In each of the embodiments in FIGS. 25 to 28, the piston 14 is formed from a number of elements secured together as a unit and including as two principal elements an outer casing 120 and an inner core 122. The inner core 122 carries a hollow support tube 118 from whose inner end the inner bellows 200 extends inwardly to its inner end 206 which engages in a sealed manner the end wall 176 of the air chamber-forming member 172. The outer casing 120 includes a small tube portion 136 at its outer end and a large tube portion 132 open at an inner end from which the outer bellows 202 extends inwardly to its inner end 208 which engages in a sealed manner an outer side of the flange portion 110.

In both the embodiments of FIGS. 24 and 25, the inner bellows member 200 is formed as an inner extension of a portion of the piston 14 open to the central internal passageway 46 through the hollow stem 38.

In each of the embodiments of FIGS. 24 to 28, at least one annular chamber is formed annularly about the stem 38 between the piston 14 and the piston-chamber forming member 12 such that with reciprocal sliding of the piston 14 between the retracted and the extended position, there is controlled movement of liquid from the reservoir into the annular chamber and for dispensing of liquid in the annular chamber to the outlet with or without the simultaneous dispensing of air.

Each of the bellows 200 and 202 is formed from a resilient material which will have an inherent tendency to assume an expanded configuration. Plastic material such as polyethylene and polypropylene and copolymers provide for adequate resiliency. The bellows effectively forms an axially compressible, resilient tube section, the outer wall of which forms the plurality of stepped annular portions. The resiliency of the wall provides an inherent bias like a compression spring to return the wall to an extended configuration. The side wall effectively is pleated and adapted to collapse the side wall longitudinally. The side wall illustrated in FIG. 25 is roughly conical increasing in diameter stepwise inwardly. In FIG. 28, the bellows member 202 is shown as having an accordion-like side wall of relatively constant diameter. Alternatively, the side wall may be formed with spiral grooves and spiral lands therebetween rather than merely annular lands.

Figure 29:
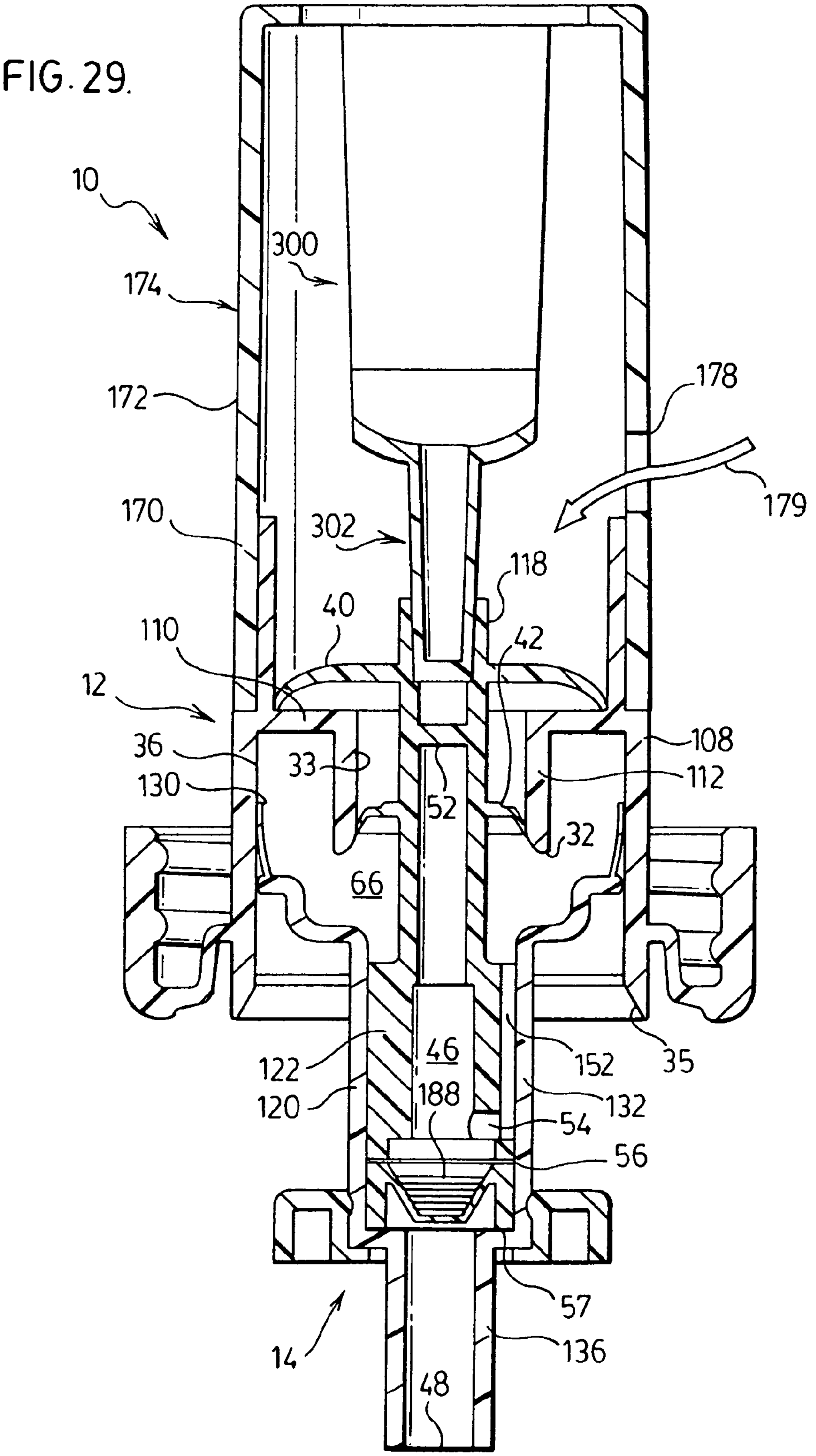
FIG. 29 is a cross-sectional side view of a $19^{th}$ embodiment of the present invention showing a foam pump arrangement with a plastic spring member.

Reference is made to FIG. 29 which illustrates a $19^{th}$ embodiment which may be considered a modification of the embodiment of FIG. 24 to replace the bellows 200 by a spring 300. As seen in FIG. 29, the spring 300 in integrally formed with a spring chamber-forming member 172 which is otherwise the same as the air chamber-forming member 172 described with reference to FIGS. 5 and 24. Like the bellows 200 of FIG. 24, the spring 300 is resiliently compressible and biases the piston 14 outwardly to an extended position. As contrasted with the embodiments of FIGS. 24 and 5, the piston 14 has its passageway 46 closed at an inner end at 52. The hollow support tube 118 of the inner core 122 of the piston 14 receives a neck tube 302 of the spring 300 fixedly secured therein to couple the inner end of the piston 14 to the spring 300. The pump of FIG. 29 will effectively operate in a similar manner to the pump illustrated in FIG. 4, however, with the spring 300 biasing the piston 14 outwardly to an extended position and becoming compressed on movement of the pump inwardly towards a retracted position.

Reference is made to FIGS. 30 to 40 illustrating a 20$^{th}$ embodiment of the present invention. The pump assembly 10 in FIG. 30 has a piston chamber-forming body 12 and piston 14. The body 12 has an outer tubular portion 308 connected by a first flange 310 to an inner end of an intermediate tubular portion 312 whose outer end is connected by a second flange 314 to an inner tubular portion 316. The outer chamber 24 is formed radially inwardly of the outer tubular portion 308 having a side wall 36 thereabout. The intermediate chamber 22 is formed radially inwardly of the inner tubular portion 316 within the side wall 33. The inner chamber 20 is formed radially inwardly of the intermediate tubular portion 312 with a side wall 30 thereabout. An outlet opening of the inner chamber 20 opens into an inlet end of the intermediate chamber 22. An outlet opening of the intermediate chamber opens 22 into an inlet end of the outer chamber 24.

Figure 31:
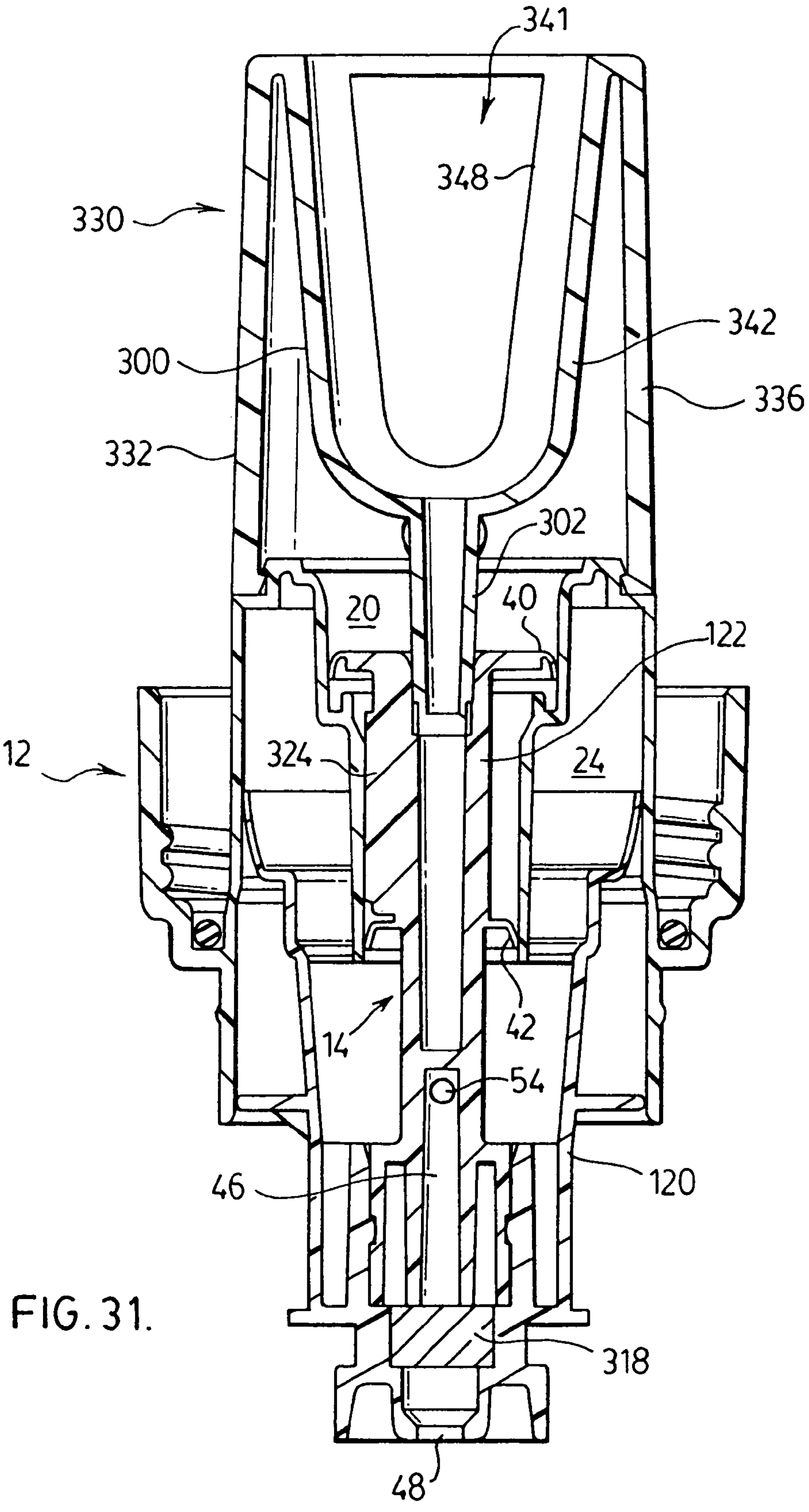
FIG. 31 is a cross-sectional side view of the pump of FIG. 30 in a cross-section normal to the cross-section shown in FIG. 30 with the piston in an extended position.
Figure 32:
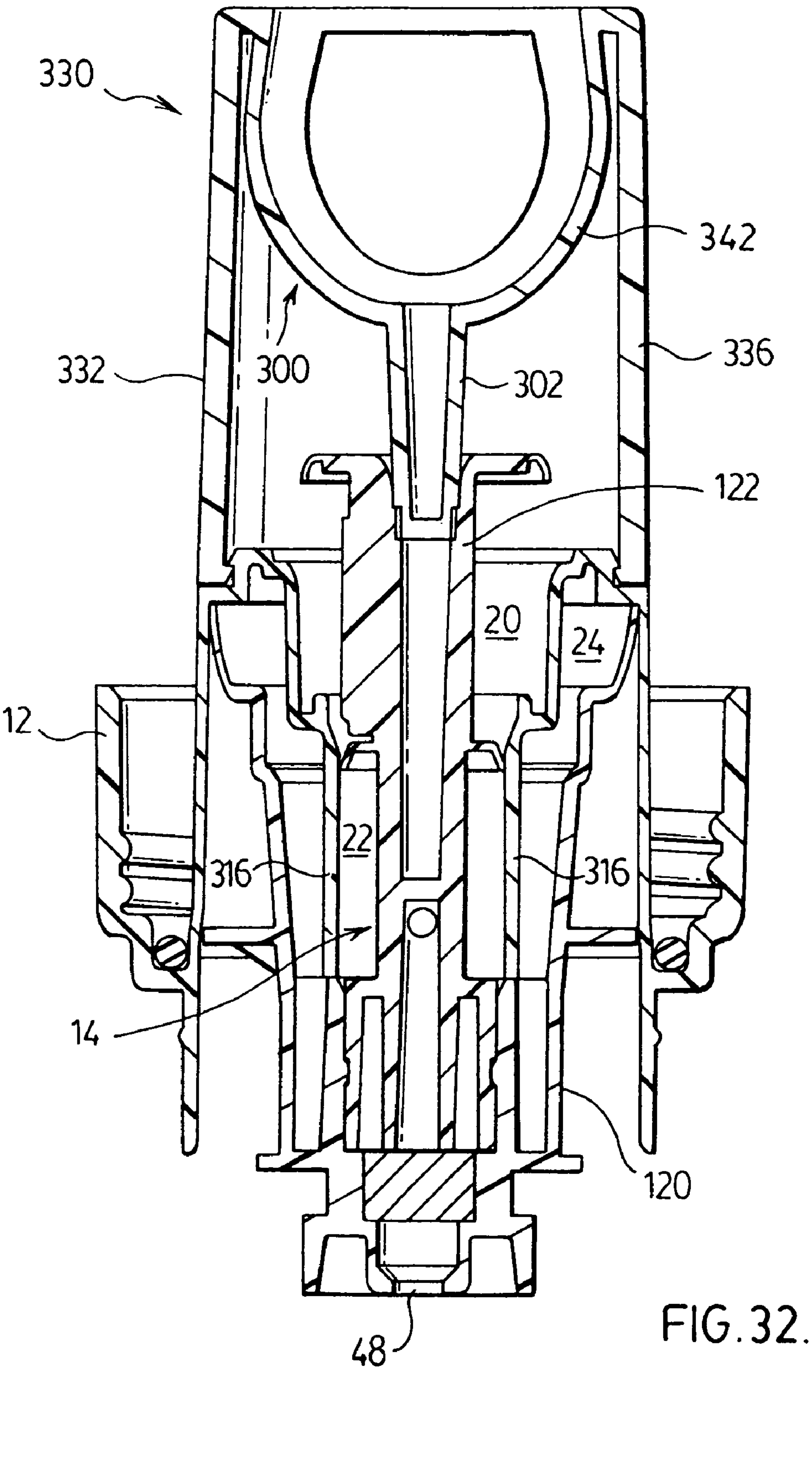
FIG. 32 is a cross-sectional side view the same as that in FIG. 31, however, showing the piston in a retracted position.

The piston 14 is formed from an outer casing 120, an inner core 122 and a foam producing element 318. The foam producing element 318 is preferably a cylindrical disc of porous materials such as open pore foamed plastic. The foam producing element is retained in a compartment 320 formed in the outer end of the outer casing 120 outwardly of the outer end of the inner core 122 which is fixedly secured to the outer end of the outer casing 120 as shown. The outer casing 120 carries the outer disc 44 for engagement within the outer chamber 24 and its side wall 36. The outer tubular portion 308 includes a cylindrical extension 322 outwardly from the outer chamber 24 adapted to be engaged by a locating flange 324 carried by the outer casing 120 of the piston 14 to assist in coaxially locating the piston 14 in the body 12. The piston 14 has an elongate stem 38 which carries an inner flexing disc 40 at an innermost end and an intermediate flexing disc 42. The inner flexing disc 40 is coaxially received within the inner chamber 20. The intermediate flexing disc 42 is coaxially disposed within the intermediate chamber 22. As seen in FIGS. 31 and 32, the piston 14 advantageously carries a plurality of circumferentially spaced locating flanges only one of which is shown as 324 between the inner disc 40 and the intermediate disc 42 for engagement with the chamber wall 33 of the intermediate chamber 22 to assist in coaxially locating the piston 14 in the body 12.

An outermost portion of the stem 38 is hollow with a central passageway 46 extending from an outlet 48 at the outermost end of the stem 38 centrally through the stem 38 to a closed inner end 52. Radially extending inlets 54 extends radially through the stem into the passageway 46, with the inlets 54 being provided on the stem in between the outer disc 44 and the intermediate disc 42.

The piston 14 carries an engagement flange 62 complementary with an engagement slot 63 together provided for engagement as by an activating device in order to move the piston inwardly and outwardly relative to the body 12. An innermost portion of the stem 38 is also hollow with a central bore 326 closed at an outer end at 327. A spring assembly 330 is coupled between the body 12 and the piston 14 to bias the piston 14 outwardly to an extended position. Spring assembly 330 includes a spring 300 disposed within a hollow tubular spring housing 332. The spring housing 332 has an outer end 334 secured in a snap-fit relation onto the inner end of the outer tubular portion 308 of the body 12 about the first flange 310. The spring housing 332 extends outwardly as a generally cylindrical but marginally frustoconical, inwardly tapering wall 336 to an inner end providing a radially inwardly extending flange 338 supporting the inner end 340 of the spring 300. The spring 300 extends from its inner end 340 outwardly to an outer end formed as a tubular neck 302 which is securely, fixedly engaged and received within the bore 326 of the piston 14. Openings 178 are provided through the side walls of the spring housing 332 provide for communication from the interior of a container to the inlet opening of the inner chamber 20. Strictly speaking, such openings 179 are not required as in the preferred embodiment, the interior of the container is also in communication with the inlet opening of the inner chamber 20 through the central opening 341 in the flange 338 of the spring housing 332 and downwardly through side openings 348 in the spring 300. However, the openings 178 provide for fluid in a container at a height below the opening 341 in the flange 338 of the spring housing 332 to gain access to the inlet opening to the inner chamber and, thus, be dispensed.

The spring member 300 has a side wall 342 which extends inwardly from the flange of the spring housing 332 to the tubular neck 302 of the spring 300. As marked on FIG. 37, the side wall 342 in the preferred embodiment has a conical portion generally indicated as 344 which is frustoconical terminating at a dome portion indicated as 346 over which the side wall 342 curves from the end of the conical portion 344 to extend substantially normal to an axis 26 coaxially of the piston 14 where the side wall 342 merges into the tubular neck 302. The side wall 342 of the spring 300 has two openings 348 diametrically opposed from each other extending from the dome portion 346 to the flange 338. The side openings 346 may be conceptually considered to have been formed as by considering providing a member having the outer side wall as seen in FIG. 31 completely circumferentially about the axis 26 as a solid of rotation about the axis and then cutting away portions of the side wall 342 in planes on either side of the axis perpendicular to the cross-section shown in FIG. 30 along the lines indicated in FIG. 30 as comprising the openings 348.

Figure 30:
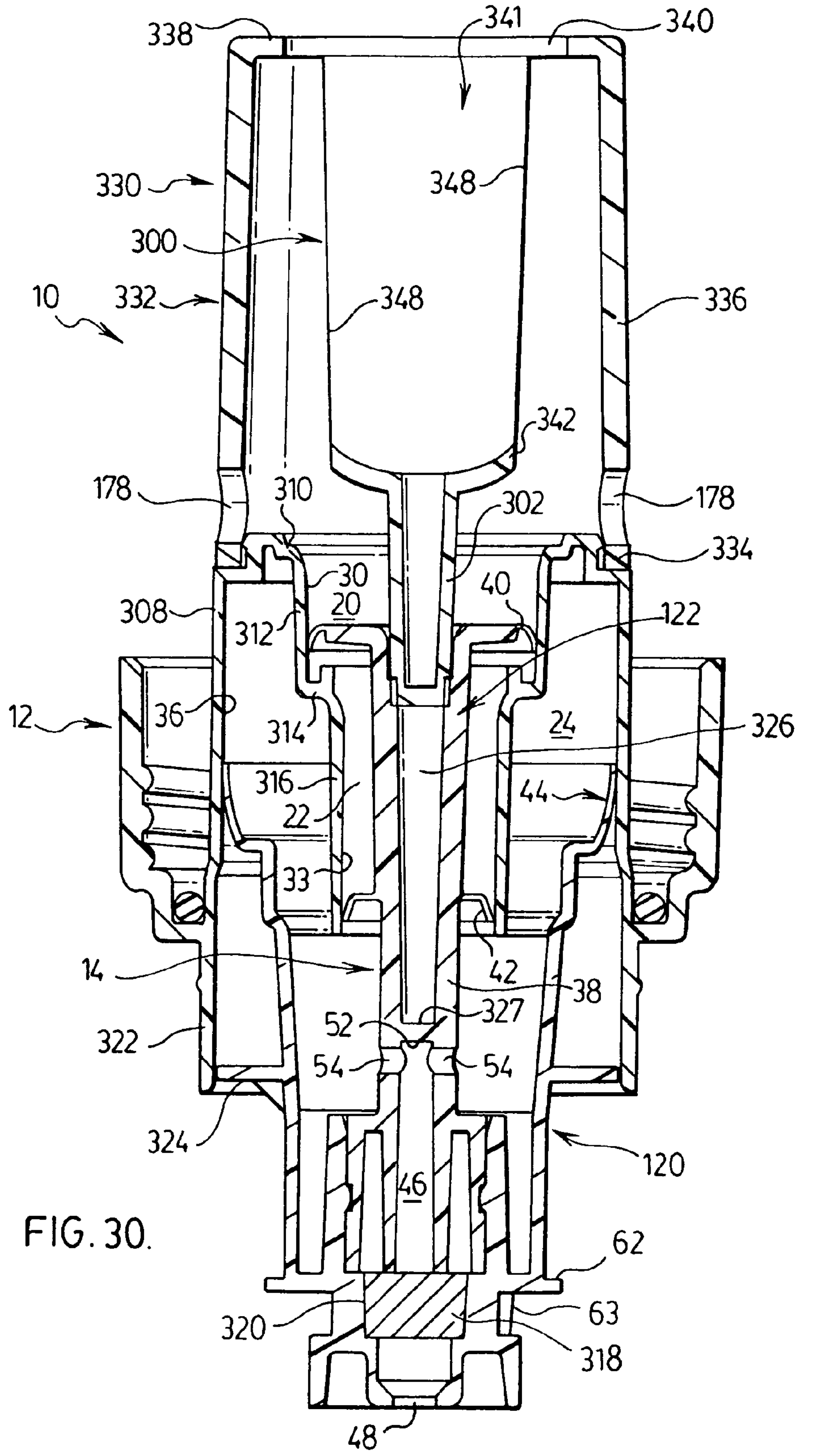
FIG. 30 is a cross-sectional side view of a $20^{th}$ embodiment of the present invention illustrating a foam pump arrangement with a plastic spring member.
Figure 33:
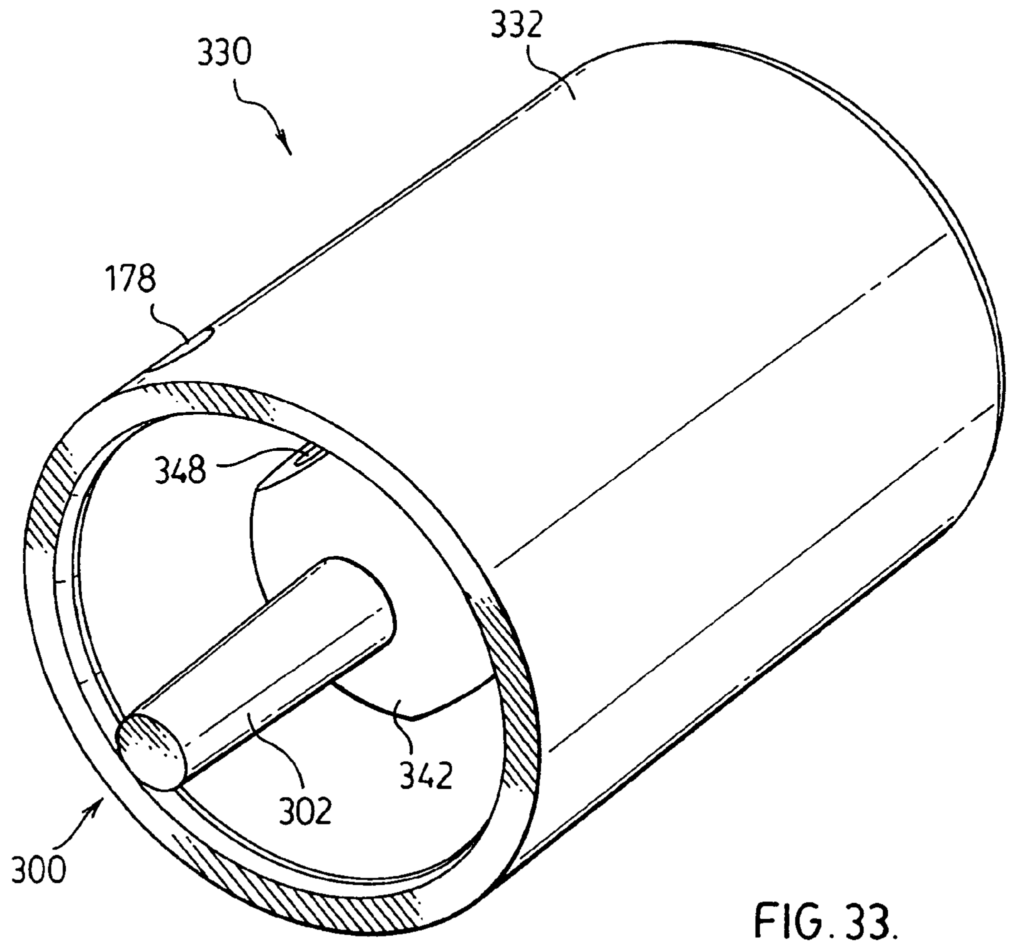
FIGS. 33 and 34 are pictorial views of the spring member shown in FIG. 30 in an unbiased condition.
Figure 34:
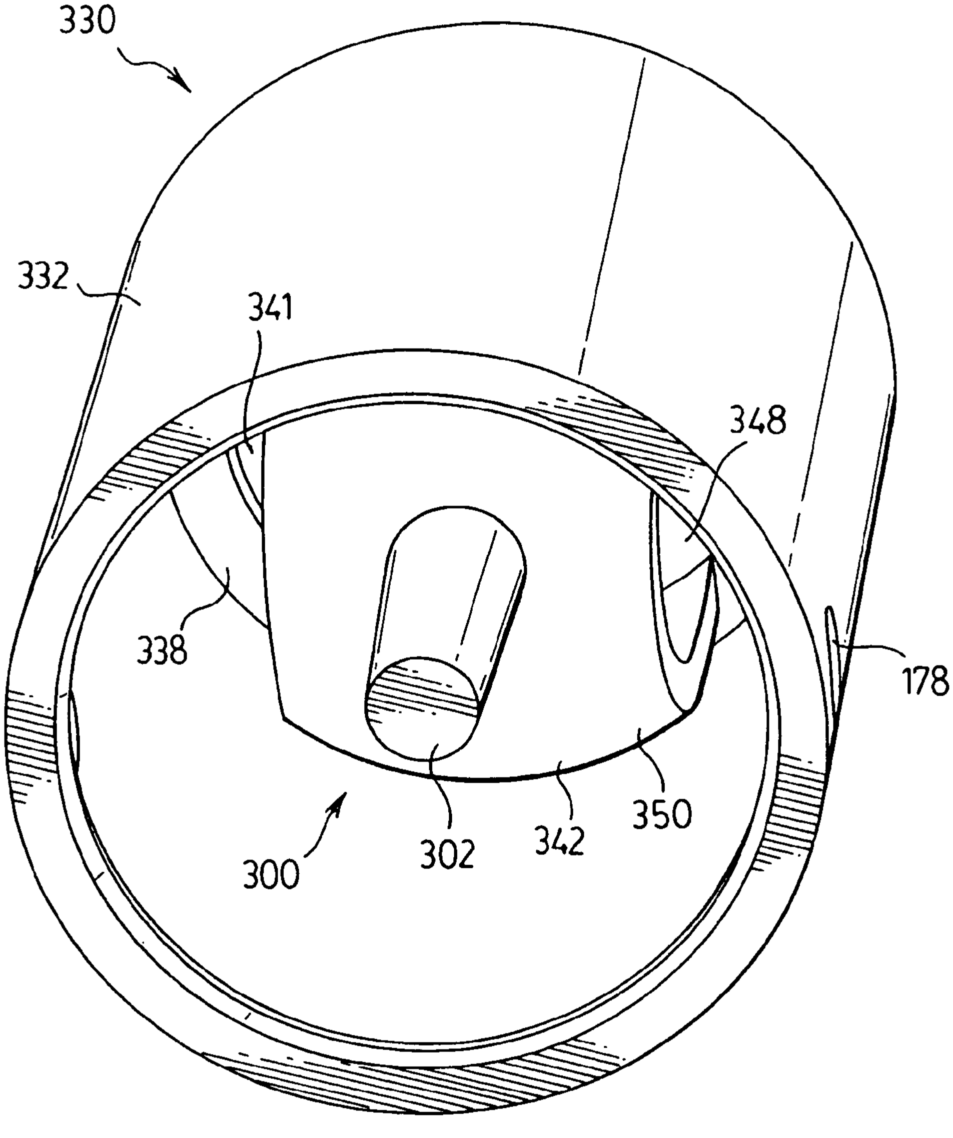
Figure 35:
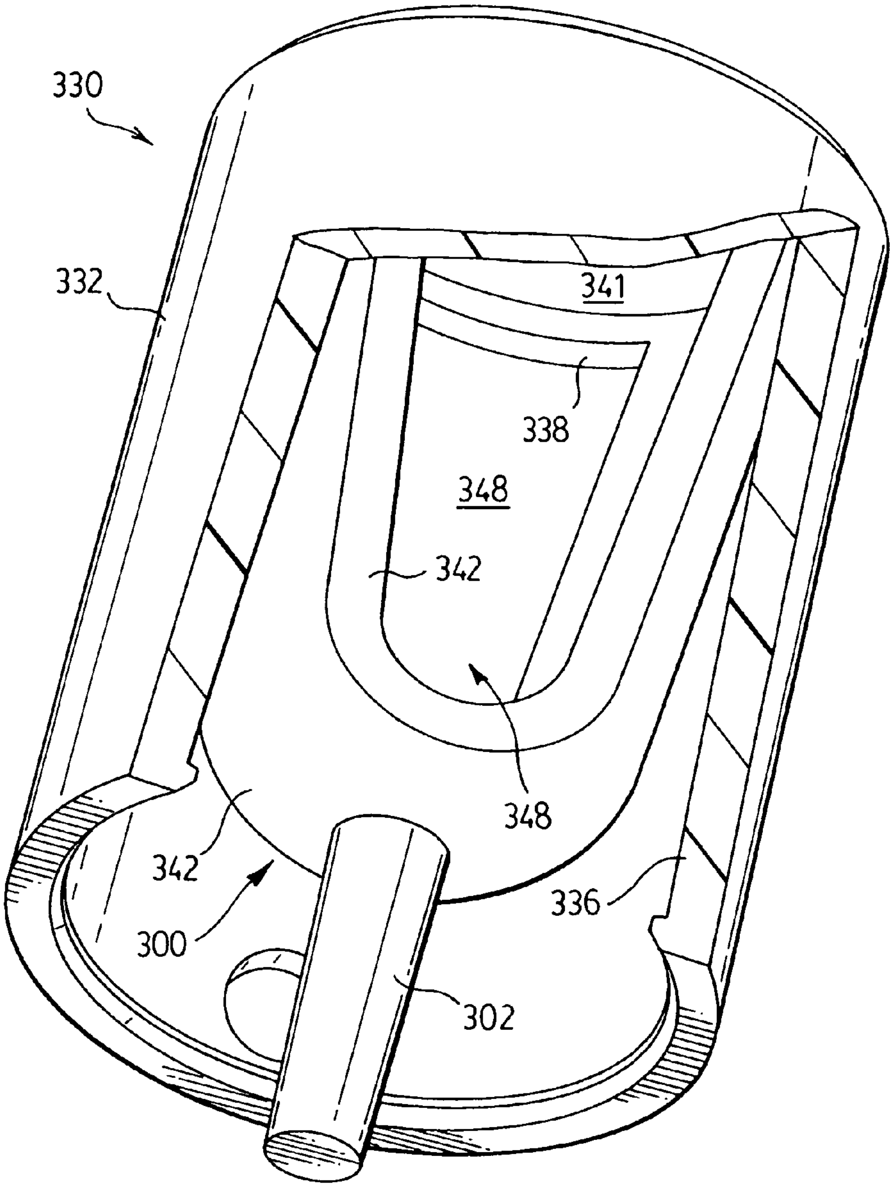
FIG. 35 is a partially cut-away pictorial view of the spring member of FIG. 33.
Figure 36:
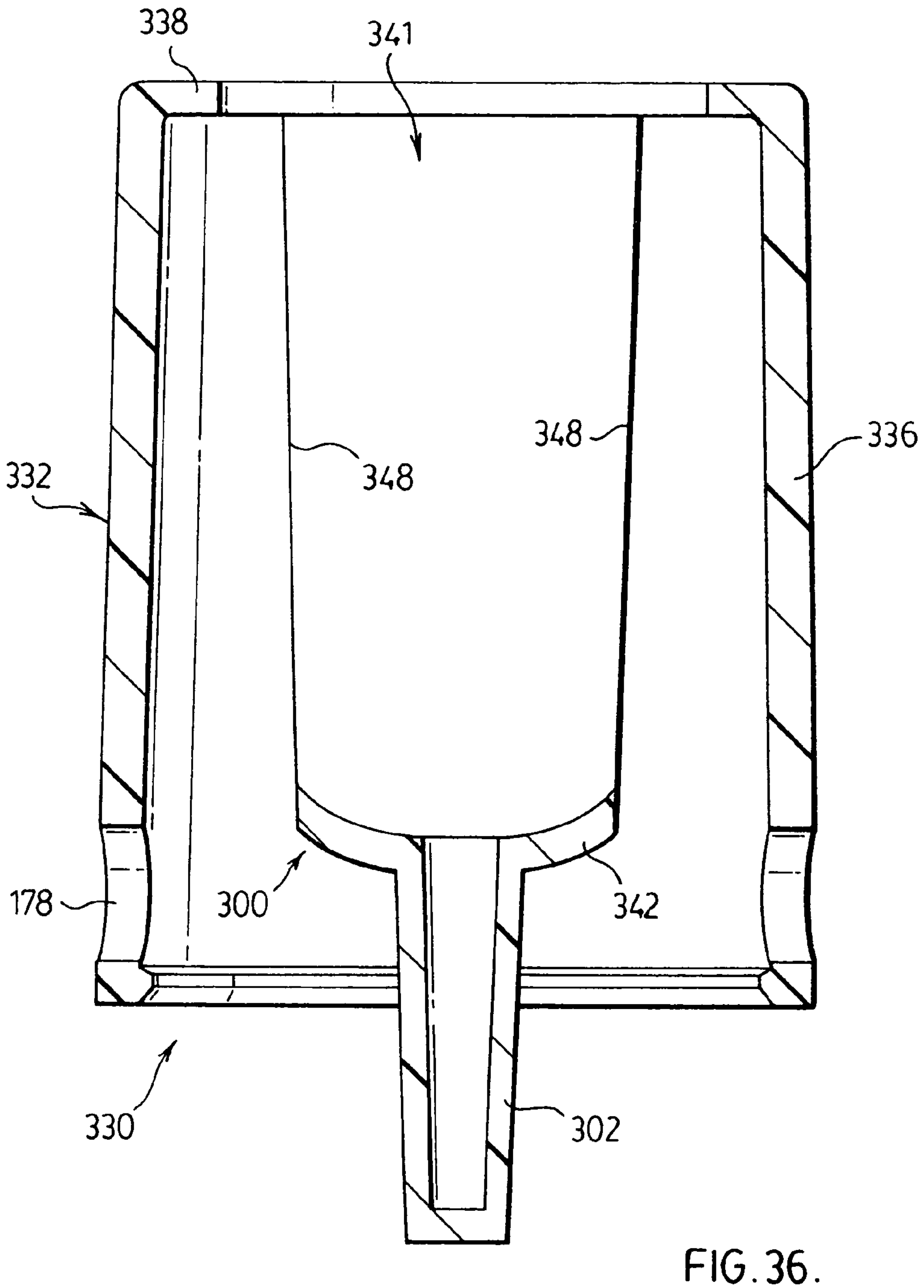
FIG. 36 is a cross-sectional side view of the spring member of FIG. 33.
Figure 37:
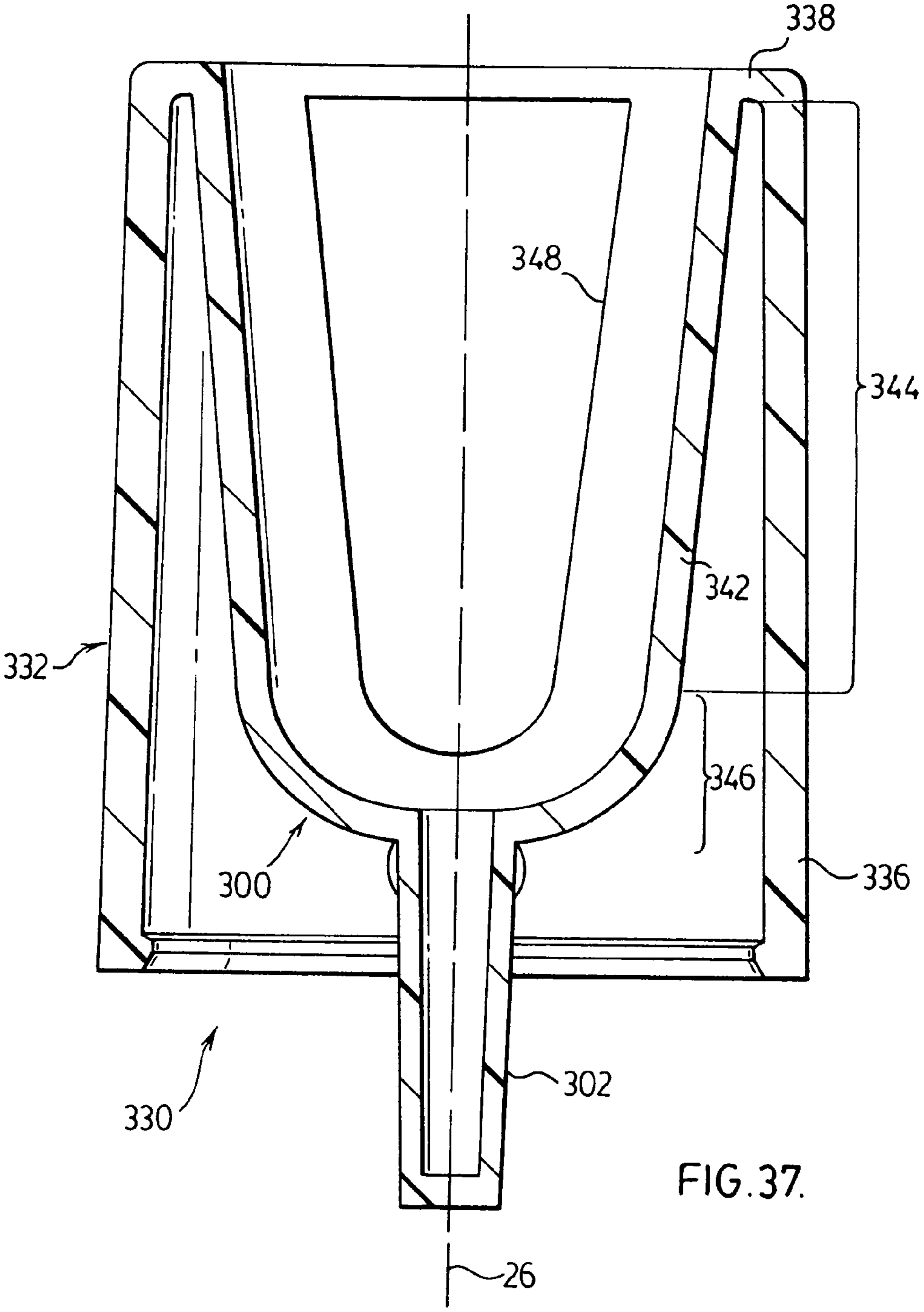
FIG. 37 is a cross-sectional side view of the spring member of FIG. 33 in a cross-section normal to the cross-section of FIG. 36.
Figure 38:
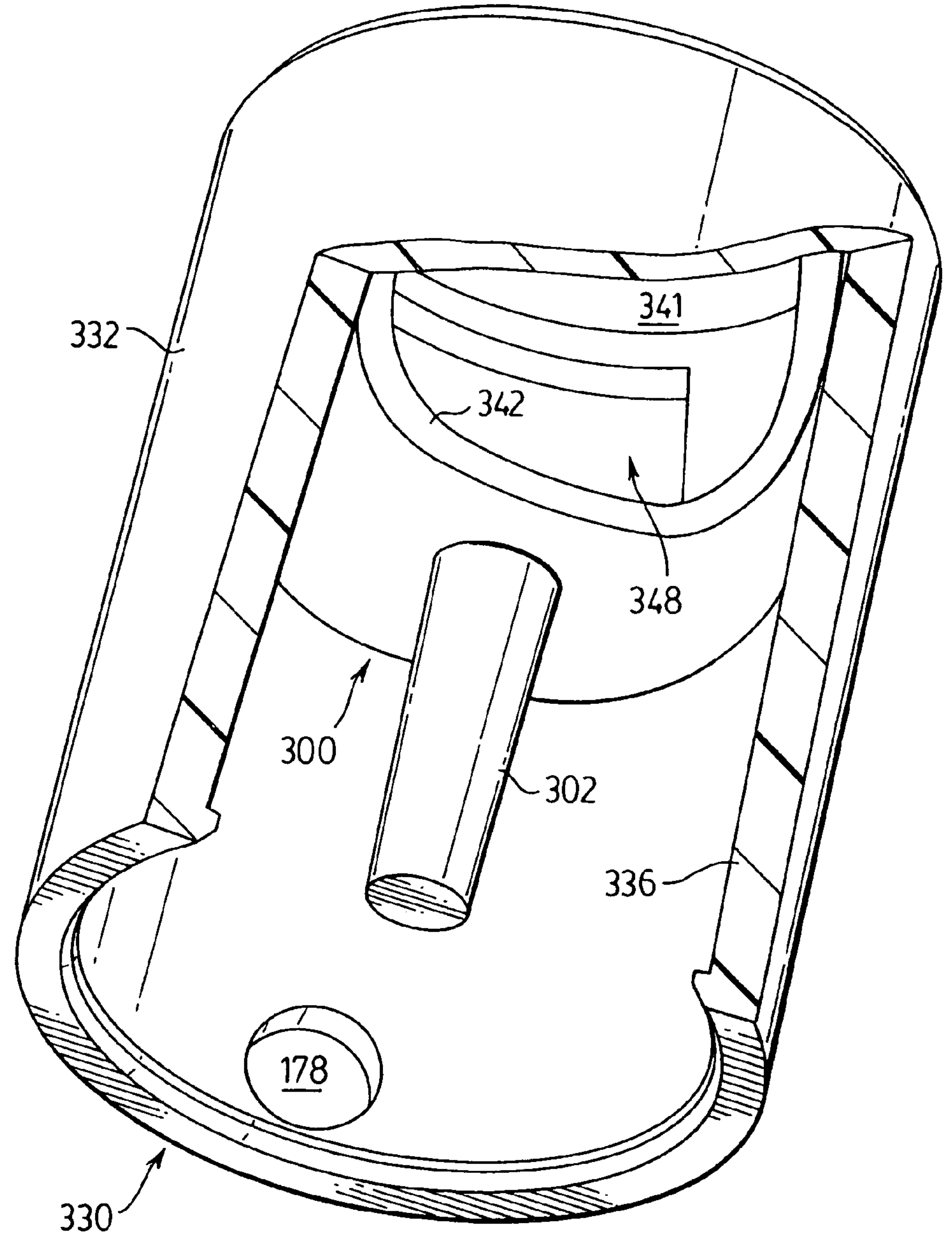
FIG. 38 is a partially cut-away pictorial view of the spring member as shown in FIG. 32 in a compressed condition.
Figure 39:
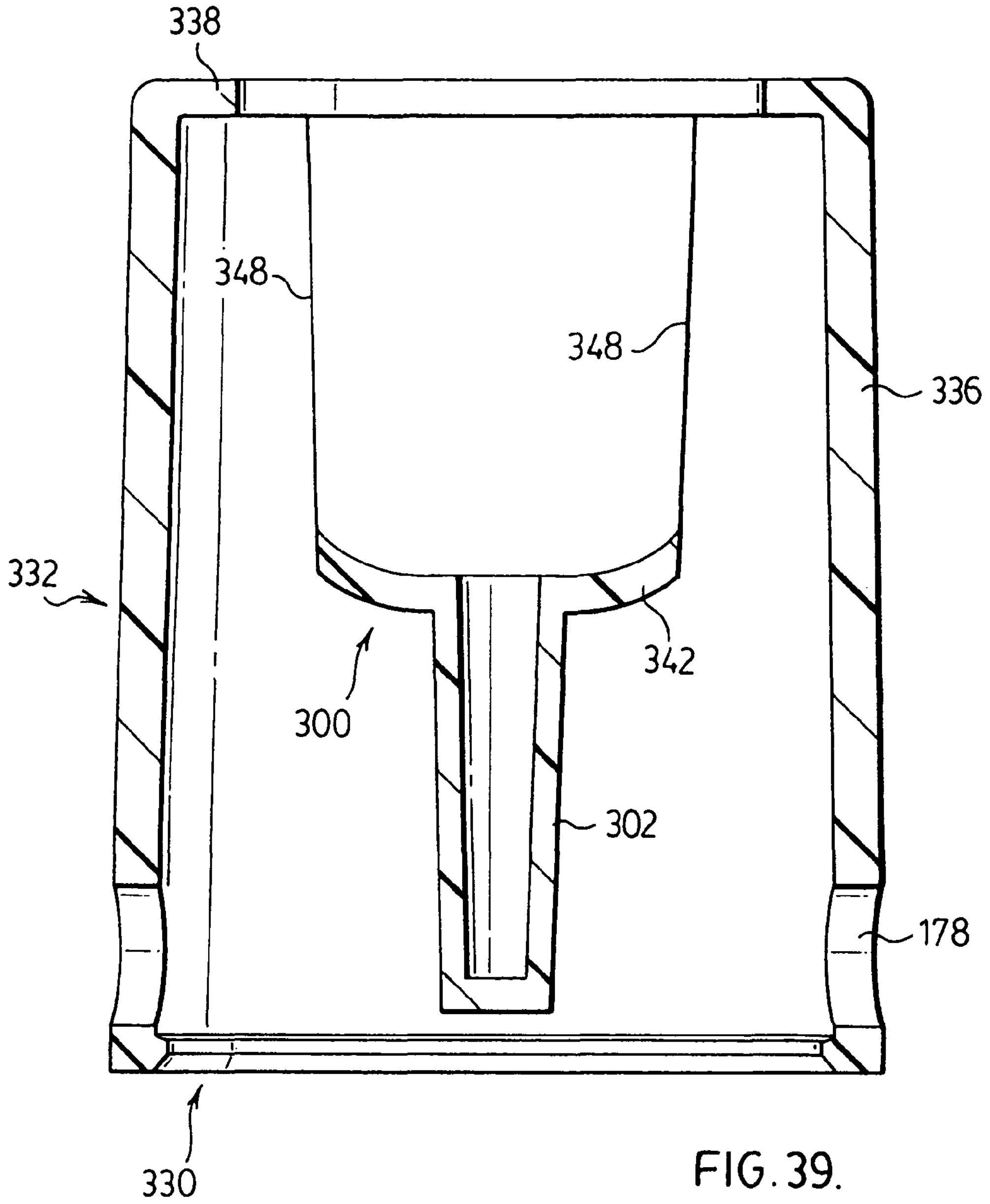
FIG. 39 is a cross-sectional side view through the compressed spring member of FIG. 38.
Figure 40:
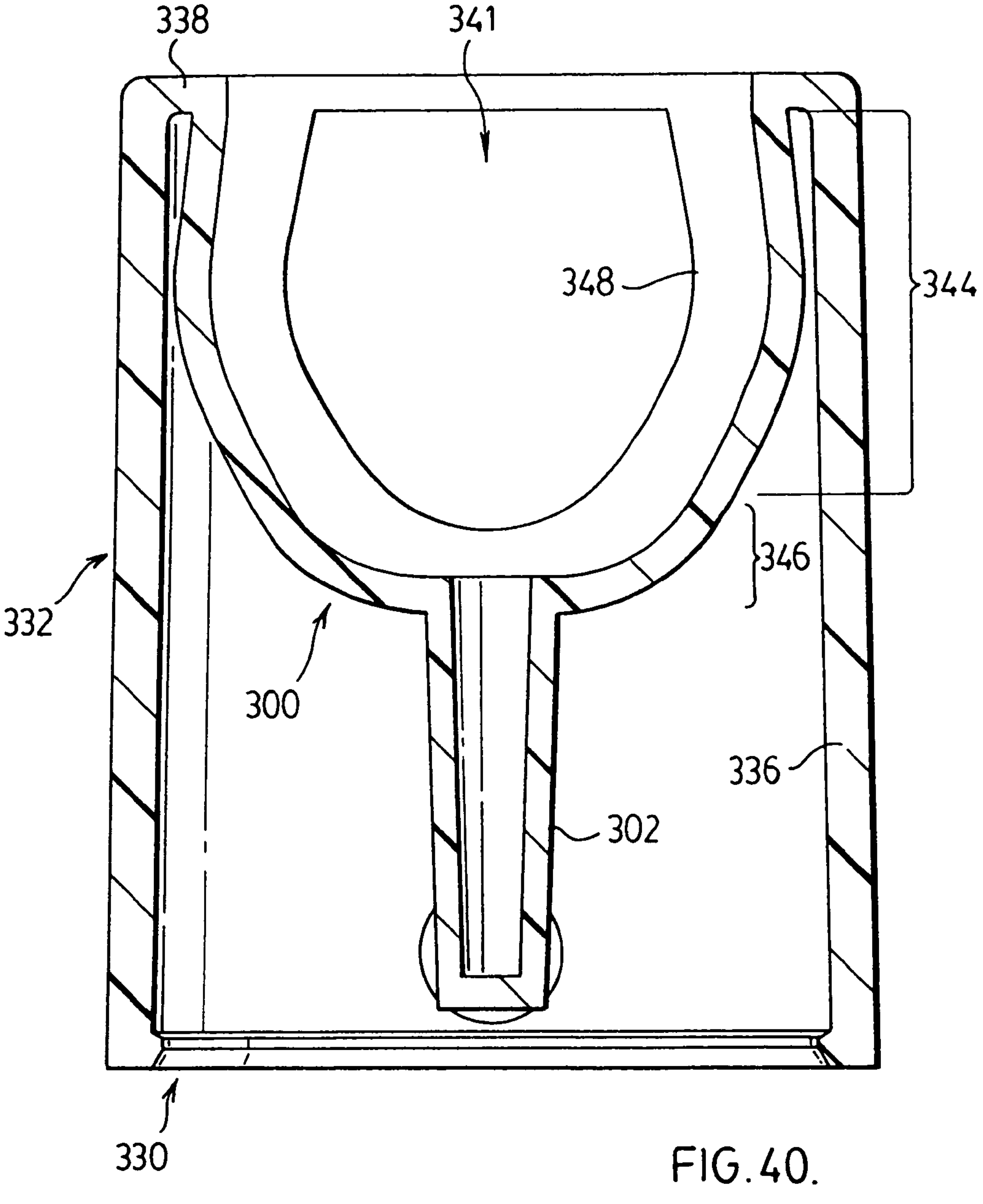
FIG. 40 is a cross-sectional side view through the compressed spring member of FIG. 39 in a cross-section normal to the cross-section of FIG. 39.

The pictorial views of FIGS. 33, 34 and 35 best show the side wall 342 of the spring 300 with the openings 348 through the side wall 342 from an exterior surface 350 of the side wall 342 into an interior of the spring. FIGS. 36 and 37 illustrate enlarged cross-sectional views of the spring assembly 330 in an unbiased extended position as, for example, illustrated in FIGS. 33, 34 and 35 and in the same positions as are shown in FIGS. 30 and 31, respectively.

In use of the pump of the embodiment of FIGS. 30 to 40, the pump is moved from the extended position of FIG. 31 to the retracted position of FIG. 32. Axial inward movement of the piston 14 relative to the body 12 compresses the spring 300. The spring 300 has an inherent bias to assume its uncompressed position shown, for example, in FIGS. 36 and 37 and, thus, will apply forces to the piston urging the piston 14 towards the fully extended position. FIGS. 32, 38, 39 and 40 illustrate the spring 300 in a fully retracted compressed condition. As seen, the conical portion 344 of the walls 342, at least in a mid-section of the conical portion, have been deflected radially outwardly. The dome portion 346 has been deflected to increase the radius of the dome as, for example, flattening the upper central-most portion of the dome portion 346. With the embodiment illustrated, further compression of the spring 300 is prevented by a stop mechanism of the outer end of the inner tubular portion 316 engaging the outer casing 120 of the piston 14. If further compression of the spring member 300 may be permitted, continued outward deflection of the conical portion 344 of the side wall 342 would occur and a central portion of the dome portion could be moved such that its outer surface about the tubular neck 302 may become successively less convex, then flat and, subsequently, concave with the portion of the side wall about the neck 302 to extend inwardly past radially outer portions of the side wall such that the side wall deflects to double back on itself. Such an inversion of the dome portion 346 from having a convex outer surface to having a concave outer surface can be advantageous for providing biased resiliency to the spring 300.

As seen in the Figures, the spring 300 when in the unbiased extended position has a greatest diameter at its first end and a least diameter at its second end. The two openings 348 through the side wall 342 are diametrically opposite each other and symmetrical relative to the axis 26 circumferentially and longitudinally of the axis 26. As well, each opening 348 is symmetrical about a notional medial plane passing centrally through the opening 348 and including the axis 26. Each opening also lies in the intersection with the side wall 342 of a notional flat plane normal to such medial plane. Each opening increases with circumferential extent with distance from the second end. The side wall 342 has a substantially constant thickness, however, the side wall 342 preferably should have a thickness which is substantially constant or which varies gradually by a gradient over any two adjacent points on its surface of no more than between 0.1 percent and 10 percent.

Providing the spring assembly 330 to be a separate element from the other elements of the pump is advantageous insofar as the spring 300, to provide desired resilient characteristics, may be desired to be made from a different plastic than the other elements of the pump. However, the invention is not limited to providing the spring assembly 330 as a separate element. The spring 300 may be formed as an integral rearward extension of the piston 14, for example, in a manner that the bellows 200 forms an extension of the piston 14 in FIG. 24 albeit with the internal passageway 46 requiring to be closed rearward from the inlets 54. If the spring 300 is to be formed integrally with the piston 14 then, advantageously, the spring housing 332 may be formed as an integral part of the body 12 as a rearward, substantially cylindrical extension thereof having, for example, a similar flange 338 and central opening 341 through the flange 338 through which the inner core 122 of a piston 14 including the spring 300 may be inserted during assembly.

In accordance with the present invention, a similar spring member may be provided, however, without the side openings 348 and therefore formed, for example, to have a side wall 342 which extends 360° about its central axis as a solid of revolution about the axis 26. Providing the openings 348 through the side wall 342 is advantageous, however, for a number of reasons. Firstly, it at least partially eliminates the difficulty of a compartment formed inside the spring housing 332 below the spring 330 acting as a displacement pump and tending to draw and dispense fluid inwardly and outwardly through the openings 178. This difficulty could, however, be simply overcome by increasing the size and number of openings 178. More significantly, providing the side openings 348 assists in selecting the characteristics of the spring 300 as to the relative thickness of the side wall and the spring forces that are generated with distance of deflection from the unbiased extended position of the spring 300. The circumferential extent of the openings 348 at any position along the axial length of the spring 300 and the relative location of the side openings 348 axially relative to the spring can affect the strength and deflections of the spring.

As contrasted with the use of a bellows such as the bellows 200 in FIG. 28 as a spring member, the spring 300 provides for relatively smooth biasing resistance forces as contrasted with a pleated bellows which tends to provide stepped changes in the resistance as the bellows become folded or bent about each of its pleats or folds. With any particular thickness of the side wall 342 of the spring 300, the relative size and location of the side openings 348 can be changed as would be apparent to a person skilled in the art at the least, on a trial and error basis, towards developing suitable forces with distance of compression as well as for the extent of deflection.

The preferred spring assembly 330 is adapted for coupling at an inner end of both the body 12 and the piston 14. The spring 300 in accordance with the present invention is not, however, limited to such use and may be used for a variety of other uses as a spring other than merely in a pump.

Figure 41:
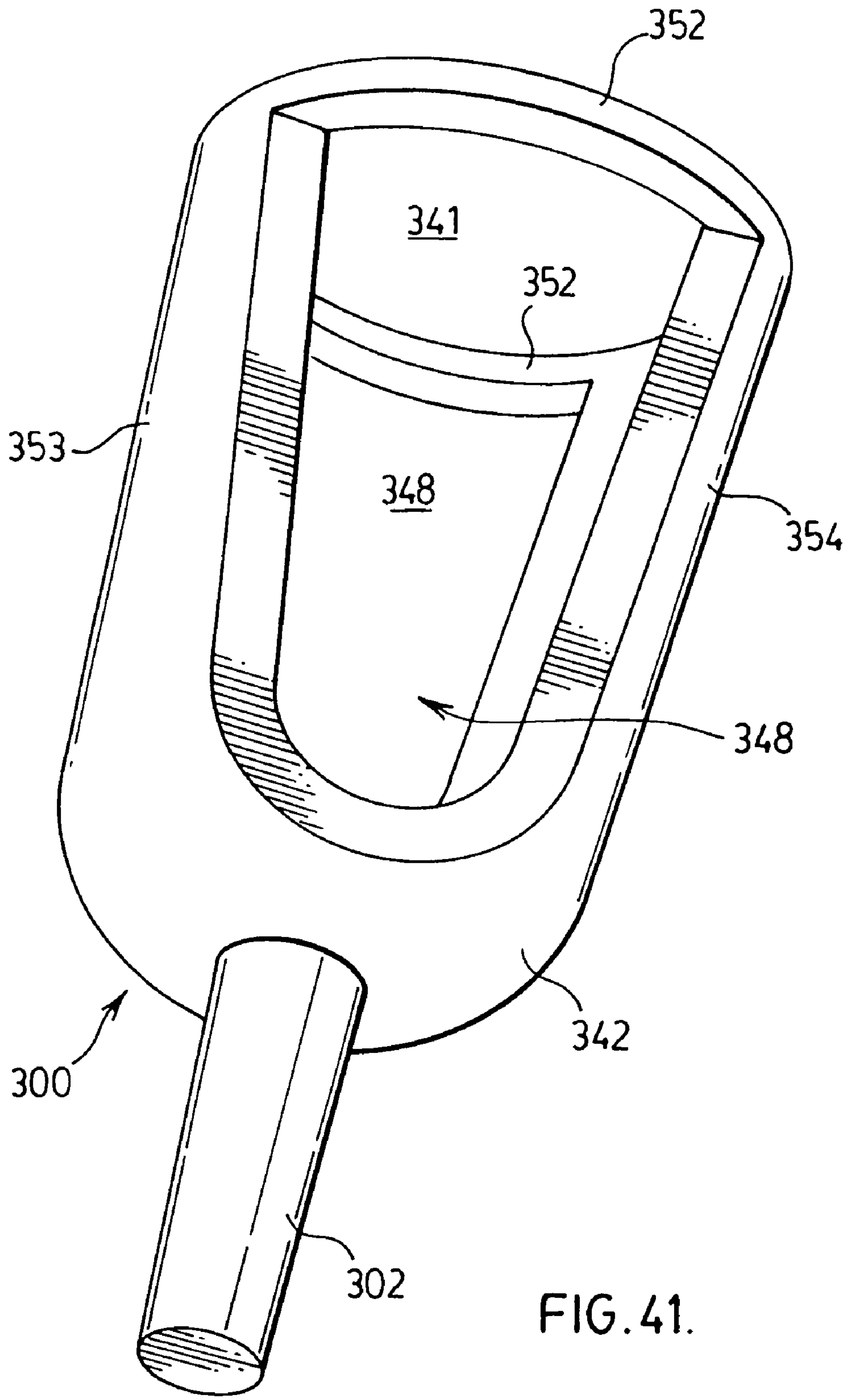
FIG. 41 is a pictorial view of a second embodiment of a spring in accordance with the present invention.

Reference is made to FIG. 41 which illustrates a spring member 300 similar to that illustrated in FIG. 35, however, provided as a separate member without the spring housing 332. Advantageously, as seen in FIG. 41, at the inner end of the spring, the side wall includes a circumferential ring 352 which assists in retaining the diametrically opposed side portions 353 and 354 of the side wall 342 together.

Reference is made to FIGS. 42 to 49 which illustrate a number of other versions of a spring 300 in accordance with the present invention. The embodiments of FIGS. 42, 44, 46 and 48 are each embodiments in which no openings are provided through the side walls 342 of the springs 300. The embodiments illustrated in FIGS. 43, 44, 45 and 46 each have two or more openings 348 through the side walls 342 uniformly spaced circumferentially about a center axis through the spring 300.

In the embodiments of FIGS. 46 to 49, at the closed end of the spring 300, an engagement socket 370 is provided with extends coaxially into the interior of the spring as contrasted with the embodiments of FIGS. 42 to 45 in which there is a coaxial neck 302 which extends outwardly from the spring 300.

Figure 42:
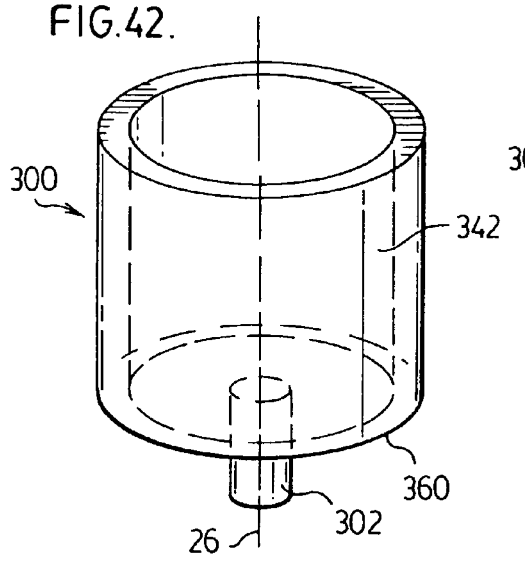
FIGS. 42 to 49 are perspective views of third to tenth embodiments, respectively, of springs in accordance with the present invention.
Figure 43:
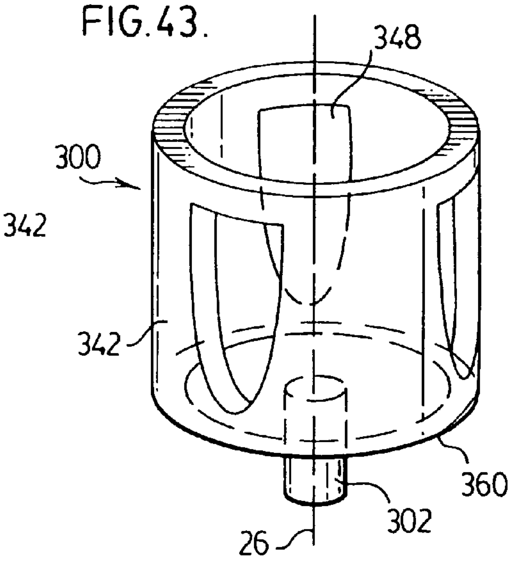
Figure 44:
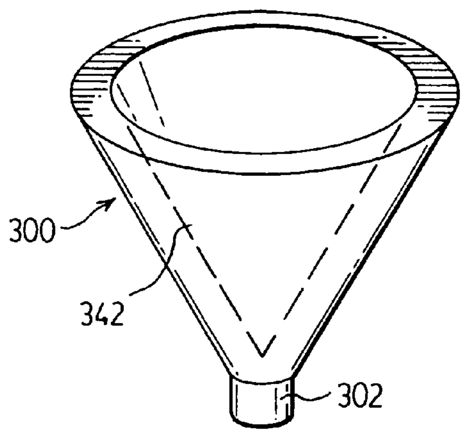
Figure 45:
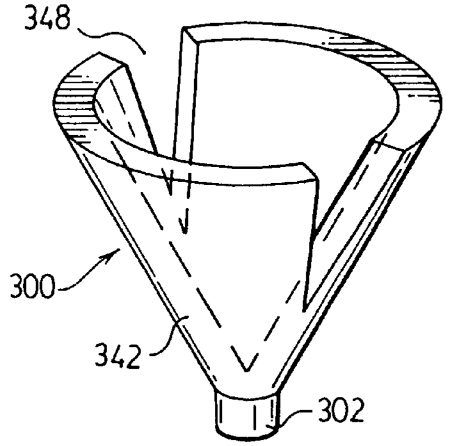
Figure 46:
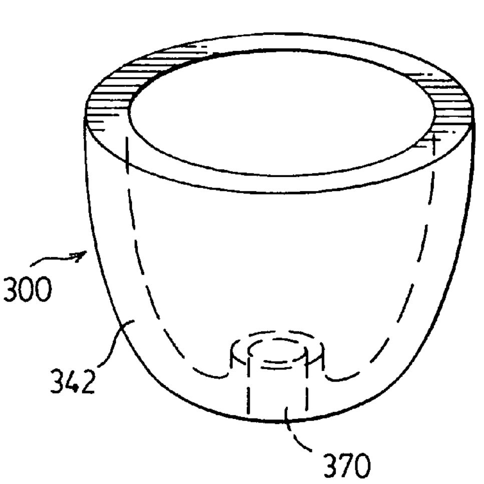
Figure 47:
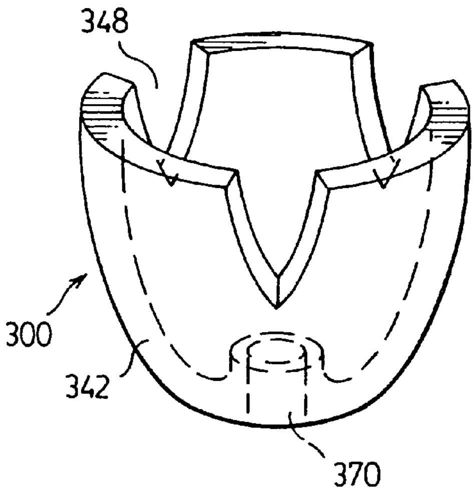

The embodiment of FIGS. 42 and 43 illustrate an arrangement in which the side walls 342 are cylindrical and the end wall 360 is circular in a plane extending radially to the axis 26. In the embodiment of FIGS. 44 and 45, the side walls 342 are conical. In the embodiment of FIGS. 46 to 49, the side walls 342 are generally dome shaped, approaching that of a semisphere.

Figure 48:
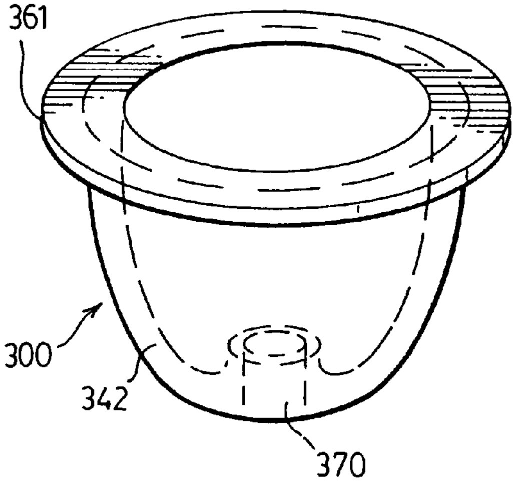
Figure 49:
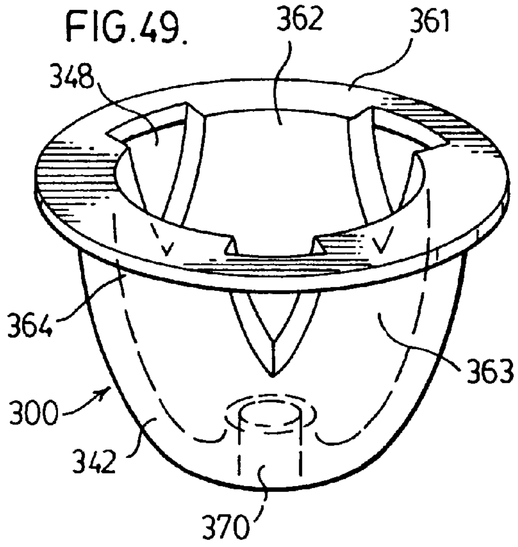

The embodiment of FIGS. 48 and 49 have a flange 361 extending radially outwardly from the side wall 342 and with the side openings 348 extending axially inwardly through the flange 361 with the portions of the flange radially outwardly of the side wall 342 providing a continuous annular rim to keep the spaced segments 362, 363 and 364 of the side wall 342 together.

The spring members 300 may preferably be disposed within a complementary spring housing exemplified by the spring housing 332 of FIGS. 30 to 40. The spring housing can be of assistance in ensuring that the spring member 300 remains substantially coaxially disposed in collapsing, or at least does not deviate unduly from collapsing coaxially by reason of inside surfaces of a wall of the spring housing 332 becoming engaged with outside surfaces of the wall of the spring member 300. The spring housing 332 may preferably be provided with an interior surface complementary to the shape and nature of the spring 300 received therein to permit and accommodate desired deflection yet to prevent undesired deflection. For example, in the context of the spring 300 shown in FIGS. 42 and 43 with a cylindrical wall, the housing may also be a cylindrical wall spaced radially outwardly from the spring 300 but not to distant therefrom so as, for example, to enhance inversion of the spring 300 with the end wall to become domed inwardly in a concave manner and, subsequently, be moved radially inwardly down inside the spring with the side walls 342 of the spring doubling over on themselves.

The relative thickness of the side wall of the spring 300 is shown in the preferred embodiments to be relatively constant, however, it is to be appreciated that the thickness of the side wall, that is, measured from its inside surface to its outside surface may be varied as may be desirable to provide for different resiliencies and stiffness of the side wall at varying portions. Transitions in the thickness of the side wall preferably are gradual and not stepwise. The thickness of the side wall may vary in the axial direction of the spring.

Preferred materials of construction of the spring 300 are elastomeric and plastic materials which can be easily manipulated by injection moulding yet will have an inherent resiliency suitable to serve as a spring and, as well, a longevity in terms of its resiliency over repeated deflection for sufficient time and number of cycles as appropriate to the use to which the spring is to be placed. The spring member 300 is particularly adapted for use as in pumps for dispensing liquids with the entirety of the pump and container to be disposed when the container is emptied of fluid.

While this invention has been described with reference to preferred embodiments, the invention is not so limited. Many modifications and variations will now occur to persons skilled in the art. For a definition of the invention, reference is made to the appended claims.

We claim:

1. A pump for dispensing liquid from a reservoir comprising:

a piston-chamber forming member, a piston forming element received in the piston-chamber forming member coaxially axially slidable about a longitudinal axis inwardly and outwardly therein between an inward retracted position and an outward extended position, said piston forming element having a central axially extending stem having a central passageway, an inner end, an outer end and an outlet proximate the outer end of the stem extending out of the piston-chamber forming member and from which liquid is dispensed, at least one annular chamber formed annularly about the stem between the piston forming element and the piston-chamber forming member providing for controlled movement of liquid from the reservoir into the annular chamber and for dispensing of liquid in the annular chamber to the outlet with reciprocal sliding of the piston forming element between the retracted position and the extended position, a spring extending from a first end to a second end about the axis, the spring having an inherent bias to assume an extended position with the first end spaced from the second end along the axis, the spring assuming compressed positions when compressed by forces applied parallel to the axis, in the compressed positions the spring resiliently urges its first and second ends axially away from each other toward the extended position;

the spring having a wall in the shape of a solid of revolution rotated about the axis and defining a central cavity therein open at the first end of the spring and substantially closed at the second end of the spring, the wall of the spring when in the unbiased extended position having a greatest diameter at the first end and a least diameter at the second end, a plurality of openings through the wall of the spring, each of the plurality of openings disposed symmetrically both circumferentially and axially relative to each other, the second end of the spring coupled to the inner end of the stem of the piston forming element, the first end of the spring coupled to an inner end of the piston-chamber forming member, the spring extending inwardly from the inner end of the stem of the piston forming element coaxially relative the piston forming element from the second end of the spring to the first end of the spring wherein said first end of the spring is coupled to the inner end of the piston-chamber forming member, the spring member being axially compressed with reciprocal sliding of the piston forming element from the extended position to the retracted position, the inherent bias of the spring urging the piston forming element axially from the retracted position toward the extended position, the piston-chamber forming member including a spring housing, the spring housing located coaxially surrounding the spring with the spring disposed internally within the spring housing, the spring housing having a side wall with an inner, first end and an outer, second end, the side wall disposed radially outwardly of the wall of the spring circumferentially entirely thereabout, the first end of the spring fixedly coupled to a first end of the side wall of the housing with the side wall of the housing extending axially from the first end of the spring coaxially about the spring outwardly towards the second end of the spring, the second end of the spring housing fixedly coupled to the outer an of the piston chamber-forming member, wherein in deflection of the spring with relative movement of the piston forming element and the piston-chamber forming member from the extended position to the retracted position, the side wall of the housing disposed radially outwardly of the wall of the spring such that the side wall of the housing prevents deflection of the wall of the spring radially outwardly therepast to assist in maintaining the spring coaxial relative to the housing.

2. A pump as claimed in claim 1 wherein the annular chamber having a one-way inlet valve mechanism providing for flow of liquid from the reservoir and a one-way outlet mechanism for dispensing of liquid in the annular chamber to the outlet.

3. A pump as claimed in claim 1 wherein the at least one annular chamber comprises stepped coaxial chambers with different diameters formed annularly about the stem between the piston forming element and the piston-chamber forming member providing for the controlled movement of liquid from the reservoir into the annular chamber and for the dispensing of liquid in the annular chamber to the outlet with reciprocal sliding of the piston forming element between the retracted position and the extended position.

4. A pump as claimed in claim 1 wherein a foam generator is disposed upstream from the outlet which produces foam on simultaneously passage of air and liquid therethrough.

5. A pump as claimed in claim 1 wherein the wall of the spring has a frustoconical portion tapering inwardly from the first end of the spring toward the second end of the spring where the frustoconical portion merges with a domed portion with a center of the domed portion at the second end of the spring and opening outwardly towards the first end of the spring.

6. A pump as claimed in claim 5 wherein when the spring is compressed under axially directed forces in deflecting with relative movement of the piston forming element and the piston-chamber forming member from the extended position to the retracted position, the frustoconical portion of the wall of the spring is deflected radially outwardly and the domed portion is deflected to reduce the extent to which an outer surface of the domed portion is convex.

7. A pump as claimed in claim 1 wherein the plurality of openings consists of two openings through the wall of the spring diametrically opposite each other and symmetrical relative to the axis circumferentially and longitudinally of the axis, each opening symmetrical about a medial plane passing centrally through the plurality of openings and including the axis, each opening is increases with circumferential extent with distance from the second end of the spring, each opening lies in an intersection between the wall of the spring and a flat plane normal to the medial plane.

8. A pump as claimed in claim 7 wherein the wall of the spring has a thickness which is substantially constant or which varies gradually by a gradient over any two adjacent points on its surface of no more than between 1 percent and 10 percent.

9. A spring in combination with a spring housing with the spring disposed internally within the spring housing which is disposed coaxially surrounding the spring, the spring extending from a first end to a second end about a longitudinal axis, the spring having an inherent bias to assume an extended position with the first end spaced from the second end along the axis, the spring assuming compressed positions when compressed by forces applied parallel to the axis, in the compressed positions the spring resiliently urges its first and second ends axially away from each other toward the extended position;

the spring having a wall in the shape of a solid of revolution rotated about the axis and defining a central cavity therein open at the first end of the spring and substantially closed at the second end of the spring, the wall of the spring when in the unbiased extended position having a greatest diameter at the first end and a least diameter at the second end, a plurality of openings through the wall of the spring, the openings disposed symmetrically both circumferentially and axially relative to each other, the spring housing having a side wall with a first end and a second end, the side wall disposed radially outwardly of the wall of the spring circumferentially entirely thereabout, the first end of the spring coupled to a first end of the side wall of the housing with the side wall of the housing extending axially from the first end of the spring coaxially about the spring towards the second end of the spring, wherein in deflection of the spring from the extended position to the compressed positions, the side wall of the housing disposed radially outwardly of the wall of the spring such that the side wall of the housing prevents deflection of the wall of the spring radially outwardly therepast to assists in maintaining the spring coaxial relative to the housing.

10. A spring as claimed in claim 9 wherein the plurality of openings consists of two openings through the wall of the spring diametrically opposite each other and symmetrical relative to the axis circumferentially and longitudinally of the axis.

11. A spring as claimed in claim 9 wherein the spring is formed as an integral member from plastic material by injection moulding.

12. A spring as claimed in claim 9 wherein the wall of the spring has a frustoconical portion tapering inwardly from the first end of the spring.

13. A spring as claimed in claim 12 including an annular flange extending radially outwardly from the wall of the spring at the first end of the spring.

14. A spring as claimed in claim 12 wherein each opening of the plurality of openings is increased with circumferential extent with distance from the second end of the spring.

15. A spring as claimed in claim 12 wherein the plurality of openings consists of two openings through the wall of the spring diametrically opposite each other and symmetrical relative to the axis circumferentially and longitudinally of the axis, each opening symmetrical about a medial plane passing centrally through the plurality of openings and including the axis.

16. A spring as claimed in claim 15 wherein each opening of the plurality of openings lies in the intersection with the wall of the spring and a flat plane normal to the medial plane.

17. A spring as claimed in claim 15 wherein the wall of the spring has a substantially constant thickness.

18. A spring as claimed in claim 15 wherein the wall of the spring has a thickness which is substantially constant or which varies gradually by a gradient over any two adjacent points on its surface of no more than between 0.1 percent and 10 percent.

19. A spring as claimed in claim 9 wherein the wall of the spring has a domed portion with a center of the domed portion at the second end of the spring and the dome opening outwardly towards the first end of the spring.

20. A spring as claimed in claim 9 wherein the wall of the spring has a frustoconical portion tapering inwardly from the first end of the spring toward the second end of the spring where the frustoconical portion merges with a domed portion with a center of the domed portion at the second end of the spring and opening outwardly towards the first end of the spring.

21. A spring as claimed in claim 20 wherein when the spring is compressed under axially directed forces in deflecting with relative movement of the piston forming element and the piston-chamber forming member from the extended position to the retracted position, the frustoconical portions of the wall of the spring is deflected radially outwardly and the domed portion is deflected to reduce the extent to which an outer surface of the domed portion is convex.

22. A spring as claimed in claim 20 wherein at the second end of the spring, an engagement member is provided for engagement of the spring, the engagement member selected from a tubular engagement member extending from the center of the domed portion from the second end of the spring away from the first end of the spring coaxial with the axis, and an opening in the center of the domed portion coaxial with the axis extending into the wall of the spring toward the first end of the spring.

23. A spring as claimed in claim 9 wherein the second end of the spring is adapted for coupling to a first movable member, the second end of the housing is adapted for coupling to a second movable member axially slidably coupled for reciprocal sliding movement relative to each other along the axis, the spring biasing the first and second members to a desired position corresponding to the extended position of the spring.

24. A spring as claimed in claim 9 wherein the spring and the housing are formed as an integral member from plastic material by injection moulding.

* * * * *

UNITED STATES PATENT AND TRADEMARK OFFICE

CERTIFICATE OF CORRECTION

PATENT NO. : 7,770,874 B2
APPLICATION NO. : 11/403209
DATED : August 10, 2010
INVENTOR(S) : Heiner Ophardt and Ali Mirbach It is certified that error appears in the above-identified patent and that said Letters Patent is hereby corrected as shown below:

On the cover page, item (73) Assignee to replace the word "GOTOHII.COM" by --GOTOHTI.COM--.

Signed and Sealed this
First Day of February, 2011

David J. Kappos
*Director of the United States Patent and Trademark Office*